United States Patent
Usui et al.

(10) Patent No.: US 7,267,000 B1
(45) Date of Patent: Sep. 11, 2007

(54) LIQUID CONSUMPTION STATUS DETECTING METHOD, LIQUID CONTAINER, AND INK CARTRIDGE

(75) Inventors: Minoru Usui, Nagano (JP); Kenji Tsukada, Nagano (JP); Munehide Kanaya, Nagano (JP); Noboru Tamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/574,015

(22) Filed: May 19, 2000

(30) Foreign Application Priority Data

| May 20, 1999 | (JP) | ................................. 11-139683 |
| May 27, 1999 | (JP) | ................................. 11-147538 |
| Sep. 10, 1999 | (JP) | ................................. 11-256522 |

(51) Int. Cl.
*G01F 23/00* (2006.01)

(52) U.S. Cl. .......................... 73/290 V; 347/7; 73/149; 73/52

(58) Field of Classification Search .............. 73/290 V, 73/52, 149; 347/7
See application file for complete search history.

(56) References Cited

U.S. PATENT DOCUMENTS

| 3,110,890 A | 11/1963 | Westcott et al. |
| 3,220,258 A | 11/1965 | Rod |
| 3,394,589 A | 7/1968 | Tomioka |
| 3,703,693 A | 11/1972 | Levinn |
| 3,832,900 A | 9/1974 | Ross |
| 3,889,247 A | 6/1975 | Voll |
| 4,008,612 A | 2/1977 | Nagaoka et al. |
| 4,107,994 A | 8/1978 | Sogo |
| 4,196,625 A | 4/1980 | Kern |
| 4,310,957 A | 1/1982 | Sachs |
| 4,329,875 A | 5/1982 | Nolting et al. |
| 4,337,470 A | 6/1982 | Furukawa |
| 4,403,227 A | 9/1983 | Bertschy et al. |
| 4,419,677 A | 12/1983 | Kasugayama et al. |
| 4,479,982 A | 10/1984 | Nilsson et al. |
| 4,570,482 A | 2/1986 | Murata et al. |
| 4,594,891 A | 6/1986 | Benz et al. |
| 4,604,633 A | 8/1986 | Kimura et al. |

(Continued)

FOREIGN PATENT DOCUMENTS

CN 1274645 A 11/2000

(Continued)

OTHER PUBLICATIONS

Patent Abstracts of Japan for publication No. 02-034353, vol. 014, 186 (M-0962), Feb. 5, 1990, Cannon, Inc.

(Continued)

*Primary Examiner*—Hezron Williams
*Assistant Examiner*—Samir Shah
(74) *Attorney, Agent, or Firm*—Sughrue Mion, PLLC

(57) ABSTRACT

A method of detecting a consumption status of liquid contained in a liquid container, comprising steps of: preparing a detection device having a piezoelectric element and attaching the detection device on a desired position of the liquid container so that at least a part of the detection device contacting the liquid; measuring a residual vibration of the detection device; and detecting the consumption status of the liquid contained in the liquid container on the basis of a result of the measurement of the residual vibration.

39 Claims, 35 Drawing Sheets

U.S. PATENT DOCUMENTS

| | | | |
|---|---|---|---|
| 4,636,814 A | 1/1987 | Terasawa | |
| 4,677,448 A | 6/1987 | Mizusawa et al. | |
| 4,703,652 A | 11/1987 | Itoh et al. | |
| 4,770,038 A | 9/1988 | Zuckerwar et al. | 73/290 V |
| 4,796,782 A | 1/1989 | Wales et al. | |
| 4,811,595 A * | 3/1989 | Marciniak et al. | 73/149 |
| 4,853,718 A | 8/1989 | El Hatem et al. | |
| 4,977,413 A | 12/1990 | Yamanaka et al. | |
| 4,984,449 A | 1/1991 | Caldwell et al. | |
| 4,984,457 A | 1/1991 | Morris | |
| 5,035,140 A | 7/1991 | Daniels et al. | |
| 5,068,836 A | 11/1991 | Steel | |
| 5,132,711 A | 7/1992 | Shinada et al. | |
| 5,179,389 A | 1/1993 | Arai et al. | |
| 5,233,369 A | 8/1993 | Carlotta et al. | |
| 5,247,832 A | 9/1993 | Umezawa et al. | |
| 5,264,831 A | 11/1993 | Pfeiffer | |
| 5,315,317 A | 5/1994 | Terasawa et al. | |
| 5,319,973 A | 6/1994 | Crayton et al. | |
| 5,353,631 A * | 10/1994 | Woringer et al. | 73/41 |
| 5,410,518 A | 4/1995 | Birkett | |
| 5,463,377 A | 10/1995 | Kronberg | |
| 5,473,353 A | 12/1995 | Soucemarianadin et al. | |
| 5,506,611 A | 4/1996 | Ujita et al. | |
| 5,524,486 A | 6/1996 | Hermann | |
| 5,583,544 A | 12/1996 | Stamer et al. | |
| 5,586,085 A | 12/1996 | Lichte | 367/99 |
| 5,610,635 A | 3/1997 | Murray et al. | |
| 5,616,929 A | 4/1997 | Hara | |
| 5,619,238 A | 4/1997 | Higuma et al. | |
| 5,675,367 A | 10/1997 | Scheffelin et al. | |
| 5,689,288 A | 11/1997 | Wimmer et al. | 347/7 |
| 5,694,156 A | 12/1997 | Hoisington et al. | |
| 5,697,248 A | 12/1997 | Brown | |
| 5,712,667 A | 1/1998 | Sato | |
| 5,737,963 A | 4/1998 | Eckert et al. | |
| 5,747,689 A | 5/1998 | Hampo et al. | |
| 5,774,136 A | 6/1998 | Barbehenn et al. | 347/7 |
| 5,788,388 A | 8/1998 | Cowger et al. | |
| 5,788,819 A | 8/1998 | Onishi et al. | |
| 5,793,705 A | 8/1998 | Gazis et al. | |
| 5,835,817 A | 11/1998 | Bullock et al. | |
| 5,841,454 A | 11/1998 | Hall et al. | |
| 5,877,997 A | 3/1999 | Fell | |
| 5,900,888 A | 5/1999 | Kurosawa | |
| 5,949,447 A | 9/1999 | Arai et al. | |
| 5,975,102 A | 11/1999 | Schalk | |
| 6,003,966 A | 12/1999 | Ahn | |
| 6,007,190 A | 12/1999 | Murray et al. | |
| 6,012,793 A | 1/2000 | Haigo | |
| 6,012,794 A | 1/2000 | Nakano et al. | |
| 6,044,694 A | 4/2000 | Anderson et al. | |
| 6,050,669 A | 4/2000 | Yano et al. | |
| 6,089,686 A | 7/2000 | Thornton et al. | |
| 6,089,688 A | 7/2000 | Froger et al. | |
| 6,155,664 A | 12/2000 | Cook | |
| 6,164,744 A * | 12/2000 | Froger et al. | 347/7 |
| 6,254,212 B1 | 7/2001 | Coudray et al. | |
| 6,302,527 B1 | 10/2001 | Walker | |
| 6,312,074 B1 * | 11/2001 | Walker | 347/7 |
| 6,312,106 B1 | 11/2001 | Walker | |
| 6,312,115 B1 | 11/2001 | Hara et al. | |
| 6,344,658 B1 | 2/2002 | Nakagawa et al. | |
| 6,347,853 B1 | 2/2002 | Kato | |
| 6,361,136 B1 | 3/2002 | Watanabe et al. | |
| 6,390,590 B1 | 5/2002 | Hansburg | |
| 6,416,152 B1 | 7/2002 | Matsuzaki et al. | |
| 6,435,638 B1 | 8/2002 | Wilson et al. | |
| 6,438,500 B1 | 8/2002 | Froger et al. | |
| 6,470,744 B1 * | 10/2002 | Usui et al. | 73/290 R |
| 6,536,861 B1 | 3/2003 | Usui et al. | |
| 6,729,184 B2 | 5/2004 | Tsukada et al. | |
| 6,745,626 B2 | 6/2004 | Usui et al. | |
| 6,799,820 B1 | 10/2004 | Usui et al. | |
| 2002/0012015 A1 | 1/2002 | Tsukada et al. | |
| 2002/0015068 A1 | 2/2002 | Tsukada et al. | |
| 2002/0015084 A1 | 2/2002 | Tsukada et al. | |
| 2002/0105555 A1 | 8/2002 | Tsukada et al. | |
| 2002/0135623 A1 | 9/2002 | Tsukada et al. | |
| 2002/0170353 A1 | 11/2002 | Usui et al. | |
| 2003/0043216 A1 | 3/2003 | Usui et al. | |
| 2003/0071862 A1 | 4/2003 | Tsukada et al. | |
| 2003/0117450 A1 | 6/2003 | Usui et al. | |
| 2003/0117451 A1 | 6/2003 | Usui et al. | |
| 2003/0140694 A1 * | 7/2003 | Usui et al. | 73/290 V |

FOREIGN PATENT DOCUMENTS

| | | |
|---|---|---|
| EP | 0 553 535 | 8/1993 |
| EP | 0 660 092 | 6/1995 |
| EP | 0 676 624 | 10/1995 |
| EP | 676 624 A2 | 10/1995 |
| EP | 684 136 A2 | 11/1995 |
| EP | 0 803 364 | 10/1997 |
| EP | 803 365 A2 | 10/1997 |
| EP | 881 079 A2 | 2/1998 |
| EP | 0 853 236 | 7/1998 |
| EP | 853236 A1 | 7/1998 |
| EP | 860 284 A2 | 8/1998 |
| EP | 0 873 873 | 10/1998 |
| EP | 885 731 A2 | 12/1998 |
| EP | 956 964 A2 | 11/1999 |
| EP | 1 055 520 A1 | 11/2000 |
| EP | 1 088 668 | 4/2001 |
| EP | 1088668 A | 4/2001 |
| FR | 2572519 A1 | 5/1986 |
| GB | 2 304 898 | 3/1997 |
| JP | 56-27625 * | 3/1981 |
| JP | 56-39413 A | 4/1981 |
| JP | 56-39414 A | 4/1981 |
| JP | 56-53078 A | 5/1981 |
| JP | 56-59629 * | 5/1981 |
| JP | 57-208260 A | 12/1982 |
| JP | 58-32332 U | 3/1983 |
| JP | 58-201027 | 11/1983 |
| JP | 58-205820 A | 11/1983 |
| JP | 58201027 * | 11/1983 |
| JP | 59-019816 | 2/1984 |
| JP | 59-31417 A | 2/1984 |
| JP | 59-47829 * | 3/1984 |
| JP | 59-52422 U | 4/1984 |
| JP | 59-187227 A | 10/1984 |
| JP | 60-4820 A | 1/1985 |
| JP | 604820 A * | 11/1985 |
| JP | 62-95225 | 5/1987 |
| JP | 62-184856 A | 8/1987 |
| JP | 63247047 | 10/1988 |
| JP | 63-295266 A | 12/1988 |
| JP | 1-67530 U | 5/1989 |
| JP | 1-70128 U | 5/1989 |
| JP | 2-034353 A | 2/1990 |
| JP | 3-036037 A | 2/1991 |
| JP | 3-067657 A | 3/1991 |
| JP | 3-169642 A | 7/1991 |
| JP | 3-190748 A | 8/1991 |
| JP | 3-210427 A | 9/1991 |
| JP | 3-211907 A | 9/1991 |
| JP | 03-218847 A | 9/1991 |
| JP | 04135862 | 5/1992 |
| JP | 4-234670 A | 8/1992 |
| JP | 04-241505 | 8/1992 |
| JP | 5-25325 U | 4/1993 |
| JP | 5-254142 A | 10/1993 |
| JP | 5-318757 A | 12/1993 |

| | | | | | | |
|---|---|---|---|---|---|---|
| JP | 6-11304 A | 1/1994 | | JP | 10-323997 A | 12/1998 |
| JP | 6-143610 A | 5/1994 | | JP | 10-329333 A | 12/1998 |
| JP | 06-155762 A | 6/1994 | | JP | 11-5300 A | 1/1999 |
| JP | 6-218942 A | 8/1994 | | JP | 11-10909 A | 1/1999 |
| JP | 56-61421 | 10/1994 | | JP | 11-10962 A | 1/1999 |
| JP | 06297726 | 10/1994 | | JP | 11-020162 A | 1/1999 |
| JP | 7-081290 A | 3/1995 | | JP | 11-020188 A | 1/1999 |
| JP | 07-101127 | 4/1995 | | JP | 11-048490 A | 2/1999 |
| JP | 07-101127 A | 4/1995 | | JP | 11-503820 | 3/1999 |
| JP | 7-137276 A | 5/1995 | | JP | 11-115201 A | 4/1999 |
| JP | 7-137291 A | 5/1995 | | JP | 11-115217 A | 4/1999 |
| JP | 07137276 | 5/1995 | | JP | 11-207957 A | 8/1999 |
| JP | 7-89075 B2 | 9/1995 | | JP | 11-277760 A | 10/1999 |
| JP | 7-246712 A | 9/1995 | | JP | 11-286121 A | 10/1999 |
| JP | 8-34123 A | 2/1996 | | JP | 11-334107 A | 12/1999 |
| JP | 08-122172 | 5/1996 | | JP | 2000-43287 A | 2/2000 |
| JP | 08-314327 A | 11/1996 | | JP | 2000-190523 A | 7/2000 |
| JP | 9-020013 A | 1/1997 | | JP | 2000318183 | 11/2000 |
| JP | 9-029989 A | 2/1997 | | WO | WO98/09139 | 3/1998 |
| JP | 09-029991 A | 2/1997 | | WO | WO98/09139 A1 | 3/1998 |
| JP | 09-039263 A | 2/1997 | | WO | WO98/31548 | 7/1998 |
| JP | 09-220216 A | 8/1997 | | WO | WO99/34453 A1 | 7/1999 |
| JP | 09-267488 A | 10/1997 | | WO | WO99/42293 | 8/1999 |
| JP | 9-286121 A | 11/1997 | | | | |
| JP | 10-26549 A | 1/1998 | | | | |
| JP | 10026549 | 1/1998 | | | | |
| JP | 10-38662 A | 2/1998 | | | | |
| JP | 10-151753 A | 6/1998 | | | | |
| JP | 10-175312 A | 6/1998 | | | | |
| JP | 10-305590 | 11/1998 | | | | |
| JP | 10-323993 A | 12/1998 | | | | |

OTHER PUBLICATIONS

Patent Abstracts of Japan for publication No. 07-081290, vol. 1995, No. 06 Mar. 28, 1995 Pentel KK.

Patent Abstracts of Japan, vol. 1999, No. 4, Apr. 30, 1999.

US 5,635,961, 06/1997, Sato (withdrawn)

* cited by examiner

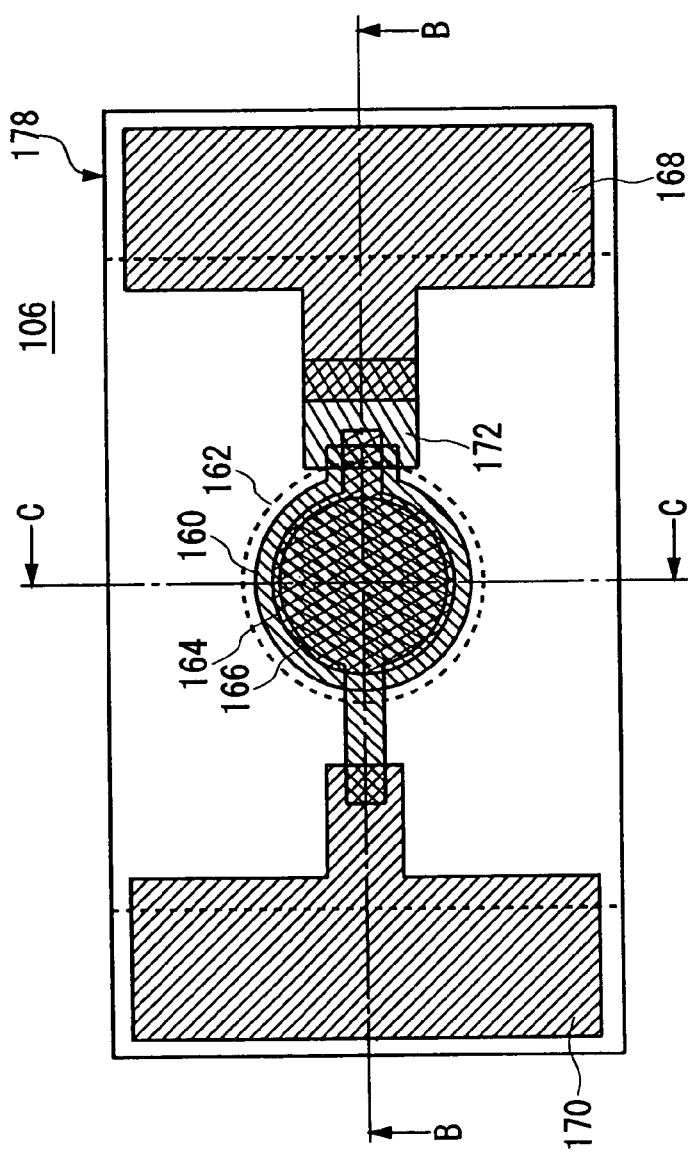
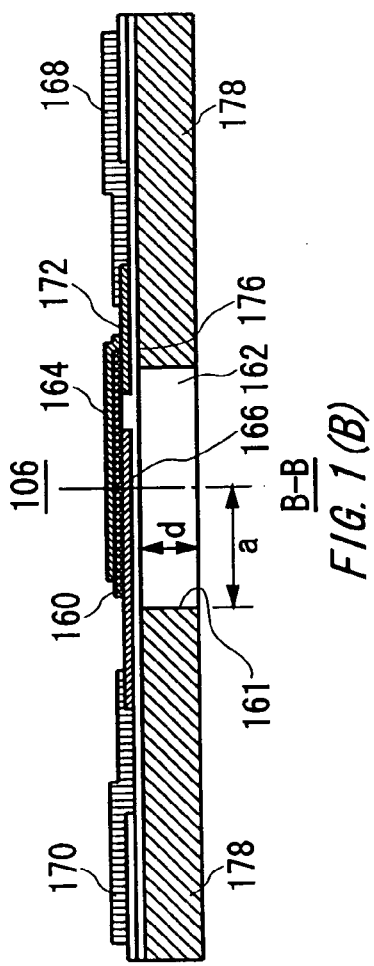
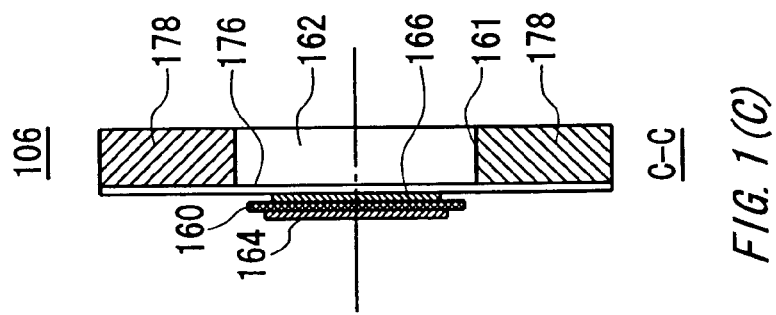
FIG. 1(A)
FIG. 1(B)
FIG. 1(C)

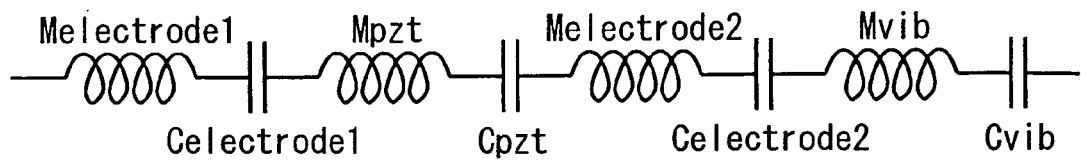
FIG. 2(A)
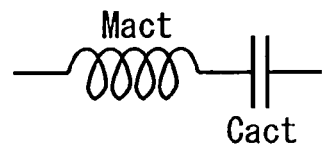
FIG. 2(B)
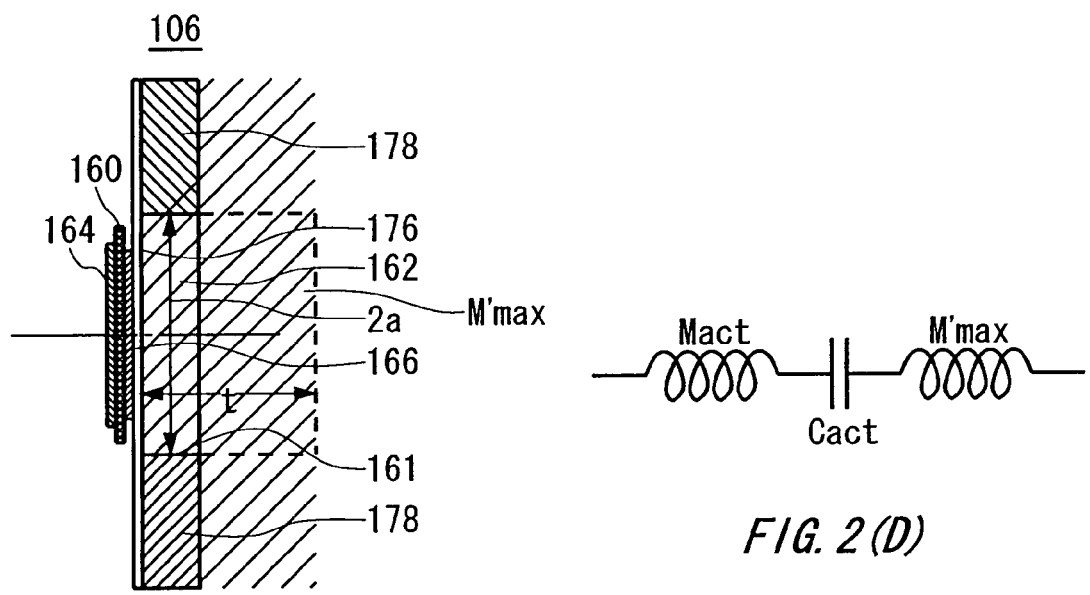
FIG. 2(C)
FIG. 2(D)
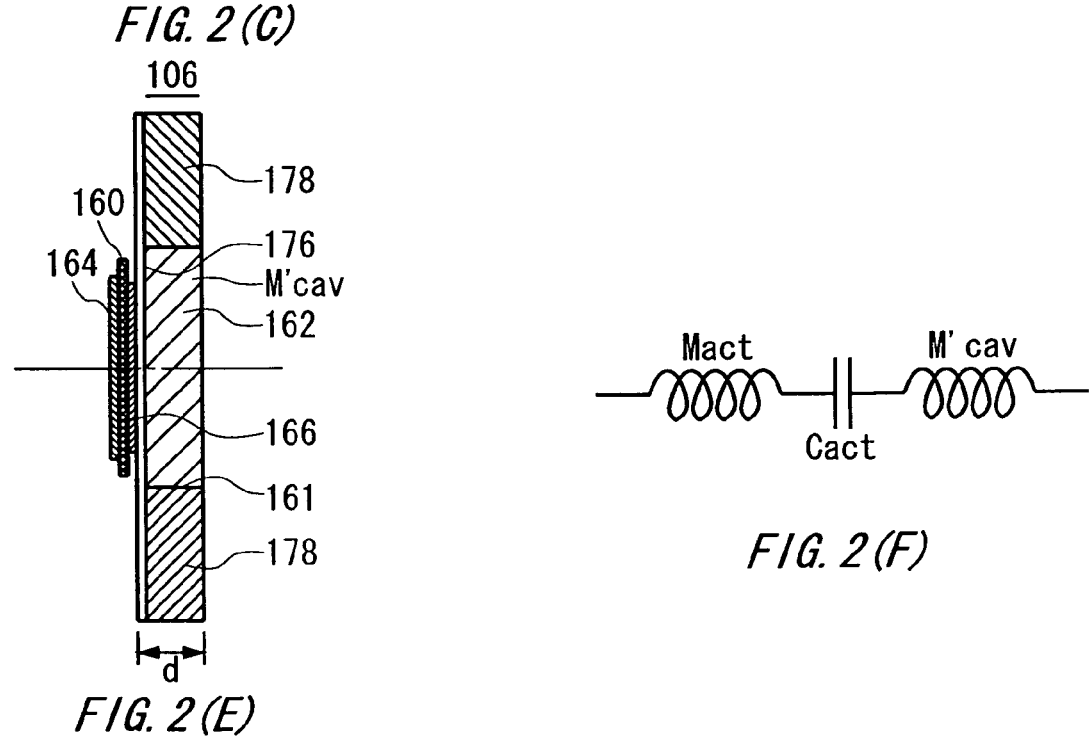
FIG. 2(E)
FIG. 2(F)

|  | A | B | C |
|---|---|---|---|
| PRIMARY MODE RESONANT FREQUENCY | 200 | 100 | 300 |
| SECONDARY MODE RESONANT FREQUENCY | 500 | 400 | 600 |
| CHARACTERISTIC PATTERN OF THE INK CARTRIDGE HAVING EACH RESIDUAL QUANTITY OF INK | 200:500 | 100:400 | 300:600 |

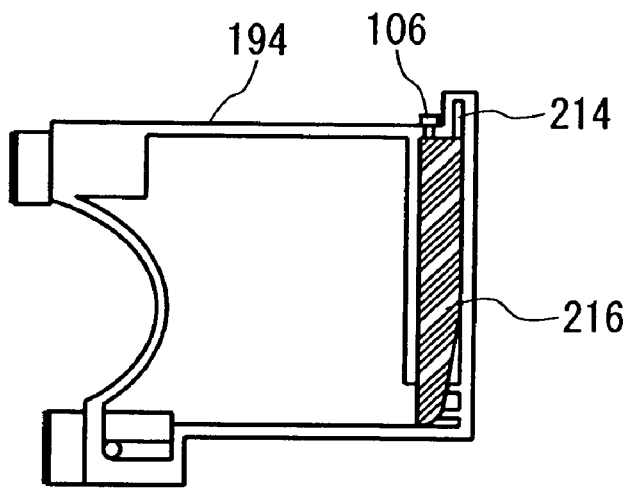
FIG. 35(A)
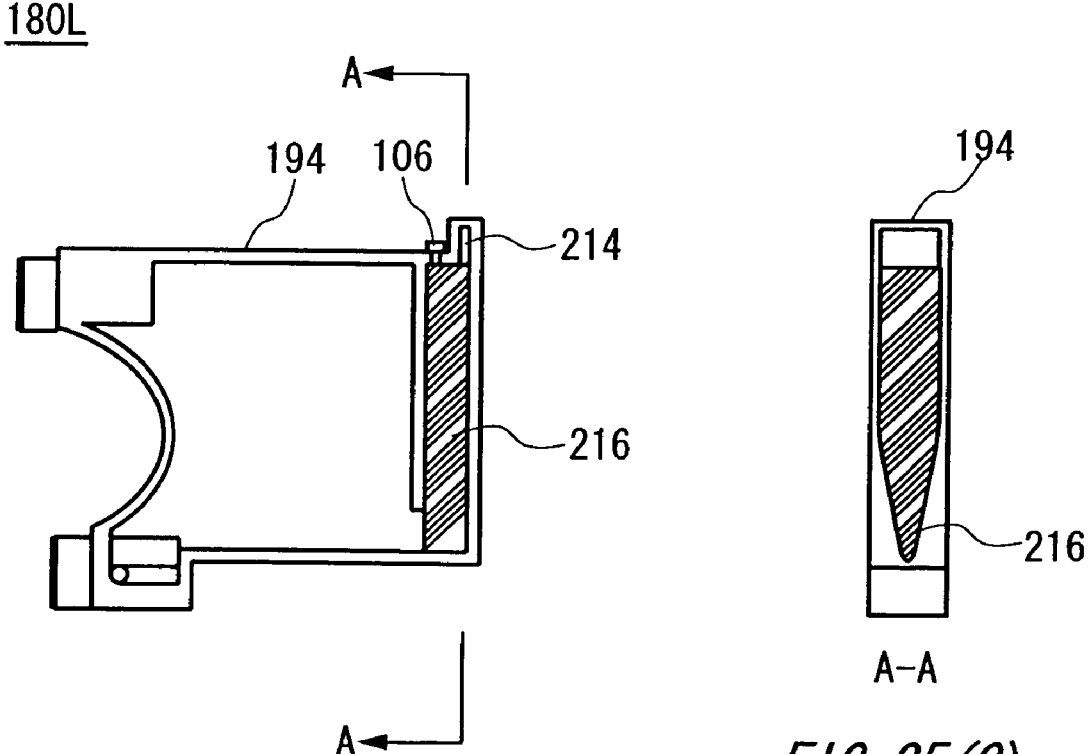
FIG. 35(B)
FIG. 35(C)

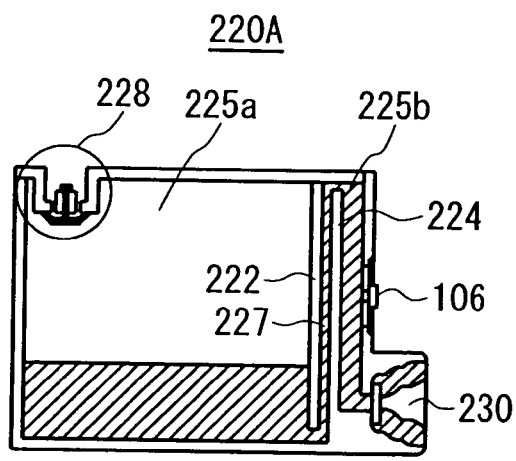 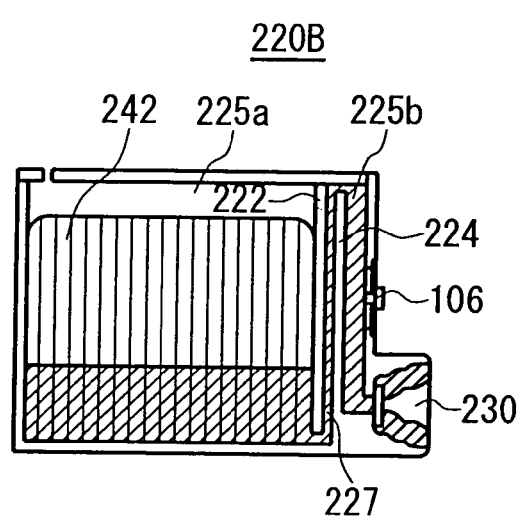
FIG. 36(A)  FIG. 36(B)
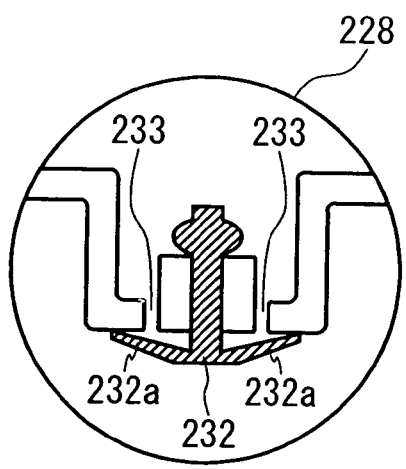 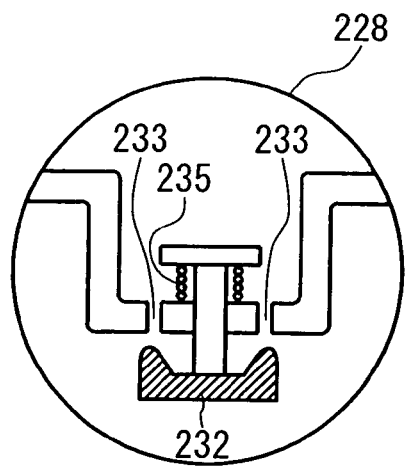
FIG. 36(C)  FIG. 36(D)

LIQUID CONSUMPTION STATUS DETECTING METHOD, LIQUID CONTAINER, AND INK CARTRIDGE

This patent application claims priority based on a Japanese patent applications, H. 11-139683 filed on May 20, 1999, H. 11-147538 filed May 27, 1999 and H. 11-256522 filed Sep. 10, 1999, the contents of which are incorporated herein by reference.

BACKGROUND OF THE INVENTION

1. Field of the Invention

The present invention relates to a liquid container equipped with a piezoelectric apparatus therein which detects the consumption state of liquid inside a liquid container which houses the liquid, by means of detecting change of the level of the acoustic impedance, especially detecting the change of the resonant frequency. More particularly, the present invention relates to the ink cartridge for use with an ink-jet recording apparatus which performs the printing operation by discharging ink droplets from a nozzle opening, in a manner such that ink in a pressure generating chamber is compressed by a pressure generating means corresponding to printing data.

2. Description of the Related Art

An ink cartridge mounted on an ink-jet type recording apparatus is taken as an example of a liquid container and is described below. In general, an ink-jet recording apparatus comprises: a carriage equipped with an ink-jet type recording head comprised of a pressure generating means which compresses a pressure generating chamber and a nozzle opening which discharges the compressed ink from a nozzle opening in the form of ink droplets; and an ink tank which houses ink supplied to the recording head through a passage, and is structured such that the printing operation can be performed continuously. In general, the ink tank is structured as a cartridge that can be detached from the recording apparatus, so that a user can easily replace it at the time when the ink is used up.

Conventionally, as a method of controlling the ink consumption of the ink cartridge, a method is known of controlling the ink consumption by means of a calculation in which the counted number of ink droplets discharged by the recording head and the amount of ink sucked in a maintenance process of the printing head are integrated by software, and another method of controlling the ink consumption in which the time at which the ink is actually consumed is detected by directly mounting to the ink cartridge two electrodes for use in detecting the liquid surface, and so forth.

However, in the calculation-based method of controlling the ink consumption by integrating the discharged number of ink droplets and the amount of ink or the like by the software, the pressure inside the ink cartridge and the viscosity of the ink change depending on usage environment such as ambient temperature and humidity, elapsed time after an ink cartridge has been opened for use, and usage frequency at a user side. Thus, a problem is caused where a considerable error occurs between the calculated ink consumption and the actual ink consumption. Moreover, another problem is caused in which the actual amount of ink remaining is not known because once the same cartridge is removed and then mounted again, the integrated counted value is reset.

On the other hand, in the method of controlling by electrodes the time at which the ink is consumed, the remaining amount of ink can be controlled with high reliability since the actual ink consumption can be detected at one point. However, in order that the liquid surface of the ink can be detected, the ink need be conductive, so suitable types of ink for use are very limited. Moreover, a problem is caused in that a fluid-tight structure between the electrodes and the cartridge might be complicated. Moreover, since precious metal is usually used as the electrode material, which is highly conductive and erosive, manufacturing costs of the ink cartridge increases thereby. Moreover, since it is necessary to attach the two electrodes to two separate positions of the ink cartridge, the manufacturing process increases, thus causing a problem which increases the manufacturing costs.

SUMMARY OF THE INVENTION

Therefore, it is an object of the present invention to provide a liquid consumption status detecting method and liquid container capable of accurately detecting a liquid consumption status and dispensing with a complicated sealing structure. It is another object of the present invention to provide a liquid consumption status detection methods which is not influenced by the unstable measuring signal generated at the early stage of the measuring of the liquid consumption status. It is a further object of the present invention to provide the liquid consumption status detection method which can reduce the time for detecting the liquid consumption status. It is still a further object of the present invention to provide a control circuit for a measuring apparatus to realize the above mentioned detection method. These objects are achieved by combinations described in the independent claims. The dependent claims define further advantageous and exemplary combinations of the present invention.

According to the first embodiment of the present invention, a method of detecting a consumption status of liquid contained in a liquid container is provided such that the method comprises steps of: preparing a detection device having a piezoelectric element and attaching the detection device on a desired position of the liquid container so that at least a part of the detection device contacting the liquid; measuring a residual vibration of the detection device; and detecting the consumption status of the liquid contained in the liquid container on the basis of a result of the measurement of the residual vibration.

The detection method may further comprise a step of activating the detection device to cause a vibration. The detection method can be provided such that the residual vibration measurement step comprises a step of measuring a frequency of the residual vibration. The detection method can be provided such that the residual vibration measurement step comprises a step of measuring a resonance frequency of the liquid surrounding the detection device.

The detection method can be provided such that the measurement step is operated after a predetermined time period has elapsed from the activation step. The detection method can be provided such that the measurement step is operated after the vibrations of the detection device several times. The detection method can be provided such that the measurement step comprises a step of measuring a time period in between a predetermined plurality of peaks of the residual vibration. The detection method can be provided such that the measurement step comprises a step of measuring a number of peaks of the residual vibration within a predetermined time period.

The detection method can be provided such that the measurement step comprises a step of measuring a counter electromotive voltage generated by the detection device in accordance with the residual vibration thereof. The detection method may further comprise steps of: measuring previously a first frequency value of the residual vibration of the detection device when the liquid container is full of liquid, the frequency is regarded as a reference frequency value; measuring a second frequency value of the residual vibration of the detection device when liquid in the liquid container is consumed; comparing the reference frequency with the second frequency; and judging the consumption status of the liquid contained in the liquid container in accordance with a result of the comparing step.

The detection method can be provided such that the residual vibration frequency measurement step comprises a step of measuring a plurality of resonance frequency modes of the residual vibration of the detection device. The detection method can be provided such that the measurement step comprises steps of measuring a first and a second resonance frequency modes, and recognizing the two resonance frequency modes as a single pattern.

According to the second aspect of the present invention, a liquid container is provided such that the liquid container comprises: a housing containing therein liquid; a liquid supply opening formed in the housing; and a detection device having a piezoelectric element, the detection device generating a detection signal in accordance with a residual vibration of the piezoelectric element, the detection signal indicating a consumption status of the liquid contained in the housing.

The liquid container can be provided such that the detection device is activated to generate a vibration. The liquid container can be provided such that the detection signal represents a frequency value of the residual vibration of the detection device. The liquid container can be provided such that the detection signal represents a resonance frequency of the liquid surrounding the detection device. The liquid container can be provided such that the detection device vibrates at at least one resonance frequency mode.

The liquid container can be provided such that the detection signal represents a counter electromotive voltage generated by the detection device in accordance with the residual vibration thereof. The liquid container may further comprise a memory device mounted on the housing for storing information of the liquid consumption status detected by the detection device. The liquid container can be provided such that the liquid container is an ink cartridge for an ink jet printer.

According to the third aspect of the present invention, a detection control circuit for detecting a consumption status of liquid contained in a liquid container by a detection device having a piezoelectric element can be provided such that the circuit comprises: a measurement circuit segment for measuring a residual vibration of the detection device; and a detection circuit segment receiving a signal from the measurement circuit segment and outputting a signal indicative of the consumption status of the liquid contained in the liquid container on the basis of the output signal of the measurement circuit segment.

The detection control circuit can be provided such that the measurement circuit segment measures a frequency of the residual vibration of the detection device. The detection control circuit can be provided such that the measurement circuit segment measures at least one resonance frequency of the liquid surrounding the detection device. The detection control circuit can be provided such that the measurement circuit segment measures a counter electromotive voltage generated by the detection device in accordance with the residual vibration thereof.

The detection control circuit can be provided such that the measurement circuit segment comprises an amplifier, the amplifier comprises a PNP type transistor and a NPN type transistor which complementarily connecting with the PNP type transistor, and emitter of the PNP type transistor and an emitter of the NPN type transistor connect with each other. A drive voltage generated between a point connecting between the emitter of the NPN type transistor and the PNP type transistor and the ground may be applied to the detection device.

The detection control circuit can be provided such that the measurement circuit segment comprises an amplifier, the amplifier comprises a P-channel field effect transistor and a N-channel field effect transistor which complementarily connecting with the P-channel field effect transistor, and a source of the P-channel transistor and a source of the N-channel transistor connect with each other.

The detection control circuit can be provided such that a drive voltage generated between the source of the P-channel FET and the N-channel FET is applied to the detection device. The detection control circuit can be provided such that the detection circuit segment comprises a counter for counting the number of the vibrations of the residual vibration within a predetermined time period, and the detection circuit segment judges the liquid consumption status in accordance with the counted value. The detection control circuit can be provided such that the detection circuit segment comprises a counter for counting a number of clocks within a time period where the residual vibration vibrates a predetermined number of times, the clock has a cycle shorter than the vibration cycle of the residual vibration.

The detection control circuit can be provided such that the detection circuit starts counting the number of vibration of the residual vibration after a predetermined number of vibrations of the residual vibration has occurred. The detection control circuit can be provided such that the detection circuit segment outputs a signal representing whether the liquid container connects with the measurement circuit.

The detection control circuit can be provided such that the measurement circuit segment further comprises a plurality of amplifiers connecting with a respective one of a plurality of the detection devices to supply a drive voltage, and the detection circuit segment receives a plurality of signals from the measurement circuit segment corresponding to the respective detection device and outputting a plurality of signals indicative of the consumption status of the liquid contained in the liquid container on the basis of each of the output signals of the measurement circuit segment.

The detection control circuit may further comprise a control circuit segment for controlling an operation to consume the liquid contained in the liquid container in accordance with the output signal of the detection circuit segment. The detection control circuit can be provided such that the control circuit segment comprises an information memory control circuit segment for reading out the liquid consumption status stored in a memory device attached to the liquid container and writing in the memory device information relating to the liquid consumption status detected by the detection circuit segment.

The detection control circuit can be provided such that the liquid container is an ink cartridge for an ink jet printer ejecting ink droplets from a print head, and the control circuit segment comprising a counter for counting number of ink droplets ejecting from the printhead. The detection control circuit can be provided such that the detection circuit segment adjust a parameter of an equation for converting the counted number of the ink droplets into an amount of liquid consumption in accordance with the consumption status.

According to the fourth aspect of the present invention, a computer-readable recording medium storing thereon a program for a control circuit installed in an ink jet printer to detect a consumption status of ink contained in an ink cartridge by using a detection device having a piezoelectric element attached on a desired position of the ink cartridge can be provided such that the program comprises steps of: measuring a residual vibration of the detection device; and detecting the consumption status of the ink contained in the ink cartridge on the basis of a result of the measurement of the residual vibration.

The recording medium may further comprise a step of activating the detection device to cause a vibration. The recording medium can be provided such that the residual vibration measurement step comprises a step of measuring a frequency of the residual vibration. The recording medium can be provided such that the residual vibration measurement step comprises a step of measuring a resonance frequency of ink surrounding the detection device.

This summary of the invention does not necessarily describe all the necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIGS. 1A, 1B and 1C shows details of the actuator 106.
FIGS. 2A, 2B, 2C, 2D, 2E, and 2F shows periphery and equivalent circuits of the actuator 106.
FIG. 4 shows the relation between a residual quantity of ink inside the ink cartridge and combinations of patterns of a primary mode and a secondary mode of the resonant frequency.

FIGS. 35A, 35B and 35C show another embodiments of the ink cartridge 180 shown in FIG. 34C.
FIGS. 36A, 36B, 36C and 36D show still another embodiment of the ink cartridge using the actuator 106.

DESCRIPTION OF THE PREFERRED EMBODIMENTS

Figure 3A:
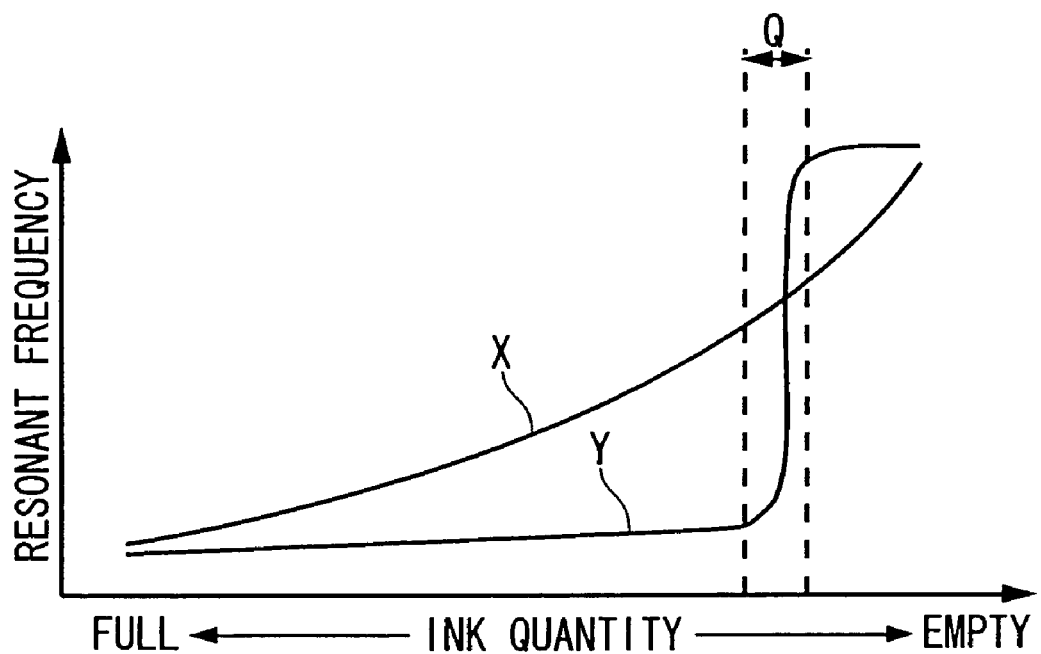
FIGS. 3A and 3B show relationship between the ink density and ink resonant frequency detected by the actuator 106.

The invention will now be described based on the preferred embodiments, which do not intend to limit the scope of the present invention, but exemplify the invention. All of the features and the combinations thereof described in the embodiment are not necessarily essential to the invention.

The basic concept of the present invention is to detect a state of the liquid inside a liquid container by utilizing vibration phenomena. The state of the liquid includes whether or not the liquid in the liquid container is empty, amount of the liquid, level of the liquid, types of the liquid and combination of liquids. Several specific methods for detection of the state of the liquid inside the liquid container utilizing vibration phenomena are considered. For example, a method is considered in which the medium and the change of its state inside the liquid container are detected in such a manner that an elastic wave generating means generates an elastic wave inside the liquid container, and then the reflected wave which is thus reflected by the liquid surface or a wall disposed counter thereto is captured. There is another method in which a change of acoustic impedance is detected by vibrating characteristics of a vibrating object. As a method utilizing the change of the acoustic impedance, a vibrating portion of a piezoelectric device or an actuator having a piezoelectric element therein is vibrated. Thereafter, a resonant frequency or an amplitude of the back electromotive force waveform is detected by measuring the back electromotive force which is caused by residual vibration which remains in the vibrating portion, so as to detect the change of the acoustic impedance. As another method utilizing the change of the acoustic impedance, the impedance characteristic or admittance characteristic of the liquid is measured by a measuring apparatus such as an impedance analyzer and a transmission circuit, so that the change of a current value or a voltage value, or the change of the current value or voltage value due to the frequency caused by the vibration given to the liquid is measured. The operational principles of the elastic wave generating means and the piezoelectric device or actuator will be described at a later stage.

FIG. 1 and FIG. 2 shows a detail and equivalent circuit of an actuator 106, which is an embodiment of the piezoelectric device of the present invention. The actuator explained herein is used at least for the method which detects the liquid consumption status in the liquid container by detecting a change in acoustic impedance. Especially, the actuator is used for the method which detects the liquid consumption status in the liquid container by detecting at least the change in acoustic impedance by detecting the resonant frequency from residual vibration. FIG. 1(A) is an enlarged plan view of the actuator 106. FIG. 1(B) shows a B—B cross-section of the actuator 106. FIG. 1(C) shows a C—C cross-section of the actuator 106. FIG. 2(A) and FIG. 2(B) shows an equivalent circuit of the actuator 106. Each of FIG. 2(C) and FIG. 2(D) shows the actuator 106 and around the actuator 106, and the equivalent circuit of the actuator 106 when an ink is filled in the ink cartridge. FIG. 2(E) and FIG. 2(F) shows the actuator 106 and around the actuator 106, and the equivalent circuit of the actuator 106 when there is no ink in the ink cartridge.

The actuator 106 includes a base plate 178, a vibrating plate 176, a piezoelectric layer 160, an upper electrode 164 and a lower electrode 166, an upper electrode terminal 168, a lower electrode terminal 170, and a supplementary electrode 172. The base plate 178 has a circular shape opening 161 on approximately its center. The vibrating plate 176 is provided on one of the face, which is called as "right side" in following, of the base plate 178 such as to cover the opening 161. The piezoelectric layer 160 is disposed on right side of the surface of the vibrating plate 176. The upper electrode 164 and the lower electrode 166 sandwich the piezoelectric layer 160 from both sides. The upper electrode terminal 168 connects to the upper electrode 164 electrically. The lower electrode terminal 170 connects to the lower electrode 166 electrically. The supplementary electrode 172 is disposed between the upper electrode 164 and the upper electrode terminal 168 and connects both of the upper electrode 164 and the upper electrode terminal 168. Each of the piezoelectric layer 160, upper electrode 164, and the lower electrode 166 has a circular portion as its main portion. Each of the circular portion of the piezoelectric layer 160, the upper electrode 164, and the lower electrode 166 form a piezoelectric element.

The vibrating plate 176 is formed on the right side of the surface of the base plate 178 to cover the opening 161. The cavity 162 is formed by the portion of the vibrating plate 176, which faces the opening 161, and the opening 161 of the on the surface of the base plate 178. The face of the base plate 178 which is opposite side of the piezoelectric element, called as "back side" in following, is faced with the liquid container side. The cavity 162 is constructed such that the cavity 162 contacts with liquid. The vibrating plate 176 is mounted on the base plate 178 such that the liquid does not leak to the right side of the surface of the base plate 178 even if the liquid enters inside the cavity 162.

The lower electrode 166 is located on the right side of the vibrating plate 176, that is, opposite side against the liquid container. The lower electrode 166 is provided on the vibrating plate 176 such that the center of the circular portion of the lower electrode 166, which is a main portion of the lower electrode 166, and the center of the opening 161 substantially matches. The area of the circular portion of the lower electrode 166 is set to be smaller than the area of the opening 161. The piezoelectric layer 160 is formed on the right side of the surface of the lower electrode 166 such that the center of the circular portion and the center of the opening 161 substantially match. The area of the circular portion of the piezoelectric layer 160 is set to be smaller than the area of the opening 161 and larger than the area of the circular portion of the lower electrode 166.

The upper electrode 164 is formed on the right side of the surface of the piezoelectric layer 160 such that the center of the circular portion, which is a piezoelectric layer 160, and the center of the opening 161 substantially match. The area of the circular portion of the upper electrode 164 is set to be smaller than the area of the circular portion of the opening 161 and the piezoelectric layer 160 and larger than the area of the circular portion of the lower electrode 166.

Therefore, the main portion of the piezoelectric layer 160 has a structure to be sandwiched by the main portion of the upper electrode 164 and the main portion of the lower electrode each from right side face and back side face, and thus the main portion of the piezoelectric layer 160 can effectively drive and deform the piezoelectric layer 160. The circular portion, which is a main portion of each of the piezoelectric layer 160, the upper electrode 164, and the lower electrode 166, forms the piezoelectric element in the actuator 106. As explained above, the electric element contacts with the vibrating plate. Within the circular portion of the upper electrode 164, circular portion of the piezoelectric layer 160, the circular portion of the lower electrode, and the opening 161, the opening 161 has the largest area. By this structure, the vibrating region which actually vibrates within the vibrating plate is determined by the opening 161. Furthermore, each of the circular portion of the upper electrode 164 and the circular portion of the piezoelectric layer 160 and the circular portion of the lower electrode has smaller area than the area of the opening 161. The vibrating plate becomes easily vibrateable. Within the circular portion of the lower electrode 166 and the circular portion of the upper electrode 164 which connects to the piezoelectric layer 160 electrically, the circular portion of the lower electrode 166 is smaller than the circular portion of the upper electrode 164. Therefore, the circular portion of the lower electrode 166 determines the portion which generates the piezoelectric effect within the piezoelectric layer 160.

The center of the circular portion of the piezoelectric layer 160, the upper electrode 164, and the lower electrode 166, which form the piezoelectric element, substantially match to the center of the opening 161. Moreover, the center of the circular shape opening 161, which determines the vibrating section of the vibrating plate 176, is provided on the approximately center of the actuator 106. Therefore, the center of the vibrating section of the actuator 106 matches to the center of the actuator 106. Because the main portion of the piezoelectric element and the vibrating section of the vibrating plate 176 have a circular shape, the vibrating section of the actuator 106 is symmetrical about a center of the actuator 106.

Because the vibrating section is symmetrical about a center of the actuator 106, the excitation of the unnecessary vibration occurred owing to the asymmetric structure can be prevented. Therefore, the accuracy of detecting the resonant frequency increases. Furthermore, because the vibrating section is symmetric about the center of the actuator 106, the actuator 106 is easy to manufacture, and thus the unevenness of the shape for each of the piezoelectric element can be decreased. Therefore, the unevenness of the resonant frequency for each of the piezoelectric element 174 decreases. Furthermore, because the vibrating section has an isotropic shape, the vibrating section is difficult to be influenced by the unevenness of the fixing during the bonding process. That is, the vibrating section is bonded to the liquid container uniformly. Therefore, the actuator 106 is easy to assemble to the liquid container.

Furthermore, because the vibrating section of the vibrating plate 176 has a circular shape, the lower resonant mode, for example, the primary resonant mode dominates on the resonant mode of the residual vibration of the piezoelectric layer 160, and thus the single peak appears on the resonant mode. Therefore, the peak and the noise can be distinguished clearly so that the resonant frequency can be clearly detected. Furthermore, the accuracy of the detection of the resonant frequency can be further increased by enlarging the area of the vibrating section of the circular shaped vibrating plate 176, because the difference of the amplitude of the counter electromotive force, and the difference of the amplitude of the resonant frequency that occurs depending on whether the liquid exists inside the liquid container, increase.

The displacement generated by the vibration of the vibrating plate 176 is larger than the displacement generated by the vibration of the base plate 178. The actuator 106 has a two layer structure that is constituted by the base plate 178 having a small compliance which means it is difficult to be displaced by the vibration, and the vibrating plate 176 having a large compliance which means it is easy to be displaced by the vibration. By this two layer structure, the actuator 106 can be reliably fixed to the liquid container by the base plate 178 and at the same time the displacement of the vibrating plate 176 by the vibration can be increased. Therefore, the difference of the amplitude of the counter electromotive force and the difference of the amplitude of the resonant frequency depends on whether the liquid exists inside the liquid container increases, and thus the accuracy of the detection of the resonant frequency increases. Furthermore, because the compliance of the vibrating plate 176 is large, the attenuation of the vibration decreases so that the accuracy of the detection of the resonant frequency increases. The node of the vibration of the actuator 106 locates on the periphery of the cavity 162, that is, around the margin of the opening 161.

The upper electrode terminal 168 is formed on the right side of the surface of the vibrating plate 176 to be electrically connected to the upper electrode 164 through the supplementary electrode 172. The lower electrode terminal 170 is formed on the right side of the surface of the vibrating plate 176 to be electrically connected to the lower electrode 166. Because the upper electrode 164 is formed on the right side of the piezoelectric layer 160, there is a difference in depth that is equal to the sum of the thickness of the piezoelectric layer 160 and the thickness of the lower electrode 166 between the upper electrode 164 and the upper electrode terminal 168. It is difficult to fill this difference in depth only by the upper electrode 164, and even it is possible to fill the difference in depth by the upper electrode 164, the connection between the upper electrode 164 and the upper electrode terminal 168 becomes weak so that the upper electrode 164 will be cut off. Therefore, this embodiment uses the supplementary electrode 172 as a supporting member to connects the upper electrode 164 and the upper electrode terminal 168. By this supplementary electrode 172, both of the piezoelectric layer 160 and the upper electrode 164 are supported by the supplementary electrode 172, and thus the upper electrode 164 can have desired mechanical strength, and also the upper electrode 164 and the upper electrode terminal 168 can be firmly connected.

The piezoelectric element and the vibrating section which faces to the piezoelectric element within the vibrating plate 176 constitute the vibrating section which actually vibrates in the actuator 106. Moreover, it is preferable to form the actuator 106 in one body by firing together the member included in the actuator 106. By forming the actuator 106 as one body, the actuator 106 becomes easy to be handled. Further, the vibration characteristic increases by increasing the strength of the base plate 178. That is, by increasing the strength of the base plate 178, only the vibrating section of the actuator 106 vibrates, and the portion other than the vibrating section of the actuator 106 does not vibrates. Furthermore, the prevention of the vibration of the portion other than the vibrating section of the actuator 106 can be achieved by increasing the strength of the base plate 178 and at the same time forming the actuator 106 as thinner and smaller as possible and forming the vibrating plate 176 as thinner as possible.

It is preferable to use lead zirconate titanate (PZT), lead lanthanum zirconate titanate (PLZT), or piezoelectric membrane without using lead as a material for the piezoelectric layer 160. It is preferable to use zirconia or alumina as a material of the base plate 178. Furthermore, it is preferable to use the same material as base plate 178 for a material of vibrating plate 176. The metal such as gold, silver, copper, platina, aluminum, and nickel having an electrical conductivity can be used for the material of the upper electrode 164, the lower electrode 166, the upper electrode terminal 168, and the lower electrode terminal 170.

The actuator 106 constructed as explained above can be applied to the container which contains liquid. For example, the actuator 106 can be mounted on an ink cartridge used for the ink jet recording apparatus, an ink tank, or a container which contains washing liquid to wash the recording head.

The actuator 106 shown in the FIG. 1 and FIG. 2 is mounted on the predetermined position on the liquid container so that the cavity 162 can contact with the liquid contained inside the liquid container. When the liquid container is filled with liquid sufficiently, the inside and outside of the cavity 162 is filled with liquid. On the other hand, if the liquid inside the liquid container is consumed and the liquid level is decreased under the mounting position of the actuator, there are conditions that liquid does not exist inside the cavity 162 or that liquid is remained only in the cavity 162 and air exists outside the cavity 162. The actuator 106 detects at least the difference in the acoustic impedance occurred by this change in condition. By this detection of the difference in acoustic impedance, the actuator 106 can detect whether the liquid is sufficiently filled in the liquid container or liquid is consumed more than the predetermined level. Furthermore, the actuator 106 can detect the type of the liquid inside the liquid container.

The principle of the detection of the liquid level by the actuator will be explained.

To detect the acoustic impedance of a medium, an impedance characteristic or an admittance characteristic is measured. To measure the impedance characteristic or the admittance characteristic, for example, a transmission circuit can be used. The transmission circuit applies a constant voltage on the medium and measures a current flow through the medium with changing a frequency. The transmission circuit provides a constant current to the medium and measures a voltage applied on the medium with changing a frequency. The change in current value and the voltage value measured at the transmission circuit shows the change in acoustic impedance. Furthermore, the change in a frequency fm, which is a frequency when the current value or the voltage value becomes maximum or minimum, also shows the change in acoustic impedance.

Other than the method shown above, the actuator can detect the change in the acoustic impedance of the liquid using the change only in the resonant frequency. The piezoelectric element, for example, can be used in a case of using the method of detecting the resonant frequency by measuring the counter electromotive force generated by the residual vibration, which is remained in the vibrating section after the vibration of the vibrating section of the actuator, as a method of using the change in the acoustic impedance of the liquid. The piezoelectric element is an element which generates the counter electromotive force by residual vibration remained in the vibrating section of the actuator. The magnitude of the counter electromotive force changes with the amplitude of the vibrating section of the actuator. Therefore, the larger the amplitude of the vibrating section of the actuator, the easier to detect the resonant frequency. Moreover, depending on the frequency of the residual vibration at the vibrating section of the actuator, the period, on which the magnitude of the counter electromotive force changes, changes. Therefore, the frequency of the vibrating section of the actuator corresponds to the frequency of the counter electromotive force. Here, the resonant frequency means the frequency when the vibrating section of the actuator and the medium, which contacts to the vibrating section, are in a resonant condition.

To obtain the resonant frequency fs, the waveform obtained by measuring the counter electromotive force when the vibrating section and the medium are in resonant condition is Fourier transformed. Because the vibration of the actuator is not a displacement for only one direction, but the vibration involves the deformation such as deflection and extension, the vibration has various kinds of frequency including the resonant frequency fs. Therefore, the resonant frequency fs is judged by Fourier transforming the waveform of the counter electromotive force when the piezoelectric element and the medium are in the resonant condition and then specifying the most dominating frequency components.

The frequency fm is a frequency when the admittance of the medium is maximum or the impedance is minimum. The frequency fm is different from the resonant frequency fs with little value because of the dielectric loss and the mechanical loss. However, the frequency fm is generally used as substitution for resonant frequency because it needs time for deriving the resonant frequency fs from the frequency fm which is actually measured. By inputting output of the actuator 106 to the transmission circuit, the actuator 106 can at least detect the acoustic impedance.

It is proved by the experiment that there is almost no differences with the resonant frequency obtained by the method, which measures the frequency fm by measuring the impedance characteristic and admittance characteristic of the medium, and the method, which measures the resonant frequency fs by measuring the counter electromotive force generated by the residual vibration at the vibrating section of the actuator.

The vibrating region of the actuator 106 is a portion which constitutes the cavity 162 that is determined by the opening 161 within the vibrating plate 176. When liquid is sufficiently filled in the liquid container, liquid is filled in the cavity 162, and the vibrating region contacts with liquid inside the liquid container. When liquid does not exists in the liquid container sufficiently, the vibrating region contacts with the liquid which is remained in the cavity inside the liquid container, or the vibrating region does not contacts with the liquid but contacts with the gas or vacuum.

The cavity 162 is provided on the actuator 106 of the present invention, and it can be designed that the liquid inside the liquid container remains in the vibrating region of the actuator 106 by the cavity 162. The reason will be explained as follows.

Depending on the mounting position and mounting angle of the actuator 106 on the liquid container, there is a case in which the liquid attaches to the vibrating region of the actuator even if the liquid level in the liquid container is lower than the mounting position of the actuator. When the actuator detects the existence of the liquid only from the existence of the liquid on the vibrating region, the liquid attached to the vibrating region of the actuator prevents the accurate detection of the existence of the liquid. For example, if the liquid level is lower than the mounting position of the actuator, and the drop of the liquid attaches to the vibrating region by the waving of the liquid caused by the shaking of the liquid container caused by the movement of the carriage, the actuator 106 will misjudge that there is enough liquid in the liquid container. In this way, the malfunction can be prevented by using the actuator having a cavity.

Furthermore, as shown in FIG. 2(E), the case when the liquid does not exit in the liquid container and the liquid of the liquid container remains in the cavity 162 of the actuator 106 is set as the threshold value of the existence of the liquid. That is, if the liquid does not exist around the cavity 162, and the amount of the liquid in the cavity is smaller than this threshold value, it is judged that there is no ink in the liquid container. If the liquid exist around the cavity 162, and the amount of the liquid is larger than this threshold value, it is judged that there is ink in the liquid container. For example, when the actuator 106 is mounted on the side wall of the liquid container, it is judged that there is no ink in the liquid container when the liquid level inside the liquid container is lower than the mounting position of the actuator 106, and it is judged that there is ink inside the liquid container when the liquid level inside the liquid container is higher than the mounting position of the actuator 106. By setting the threshold value in this way, the actuator 106 can judge that there is no ink in the liquid container even if the ink in the cavity is dried and disappeared. Furthermore, the actuator 106 can judge that there is no ink in the liquid container even if the ink attaches to the cavity again by shaking of the carriage after the ink in the cavity disappears because the amount of the ink attaches to the cavity again does not exceed the threshold value.

The operation and the principle of detecting the liquid condition of the liquid container from the resonant frequency of the medium and the vibrating section of the actuator 106 obtained by measuring the counter electromotive force will be explained reference to FIG. 1 and FIG. 2. A voltage is applied on each of the upper electrode 164 and the lower electrode 166 through the upper electrode terminal 168 and the lower electrode terminal 170. The electric field is generated on the portion of the piezoelectric layer 160 where the piezoelectric layer 160 is sandwiched by the upper electrode 164 and the lower electrode 166. By this electric field, the piezoelectric layer 160 deforms. By the deformation of the piezoelectric layer 160, the vibrating region within the vibrating plate 176 deflects and vibrates. For some period after the deformation of the piezoelectric layer 160, the vibration with deflection remains in the vibrating section of the actuator 106.

The residual vibration is a free oscillation of the vibrating section of the actuator 106 and the medium. Therefore, the resonant condition between the vibrating section and the medium can be easily obtained by applying the voltage of a pulse wave or a rectangular wave on the piezoelectric layer 160. Because the residual vibration vibrates the vibrating section of the actuator 106, the residual vibration also deforms the piezoelectric layer 160. Therefore, the piezoelectric layer 160 generates the counter electromotive force. This counter electromotive force is detected through the upper electrode 164, the lower electrode 166, the upper electrode terminal 168, and the lower electrode terminal 170. Because the resonant frequency can be specified by this detected counter electromotive force, the liquid consumption status in the liquid container can be detected.

Generally, the resonant frequency fs can be expressed as the following:

$$fs = 1/(2*\pi*(M*Cact)^{1/2}) \quad (1)$$

where M denotes the sum of an inertance of the vibrating section Mact and an additional inertance M'; Cact denotes a compliance of the vibrating section.

FIG. 1(C) shows a cross section of the actuator 106 when the ink does not exist in the cavity in the present embodiment. FIG. 2(A) and FIG. 2(B) shows the equivalent circuit of the vibrating section of the actuator 106 and the cavity 162 when the ink does not exist in the cavity.

The Mact is obtained by dividing the product of the thickness of the vibrating section and the density of the vibrating section by the area of the vibrating section. Furthermore, as shown in the FIG. 2(A), the Mact can be expressed as following in detail.

$$Mact = Mpzt + Melectrode1 + Melectrode2 + Mvib \quad (2)$$

Here, Mpzt is obtained by dividing the product of the thickness of the piezoelectric layer 160 in the vibrating section and the density of the piezoelectric layer 160 by the area of the piezoelectric layer 160. Melectrode1 is obtained by dividing the product of the thickness of the upper electrode 164 in the vibrating section and the density of the upper electrode 164 by the area of the upper electrode 164. Melectrode2 is obtained by dividing the product of the thickness of the lower electrode 166 in the vibrating section and the density of the lower electrode 166 by the area of the lower electrode 166. Mvib is obtained by dividing the product of the thickness of the vibrating plate 176 in the vibrating section and the density of the vibrating plate 176 by the area of the vibrating region of the vibrating plate 176. However each of the size of the area of the vibrating region of the piezoelectric layer 160, the upper electrode 164, the lower electrode 166, and vibrating plate 176 have a relationship as shown above, the difference among each of the area of the vibrating region is prefer to be microscopic to enable the calculation of the Mact from the thickness, density, and area as whole of the vibrating section. Moreover, it is preferable that the portion other than the circular portion which is a main portion of each of the piezoelectric layer 160, the upper electrode 164, and the lower electrode 166 is microscopic so that it can be ignored compared to the main portion. Therefore, Mact is sum of the inertance of the each of the vibrating region of the upper electrode 164, the lower electrode 166, the piezoelectric layer 160, and the vibrating plate 176 in the actuator 106. Moreover, the compliance Cact is a compliance of the portion formed by the each of the vibrating region of the upper electrode 164, the lower electrode 166, the piezoelectric layer 160, and the vibrating plate 176.

FIG. 2(A), FIG. 2(B), FIG. 2(D), and FIG. 2(F) show the equivalent circuit of the vibrating section of the actuator 106 and the cavity 162. In these equivalent circuits, Cact shows a compliance of the vibrating section of the actuator 106. Each of the Cpzt, Celectrode1, Celectrode2, and Cvib shows the compliance of the vibrating section of the piezoelectric layer 160, the upper electrode 164, the lower electrode 166, and the vibrating plate 176. Cact can be shown as following equation.

$$1/Cact = (1/Cpzt) + (1/Celectrode1) + (1/Celectrode2) + (1/Cvib) \quad (3)$$

From the equation (2) and (3), FIG. 2(A) can be expressed as FIG. 2(B).

The compliance Cact shows the volume which can accept the medium by the deformation generated by the application of the pressure on the unit area of the vibrating section. In other words, the compliance Cact shows the easiness to be deformed.

FIG. 2(C) shows the cross section of the actuator 106 when the liquid is sufficiently filled in the liquid container, and the periphery of the vibrating region of the actuator 106 is filled with the liquid. The M'max shown in FIG. 2(C) shows the maximum value of the additional inertance when the liquid is sufficiently filled in the liquid container, and the periphery of the vibrating region of the actuator 106 is filled with the liquid. The M'max can be expressed as $$M'\text{max} = (\pi*\rho/(2*k^3))*(2*(2*k*a)^3/(3*\pi))/(\pi*a^2)^2 \quad (4)$$

where "a" denotes the radius of the vibrating section; ρ denotes the density of the medium; and k denotes the wave number. The equation (4) applies when the vibrating region of the actuator 106 is a circular shape having the radius of "a". The additional inertance M' shows the quantity that the mass of the vibrating section is increased virtually by the effect of the medium which exists around the vibrating section.

As shown in equation (4), the M'max can changes significantly by the radius of the vibrating section "a" and the density of the medium ρ.

The wave number k can be expressed by following equation.

$$k = 2*\pi*\text{fact}/c \quad (5)$$

where fact denotes the resonant frequency of the vibrating section when the liquid does not contact with the vibrating section; and "c" denotes the speed of the sound propagate through the medium.

FIG. 2(D) shows an equivalent circuit of the vibrating section of the actuator 106 and the cavity 162 as in the case of FIG. 2(C) when the liquid is sufficiently filled in the liquid container, and the periphery of the vibrating region of the actuator 106 is filled with the liquid.

FIG. 2(E) shows the cross section of the actuator 106 when the liquid in the liquid container is consumed, and there is no liquid around the vibrating region of the actuator 106, and the liquid remains in the cavity 162 of the actuator 106. The equation (4) shows the maximum inertance M'max determined by such as the ink density ρ when the liquid container is filled with the liquid. On the other hand, if the liquid in the liquid container is consumed and liquid existed around the vibrating section of the actuator 106 becomes gas or vacuum with the liquid remaining in the cavity 162, the M' can be expressed as following equation.

$$M'=\rho*t/S \tag{6}$$

where t denotes the thickness of the medium related to the vibration; "S" denotes the area of the vibrating region of the actuator 106. If this vibrating region is a circular shape having a radius of "a", the "S" can be shown as $S=\pi*a^2$. Therefore, the additional inertance M' follows the equation (4) when the liquid is sufficiently filled in the liquid container, and the periphery of the vibrating region of the actuator 106 is filled with the liquid. The additional inertance M' follows the equation (6) when the liquid in the liquid container is consumed, there is no liquid around the vibrating region of the actuator 106, and the liquid remains in the cavity 162.

Here, as shown in FIG. 2(E), let the additional inertance M', when the liquid in the liquid container is consumed, there is no liquid around the vibrating region of the actuator 106, and the liquid remains in the cavity 162, be M'cav to distinguish with the additional inertance M'max, which is the additional inertance when the periphery of the vibrating region of the actuator 106 is filled with the liquid.

FIG. 2(F) shows an equivalent circuit of the vibrating section of the actuator 106 and the cavity 162 in the case of FIG. 2(E) when the liquid in the liquid container is consumed, and there is no liquid around the vibrating region of the actuator 106, and the liquid remains in the cavity 162 of the actuator 106.

Here, the parameters related to the status of the medium are density of the medium ρ and the thickness of the medium t in equation (6). When the liquid is sufficiently filled in the liquid container, the liquid contacts with the vibrating section of the actuator 106. When the liquid is insufficiently filled in the liquid container, the liquid is remained in the cavity, or the gas or vacuum contacts with the vibrating section of the actuator 106. If the additional inertance during the process of the shifting from the M'max of FIG. 2(C) to the M'var of FIG. 2(E) when the liquid around the actuator 106 is consumed, because the thickness of the medium "t" changes according to the containing status of the liquid in the liquid container, the additional inertance M'var changes, and resonant frequency also changes. Therefore, the existence of the liquid in the liquid container can be detected by specifying the resonant frequency. Here, if t=d, as shown in FIG. 2(E) and using the equation (6) to express the M'cav, the equation (7) can be obtained by substituting the thickness of the cavity "d" into the "t" in the equation (6).

$$M'cav=\rho*d/S \tag{7}$$

Moreover, if the medium are different types of liquid with each other, the additional inertance M' changes and resonant frequency fs also changes because the density ρ is different according to the difference of the composition. Therefore, the types of the liquid can be detected by specifying the resonant frequency fs. Moreover, when only one of the ink or air contacts with the vibrating section of the actuator 106, and the ink and air is not existing together, the difference in M' can be detected by calculating the equation (4).

FIG. 3(A) is a graph which shows the relationship between the ink quantity inside the ink tank and the resonant frequency fs of the ink and the vibrating section. Here, the case for the ink will be explained as an example of the liquid. The vertical axis shows the resonant frequency fs, and the horizontal axis shows the ink quantity. When the ink composition is constant, the resonant frequency increases according to the decreasing of the ink quantity.

When ink is sufficiently filled in the ink container, and ink is filled around the vibrating region of the actuator 106, the maximum additional inertance M'max becomes the value shown in the equation (4). When the ink is consumed, and there is no ink around the vibrating region of the actuator 106, and the ink remains in the cavity 162, the additional inertance M'var is calculated by the equation (6) based on the thickness of the medium "t". Because the "t" used in the equation (6) is the thickness of the medium related to the vibration, the process during which the ink is consumed gradually can be detected by forming the "d" (refer to FIG. 1(B)) of the cavity 162 of the actuator 106 as small as possible, that is, forming the thickness of the base plate 178 as sufficiently thinner as possible (refer to FIG. 2(C)). Here, let t-ink be the thickness of the ink involved with the vibration and t-ink-max be the value of t-ink when the additional inertance is M'max. For example, the actuator 106 is mounted on the bottom of the ink cartridge horizontally to the surface of the ink. If ink is consumed, and the ink level becomes lower than the height t-ink-max from the actuator 106, the M'var gradually changes according to the equation (6), and the resonant frequency fs gradually changes according to the equation (1). Therefore, until the ink level is within the range of "t", the actuator 106 can gradually detect the ink consumption status.

Furthermore, by enlarge or lengthen the vibrating section of the actuator 106 and arrange the actuator 106 along a lengthwise direction, the "S" in the equation (6) changes according to the change of ink level with ink consumption. Therefore, the actuator 106 can detect the process while the ink is gradually consumed. For example, the actuator 106 is mounted on the side wall of the ink cartridge perpendicularly to the ink surface. When the ink is consumed and the ink level reaches to the vibrating region of the actuator 106, because the additional inertance M' decreases with the decreasing of the ink level, the resonant frequency fs gradually increases according to the equation (1). Therefore, unless the ink level is within the range of the radius 2*a* of the cavity 162 (refer to FIG. 2(C)), the actuator 106 can gradually detect the ink consumption status.

The curve X in FIG. 3(A) shows the relationship between the ink quantity contained inside of the ink tank and the resonant frequency fs of the ink and the vibrating section when the vibrating region of the actuator 106 is formed sufficiently large or long. It can be understand that the resonant frequency fs of the ink and vibrating section gradually changes with the decrease of the ink quantity inside the ink tank.

In detail, the case when the actuator 106 can detect the process of the gradual consumption of the ink is the case when the liquid and gas having different density with each other are existed together and also involved with vibration. According to the gradual consumption of the ink, the liquid decreases with increasing of the gas in the medium involved with the vibration around the vibrating region of the actuator 106. For example, the case when the actuator 106 is mounted on the ink cartridge horizontally to the ink surface, and t-ink is smaller than the t-ink-max, the medium involved with the vibration of the actuator 106 includes both of the ink and the gas. Therefore, the following equation (8) can be obtained if the area of the vibrating region of the actuator 106 is "S" and the status when the additional inertance is below M'max in the equation (4) is expressed by additional mass of the ink and the gas.

$$M'=M'\text{air}+M'\text{ink}=\rho\text{air}*t\text{-air}/S+\rho\text{ink}*t\text{-ink}/S \qquad (8)$$

where M'max is an inertance of an air; M'ink is an inertance of an ink; ρair is a density of an air; ρink is a density of an ink; t-air is the thickness of the air involved with the vibration; and t-ink is the thickness of the ink involved with the vibration. In case when the actuator 106 is mounted on the ink cartridge approximately horizontally to the ink surface, the t-air increases and the t-ink decreases with the increase of the gas and the decrease of the ink within the medium involved with the vibration around the vibrating region of the actuator 106. The additional inertance M' gradually decreases, and the resonant frequency gradually increases by above changes of the t-air and the t-ink. Therefore, the ink quantity remained inside the ink tank or the ink consumption quantity can be detected. The equation (7) depends only on the density of the liquid because of the assumption that the density of the air is small compare to the density of the liquid so that the density of the air can be ignored.

When the actuator 106 is provided on the ink cartridge substantially perpendicular to the ink surface, the status can be expressed as the equivalent circuit, not shown in the figure, on which the region, where the medium involved with the vibration of the actuator 106 is ink only, and the region, where the medium involved with the vibration of the actuator 106 is gas, can be expressed as parallel circuit. If the area of the region where the medium involved with the vibration of the actuator 106 is ink only, expressed as Sink, and if the area of the region where the medium involved with the vibration of the actuator 106 is gas only, expressed as Sair, the following equation (9) can be obtained.

$$1/M'=1/M'\text{air}+1/M'\text{ink}=S\text{air}/(\rho\text{air}*t\text{-air})+S\text{ink}/(\rho\text{ink}*t\text{-ink}) \qquad (9)$$

The equation (9) can be applied when the ink is not held in the cavity of the actuator 106. The case when the ink is held in the cavity can be calculated using the equation (7), (8), and (9).

In the case when the thickness of the base plate 178 is thick, that is, the depth of the cavity 162 is deep and "d" is comparatively close to the thickness of the medium t-ink-max, or in the case when using an actuator having a very small vibrating region compared to height of the liquid container, the actuator does not detect the process of the gradual decrease of the ink but actually detects whether the ink level is higher or lower than the mounting position of the actuator. In other words, the actuator detects the existence of the ink at the vibrating region of the actuator. For example, the curve Y in FIG. 3(A) shows the relationship between the ink quantity in the ink tank and the resonant frequency fs of the vibrating section when the vibrating section is small circular shape. The curve Y shows that the resonant frequency fs of the ink and the vibrating section changes extremely during the range of change of ink quantity Q, which corresponds to the status before and after the ink level in the ink tank passes the mounting position of the actuator. By this change of the resonant frequency fs, it can be detected whether the ink quantity remained in the ink tank is more than the predetermined quantity.

The method of using the actuator 106 for detecting the existence of the liquid is more accurate than the method which calculates the quantity of ink consumption by the software because the actuator 106 detects the existence of the ink by directly contacting with the liquid. Furthermore, the method using an electrode to detect the existence of the ink by conductivity is influenced by the mounting position to the liquid container and the ink type, but the method using the actuator 106 to detect the existence of the liquid is not influenced by the mounting position to the liquid container, or by the ink type. Moreover, because both of the oscillation and detection of the existence of the liquid can be done by the single actuator 106, the number of the sensor mounted on the liquid container can be reduced compared to the method using separate sensor for oscillation and the detection of the existence of the liquid. Therefore, the liquid container can be manufactured at a low price. Furthermore, the sound generated by the actuator 106 during the operation of the actuator 106 can be reduced by setting the vibrating frequency of the piezoelectric layer 160 out of the audio frequency.

Figure 3B:
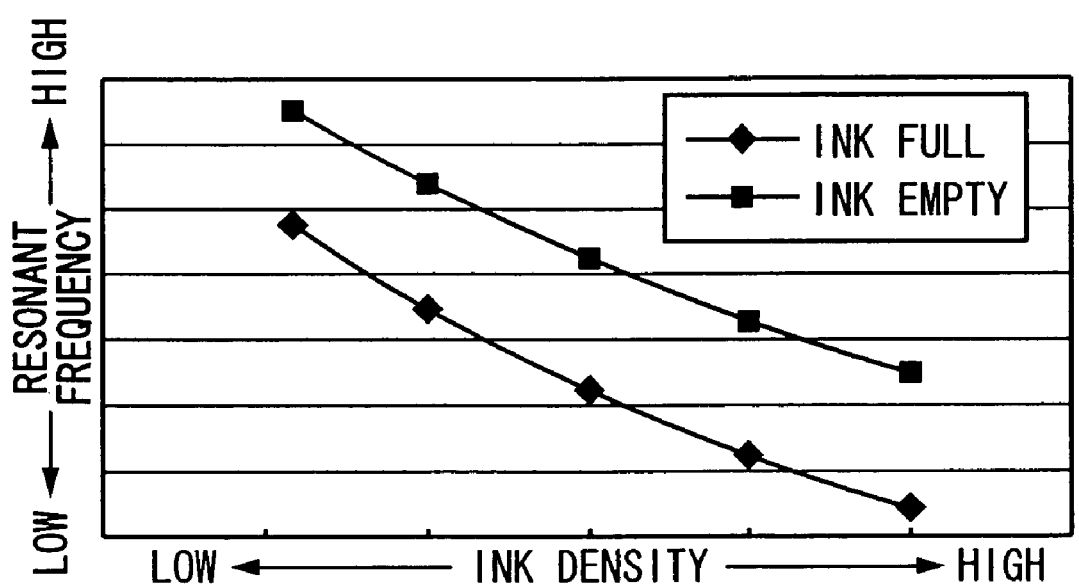

FIG. 3(B) shows the relationship between the density of the ink and the resonant frequency fs of the ink and the vibrating section of the curve Y shown in FIG. 3(A). Ink is used as an example of liquid. As shown in FIG. 3(B), when ink density increases, the resonant frequency fs decreases because the additional inertance increases. In other words, the resonant frequency fs is different depending on the type of the ink. Therefore, by measuring the resonant frequency fs, it can be confirmed whether the ink of a different density has been mixed together during the re-filling of the ink to the ink tank.

Therefore, the actuator 106 can distinguish the ink tank which contains the different type of the ink.

The condition when the actuator 106 can accurately detect the status of the liquid will be explained in detail in following. The case is assumed that the size and the shape of the cavity is designed so that the liquid can be remained in the cavity 162 of the actuator 106 even when the liquid inside the liquid container is empty. The actuator 106 can detect the status of the liquid even when the liquid is not filled in the cavity 162 if the actuator 106 can detect the status of the liquid when the liquid is filled in the cavity 162.

The resonant frequency fs is a function of the inertance M. The inertance M is a sum of the inertance of the vibrating section Mact and the additional inertance M'. Here, the additional inertance M' has the relationship with the status of the liquid. The additional inertance M' is a quantity of a virtual increase of a mass of the vibrating section by the effect of the medium existed around the vibrating section. In other words, the additional inertance M' is the amount of increase of the mass of the vibrating section which is increased by the vibration of the vibrating section that virtually absorbs the medium.

Therefore, when the M'cav is larger than the M'max in the equation (4), all the medium which is virtually absorbed is the liquid remained in the cavity 162. Therefore, the status when the M'cav is larger than the M'max is same with the status that the liquid container is fill with liquid. The resonant frequency fs does not change because the M' does not change in this case. Therefore, the actuator 106 cannot detect the status of the liquid in the liquid container.

On the other hand, if the M'cav is smaller than the M'max in the equation (4), the medium which is virtually absorbed is the liquid remained in the cavity 162 and the gas or vacuum in the liquid container. In this case, because the M' changes, which is different with the case when the liquid is filled in the liquid container, the resonant frequency fs changes. Therefore, the actuator 106 can detect the status of the liquid in the liquid container.

The condition whether the actuator 106 can accurately detect the status of the liquid is that the M'cav is smaller than the M'max when the liquid is remained in the cavity 162 of the actuator 106, and the liquid container is empty. The condition M'max>M'cav, on which the actuator 106 can accurately detect the status of the liquid, does not depend on the shape of the cavity 162.

Here, the M'cav is the mass of the liquid of the volume which is substantially equal to the volume of the cavity 162. Therefore, the condition, which can detect the status of the liquid accurately, can be expressed as the condition of the volume of the cavity 162 from the inequality M'max>M'cav. For example, if the radius of the opening 161 of the circular shaped cavity 162 is "a" and the thickness of the cavity 162 is "d", then the following inequality can be obtained:

$$M'max > \rho * d / \pi a^2 \qquad (10)$$

By expanding the inequality (10), the following condition can be obtained.

$$a/d > 3 * \pi/8 \qquad (11)$$

The inequalities (10) and (11) are valid only when the shape of the cavity 162 is circular. By using the equation when the M'max is not circular and substituting the area $\pi a^2$ with its area, the relationship between the dimension of the cavity such as a width and a length of the cavity and the depth can be derived.

Therefore, if the actuator 106 has the cavity 162 which has the radius of the opening 161 "a" and the depth of the cavity "d" that satisfy the condition shown in inequality (11), the actuator 106 can detect the liquid status without malfunction even when the liquid container is empty and the liquid is remained in the cavity 162.

Because the additional inertance influences the acoustic impedance characteristic, it can be said that the method of measuring the counter electromotive force generated in actuator 106 by residual vibration measures at least the change of the acoustic impedance.

Furthermore, according to the present embodiment, the actuator 106 generates the vibration, and the actuator 106 itself measures the counter electromotive force in actuator 106 which is generated by the residual vibration remained after the vibration of the actuator 106. However, it is not necessary for the vibrating section of the actuator 106 to provide the vibration to the liquid by the vibration of the actuator 106 itself which is generated by the driving voltage. Even the vibrating section itself does not oscillates, the piezoelectric layer 160 deflects and deforms by vibrates together with the liquid, which contacts with the vibrating section with some range. This residual vibration generates the counter electromotive force voltage in the piezoelectric layer 160 and transfer this counter electromotive force voltage to the upper electrode 164 and the lower electrode 166. The status of the liquid can be detected using this phenomenon. For example, in case of the ink jet recording apparatus, the status of the ink tank or the ink contained inside the ink tank can be detected using the vibration around the vibrating section of the actuator which is generated by the vibration generated by the reciprocating motion of the carriage to scanning the print head during the printing operation.

Preferably, the actuator 106 oscillates the frequency in inaudible region. For example, the frequency is preferably from 100 kHz to 500 kHz. Recently, because the noise generated by the ink jet recording apparatus during the operation becomes extremely small, the noise generated by the actuator 106 will become conspicuous relative to the noise generated by the ink jet recording apparatus if the frequency generated by the actuator 106 during the driving of the actuator 106 is in audible frequency. Then, the user of the ink jet recording apparatus may feel uncomfortable. Therefore, it is desirable to set the frequency generated by the actuator 106 to be a frequency in inaudible region so that the user of the ink jet recording apparatus does not feel the vibration generated by the actuator 106 as uncomfortable.

Even if each of the ink cartridges of the same type contain the same kinds of, for example, same color of ink with same quantity, the value of the generated resonant frequency are subtly different for each ink cartridges owing to a difference in each individual actuators 106. Therefore, the frequency is measured when an ink cartridge is in ink-full status, and the data of the frequency is previously stored in the semiconductor memory device 7 or the memory inside the recording apparatus. Then, by comparing the frequency measured during the consumption of the ink in each ink cartridge with the frequency stored in the memory as a reference value, the ink consumption status can be detected for each ink cartridge. For example, the frequency when the ink cartridge is in ink-full status is measured when the new ink cartridge is mounted on the recording apparatus, and the value of the frequency is stored in the memory as a reference value. Then, the ink consumption status can be detected by comparing the frequency measured when the ink in the ink cartridge is consumed with the frequency when the ink cartridge is in ink-full status as a reference value. Moreover, the frequency when the ink cartridge is in ink-full status is previously measured during the manufacturing process of the ink cartridge, and the value of the measured frequency is stored in the semiconductor memory device 7 as a reference value. Then, the ink consumption status can be detected by comparing the frequency measured when the ink in the ink cartridge is consumed with the frequency when the ink cartridge is in ink-full status as a reference value.

FIG. 4 shows the relation between a residual quantity of ink inside the ink cartridge and combinations of patterns of a primary mode and a secondary mode of the resonant frequency. The value of the combination of the patterns among a primary mode resonant frequency, secondary mode resonant frequency, and a combination of the primary mode and a secondary mode of a resonant frequency are shown for each of the ink cartridge having different residual quantity of ink.

A primary mode is a primary frequency of a waveform of a counter electromotive force generated by a residual vibration of the actuator, or elastic wave generating device 106. A secondary mode is a secondary frequency of a waveform of a counter electromotive force generated by a residual vibration of the actuator, or elastic wave generating device 106. Because the frequency detected from the waveform of the counter electromotive force generated by a residual vibration of the actuator 106 substantially matches with the frequency of the maximum value of the admittance characteristic measured by impedance analyzer, to measure the frequency of the waveform of the counter electromotive force is equal to obtain the singular point of the acoustic impedance.

The patterns of numerical value for each combination of the primary mode resonant frequency and the secondary mode resonant frequency are different by the difference of each residual quantity of ink in each of ink cartridges A, B, and C. Therefore, the residual quantity of ink contained in the ink cartridge, which is mounted on the recording apparatus, can be judged by measuring both the primary mode resonant frequency and the secondary mode resonant frequency.

For example, as shown in FIG. 4, the patterns of the numerical value of the combinations of the primary mode resonant frequency and the secondary mode resonant frequency are different for each of the ink cartridge A, ink cartridge B, and ink cartridge C, each of which contains a different residual quantity of ink. Therefore, the pattern of numerical value of the combination of the primary mode resonant frequency and the secondary mode resonant frequency can be used as the pattern that shows the residual quantity of ink of the each ink cartridges The ink cartridge B has a pattern of peaks of primary mode and secondary mode resonant frequency which is shifted 100 kHz lower than the pattern of peaks of primary mode and secondary mode resonant frequency of the ink cartridge A. The ink cartridge C has a pattern of peaks of primary mode and secondary mode resonant frequency which is shifted 100 kHz higher than the pattern of peaks of primary mode and secondary mode resonant frequency of the ink cartridge A. In this way, depends on the residual quantity of ink contained in the ink cartridge, the pattern of resonant frequency of the primary mode and secondary mode are different. Therefore, the residual quantity of ink contained in the ink cartridge can be judged by detecting a resonant frequency of both of primary mode and secondary mode and recognizing the pattern of the combination of the numerical value of the resonant frequency as the characteristic pattern of the residual quantity of ink in the measured ink cartridge.

Here, the resonant frequency of the two modes, a primary mode and a secondary mode, are detected. However, residual quantity of ink can be judged by detecting the resonant frequency of plurality of modes. For example, the residual quantity of ink can be judged by detecting the resonant frequency of two modes such as the primary mode and the third mode. Also, the residual quantity of ink can be judged by detecting the resonant frequency of two modes such as the secondary mode and the third mode.

Figure 5A:
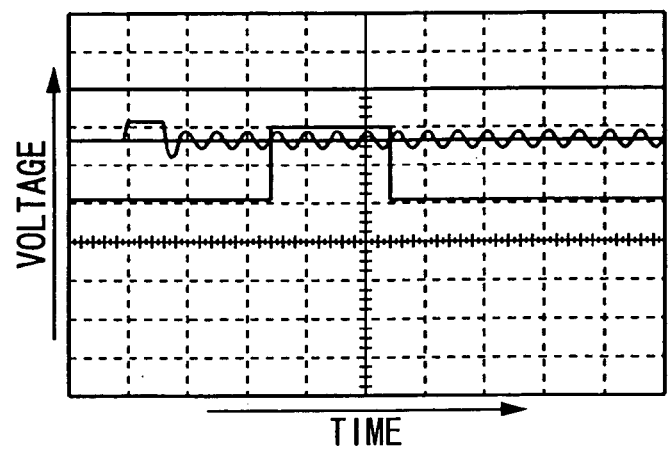
FIGS. 5A, 5B, and 5C show waveforms of the counter electromotive force of the actuator 106.
Figure 5B:
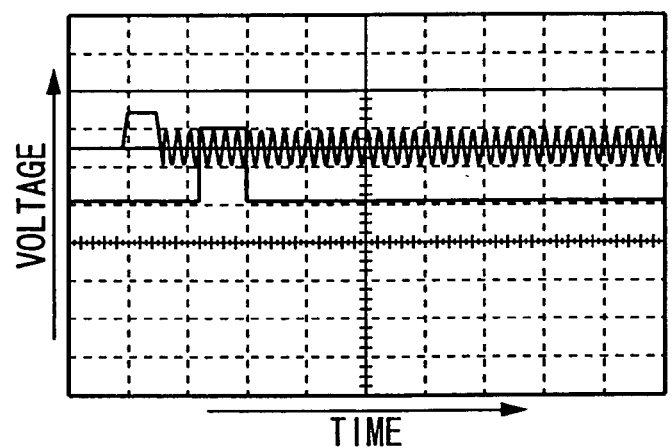

FIG. 5(A) and FIG. 5(B) shows a waveform of the residual vibration of the actuator 106 and the measuring method of the residual vibration. The change of the ink level at the level of the mounting position of the actuator 106 in the ink cartridge can be detected by the change in the frequency or the amplitude of the residual vibration remained after the oscillation of the actuator 106. In FIG. 5(A) and FIG. 5(B), the vertical axis shows the voltage of the counter electromotive force generated by the residual vibration of the actuator 106, and the horizontal axis shows the time. By the residual vibration of the actuator 106, the waveform of the analog signal of the voltage generates as shown in FIG. 5(A) and FIG. 5(B). Then, the analog signal is converted to a digital numerical value corresponding to the frequency of the signal.

In the example sown in FIG. 5(A) and FIG. 5(B), the existence of the ink is detected by measuring the time during the generation of the four numbers of pulses from the fourth pulse to the eighth pulse of the analog signal.

In detail, after the actuator 106 oscillates, the number of the times when the analog signal get across the predetermined reference voltage form the low voltage side to the high voltage side. The digital signal is set to be high while the analog signal becomes fourth counts to the eighth counts, and the time during fourth counts to the eighth counts is measured by predetermined clock pulse.

FIG. 5(A) shows the waveform when the ink level is above the level of the mounting position of the actuator 106. FIG. 5(B) shows the waveform when the ink level is below the level of the mounting position of the actuator 106. Comparing the FIG. 5(A) and FIG. 5(B), the time of the FIG. 5(A) during the fourth counts to the eighth counts is longer than the time of the FIG. 5(B). In other words, depends on the existence of the ink, the time from the fourth counts to the eighth counts is different. By using this difference of the time, the consumption status of the ink can be detected. The reason to count the analog signal from the fourth counts is to start the measurement of the time after the vibration of the actuator 106 becomes stable. It is only one of the example of starting the measurement from fourth counts, but measurement can be started from the desired counts.

The signals from the fourth counts to the eighth counts are detected, and the time from the fourth counts to the eighth counts is measured by the predetermined clock pulse. By this measurement, the resonant frequency can be obtained. The clock pulse is prefer to be a pulse having a same clock with the clock for controlling such as the semiconductor memory device which is mounted on the ink cartridge. It does not necessary to measure the time until the eighth counts, but the time until the desired counts can be measured. In FIG. 5, the time from the fourth counts to the eighth counts is measured, however, the time during the different interval of the counts also can be detected according to the circuit configuration which detects the frequency.

For example, when the ink quality is stable and the fluctuation of the amplitude of the peak is small, the resonant frequency can be detected by detecting the time from the fourth counts to the sixth counts to increase the speed of detection. Moreover, when the ink quality is unstable and the fluctuation of the amplitude of the pulse is large, the time from the fourth counts to the twelfth counts can be detected to detect the residual vibration accurately.

Furthermore, it can be known by comparing FIG. 5(A) with FIG. 5(B), the amplitude of the waveform of the counter electromotive force is different when the ink is filled in the ink cartridge and when the ink is not in the cartridge. Therefore, the ink consumption status in the ink cartridge can be detected by measuring the amplitude of the waveform of the counter electromotive force without calculating the resonant frequency. More specifically, for example, a reference voltage is set between the peak point of the waveform of the counter electromotive force of the FIG. 5(A) and the peak point of the waveform of the counter electromotive force of the FIG. 5(B). Then, after the actuator 106 oscillates, set the digital signal to be high at the predetermined time. Then, if the waveform of the counter electromotive force crosses the reference voltage, it can be judged that there is no ink in the ink cartridge. If the waveform of the counter electromotive force does not crosses the reference voltage, it can be judged that there is ink in the ink cartridge.

The residual vibration of the actuator 106 is preferably measured when a carriage is not moving or when a recording head is not printing. If the residual vibration is measured when the recording head is printing, because a central processing unit (CPU) of the ink jet recording apparatus is used for measuring the residual vibration, the time that can use a CPU for printing decreases and the printing speed therefore decreases.

Therefore, by measuring the residual vibration when the recording head is not printing, which is the time that the CPU is not used for printing, the decrease of the printing speed can be prevented. Furthermore, the case in which the ink container is the type, which is mounted on the carriage and moving together with carriage, will be considered. If the residual vibration is measured when the recording head is printing, the residual vibration cannot be accurately measured because ink inside of the ink container rolls by the movement of the ink container. Therefore, it is preferable to measure the residual vibration when the recording head is not printing. Furthermore, when the recording head is not printing, the motor that drives the carriage is not moving, and the residual vibration thus can be measured with avoiding the noise generated during the driving of the recording head and the motor of carriage.

Therefore, the residual vibration can be measured more accurately. The timing when the recording head is not printing includes the timings such as during the changing of the pages, during the cleaning of the recording head, at the time of switching-on the power supply, just before the switching-off the power supply, that is, the time from the switching-off the power supply until the recording apparatus actually stops.

Figure 5C:
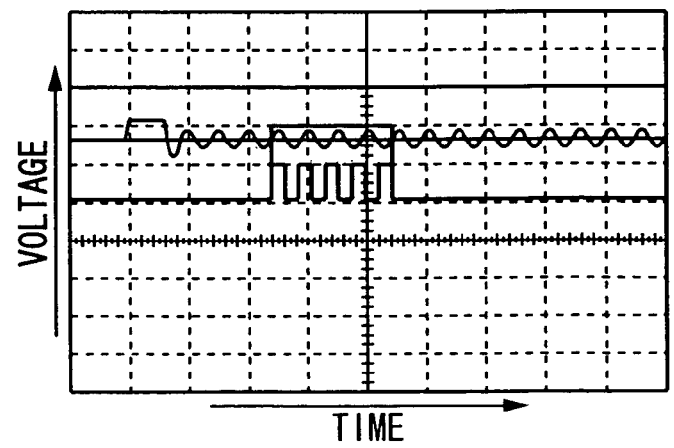

FIG. 5(C) shows the example in which the time of the pulse wave from the fourth counts to the eighth counts is measured by predetermined clock pulse. In this figure, the clock pulse is arises for four counts during the fourth counts to the eighth counts. Actually, the clock pulse from the 100 counts to the 200 counts will arise, however, to make the explanation simple, the small number of clock pulse will be used for explanation. Because the clock pulse is a pulse having a constant period, the time can be measured by counting the number of clock pulse. The resonant frequency is obtained by measuring the time from the fourth counts to the eighth counts. The clock pulse preferably has a period which is shorter than the period of the waveform of the counter electromotive force. For example, the clock pulse preferably has a higher frequency such as 16 MHz.

Figure 6:
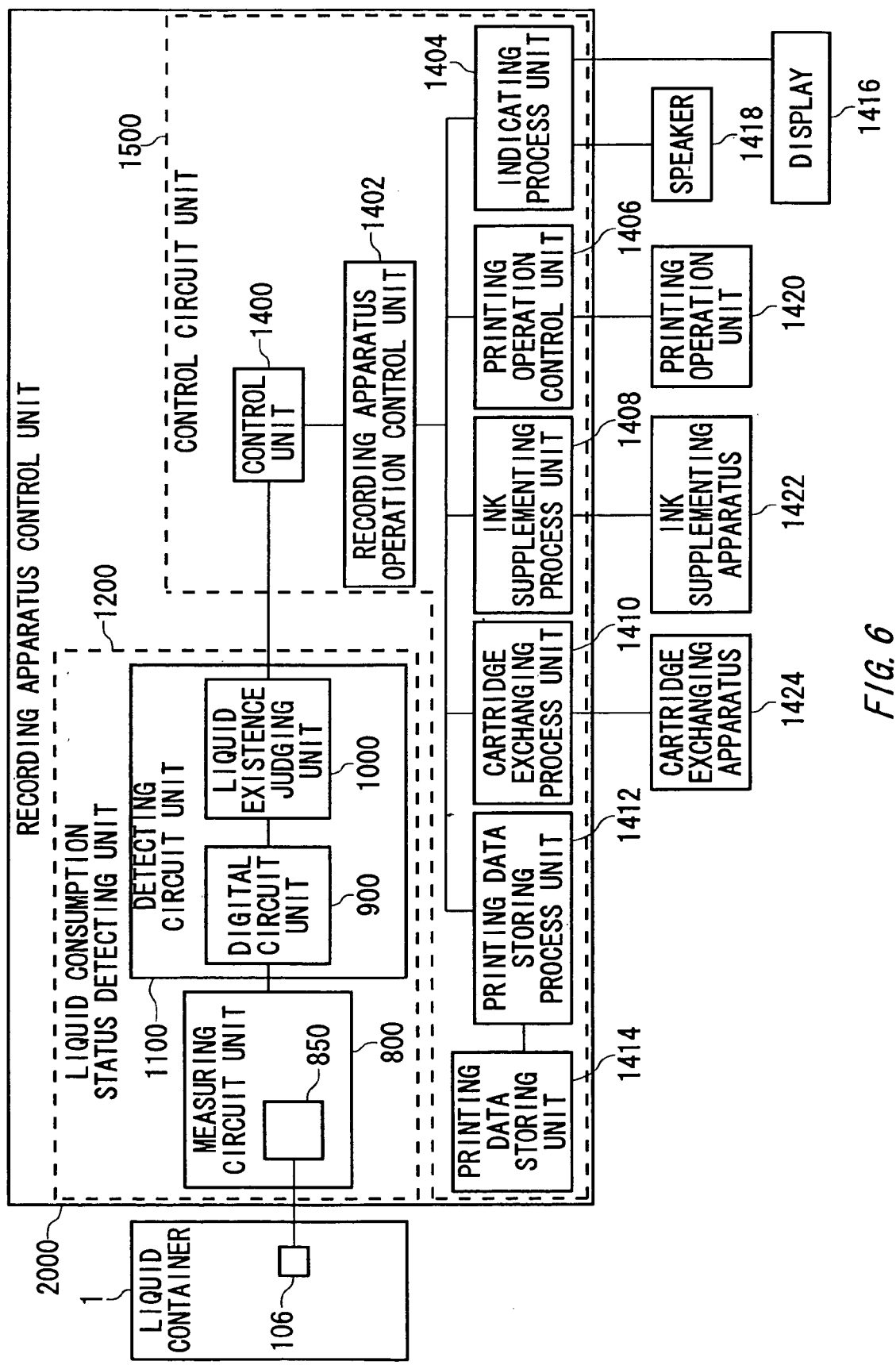
FIG. 6 shows a configuration of the recording apparatus control unit 2000.

FIG. 6 shows a configuration of the recording apparatus control unit 2000 which detects a liquid consumption status inside the container 1 by detecting a change of acoustic impedance using the actuator 106 and controls the ink jet recording apparatus based on the detected result. The recording apparatus control unit 2000 comprises a liquid consumption status detecting unit 1200 and a control circuit unit 1500. The liquid consumption status detecting unit 1200 provides the activating voltage to the actuator 106 mounted on the container 1 and detects the liquid consumption status from the change of the acoustic impedance detected by the actuator 106 as a result of activation. The control circuit unit 1500 controls a recording apparatus based on the detected results of the liquid existence output by the liquid consumption status detecting unit 1200.

The control circuit unit 1500 has a control unit 1400 and a recording apparatus operation control unit 1402. The control unit 1400 controls a recording apparatus operation control unit 1402 based on the detected results of the liquid existence output by the liquid consumption status detecting unit 1200. The recording apparatus operation control unit 1402 controls the operation of the recording apparatus based on the direction of the control unit 1400. The control circuit unit 1500 further has a indicating process unit 1404, a printing operation control unit 1406, an ink supplementing process unit 1408, a cartridge exchanging process unit 1410, a printing data storing process unit 1412, and a printing data storing unit 1414, the operation of which are controlled by the recording apparatus operation control unit 1402.

The recording apparatus control unit 2000 may be provided inside of the ink jet recording apparatus. A part of the function of the recording apparatus control unit 2000 may be provided on the outside of the recording apparatus control unit 2000. For example, the function of the control circuit unit 1500 may be provided to the outside apparatus such as computer connected to the recording apparatus. Furthermore, a part of the function of the recording apparatus control unit 2000 may be stored in the recording medium as a program and supplied to the outside computer. By supplying a part of the function of the recording apparatus control unit 2000 as a program stored in the recording medium to the computer connected to the recording apparatus, the operation of the recording apparatus can be always controlled by the latest function by easily storing the program, which performs the latest function, in the recording medium of the computer when a part of the function of the recording apparatus control unit 2000 is improved in the future.

Furthermore, a part of the function of the recording apparatus control unit 2000 may be sent from the information processing apparatus such as a server to a terminal such as a computer connected to the recording apparatus through an electric communication line as a program. In this case, by storing the latest function in the recording apparatus of a computer which is easily sent from a server through an electric communication line, the recording apparatus can always perform the latest function.

The liquid consumption status detecting unit 1200 activates the actuator 106 and detects the existence of liquid in the container 1 from a change of the acoustic impedance. For example, the liquid consumption status detecting unit 1200 has a measuring circuit unit 800, which measures a counter electromotive force such as the voltage value generated by the residual vibration of the actuator 106, and a detecting circuit unit 1100, which outputs the signal that shows the existence of liquid in the container 1 by inputting the counter electromotive force measured by the measuring circuit unit 800.

The measuring circuit unit 800 has an activating voltage generating unit 850 which generates the activating voltage to activate the actuator 106. The actuator 106 mounted on the container 1 is activated and oscillated by the activating voltage generated by the activating voltage generating unit 850. The actuator 106 continues to vibrate residually after the oscillation, and the actuator 106 itself generates a counter electromotive force by this residual vibration. The measuring circuit unit 800 further transforms the analog signal of the waveform of the counter electromotive force generated by the actuator 106 to the digital signal which corresponds to the frequency of the waveform of the counter electromotive force and outputs to the digital circuit unit 900.

The detecting circuit unit 1100 has a digital circuit unit 900, which counts the number of the pulse of the signal output by the measuring circuit unit 800 during a constant time period digitally, and a liquid existence judging unit 1000, which judges the existence of liquid based on the number of the pulse counted by the digital circuit unit 900. In the present embodiment, the digital circuit unit 900 outputs the signal which is high from the fourth counts to the eighth counts in the waveform of the counter electromotive force output by the digital circuit unit 900. Furthermore, as shown in FIG. 5(C), the digital circuit unit 900 counts the number of the pulse of the predetermined clock pulse which has shorter period than the period of the waveform of the counter electromotive force during the period when the above mentioned digital signal is high from the fourth counts to the eighth counts. By counting the number of the pulse of the clock pulse having a constant period, the time during the fourth counts to the eighth counts can be measured. For example, in FIG. 5(C), there are five counts of the clock pulse, and the time can be calculated by multiplying the five counts by the period of the clock pulse. Here, the clock pulse of low frequency is used to make the explanation simple, however, the clock pulse of high frequency such as 16 MHz is practically used. The liquid existence judging unit 1000 judges the existence of liquid in the container 1 based on the count value output by the digital circuit unit 900 and outputs the judging result to the control circuit unit 1500.

When the liquid consumption status detecting unit 1200 outputs the judging result that there is no ink in the liquid container 1, the control unit 1400 controls the recording apparatus operation control unit 1402 to perform the predetermined low ink level corresponding process. The low ink level corresponding process is the process which determines whether there is little ink remaining in the liquid container 1 and stops or restrains the operation of the recording apparatus such as inappropriate printing. The recording apparatus operation control unit 1402 performs the low ink level corresponding process by controlling the operations of the indicating process unit 1404, the printing operation control unit 1406, the ink supplementing process unit 1408, the cartridge exchanging process unit 1410 or printing data storing process unit 1412 based on the direction of the control unit 1400.

The indicating process unit 1404 indicates the information corresponding to the actuator 106 that detects the existence of liquid in the liquid container 1. To indicate the information, there are a method of indicating by the display 1416 and a speaking by the speaker 1418. The display 1416 is, for example, display panel of the recording apparatus or the screen of the computer connected to the recording apparatus. Furthermore, the indicating process unit 1404 is connected to the speaker 1418, and if the actuator 106 detects that there is no ink at the mounting position of the actuator 106 in the liquid container 1, the indicating sound is output from the speaker 1418. The speaker 1418 can be a speaker of the recording apparatus or a speaker of the outside apparatus such as a computer connected to a recording apparatus. Moreover, voice signal also can be suitably used for indicating sound, and synthetic voice that indicates the ink consumption status can be generated by the voice synthesizing process.

The printing operation control unit 1406 controls the printing operation unit 1420 to stop the printing operation of the recording apparatus. By the stopping of the printing process, the printing operation after the running out ink can be avoided. Moreover, the printing operation control unit 1406 can prohibit the printing process to move to the next printing process after finishing of the certain printing process as other example of the low ink level corresponding process. By this prohibiting of the printing process, it is avoided that the one printing process, such as printing of a series of sentence, is stopped on the halfway of printing process. Moreover, as an example of prohibiting the printing process, it is preferable to prohibit the printing process after the starting of the new page to prevent the printing process to be stopped on the halfway of printing the one page.

The ink supplementing process unit 1408 controls the ink supplementing apparatus 1422 to supplement ink in the ink cartridge automatically. By this supplementing of ink, the printing operation can be continued without interrupting.

The cartridge exchanging process unit 1410 controls the cartridge exchanging apparatus 1424 to exchange the ink cartridge automatically. This corresponding process also can continue the printing operation without troubling the user. The printing data storing process unit 1412 stores the printing data, which is the data before the finishing of the printing, in the printing data storing unit 1414 as a low ink level corresponding process. This printing data is the data which is sent to the recording apparatus after the detection of the ink-end. By this storing of the printing data, the loss of the printing data before the printing can be avoided.

All these configurations from the 1404 to 1412 do not have to be provided to the recording apparatus control unit 2000. Also, all of the low ink level corresponding process does not have to be performed, and at least one of the low ink level corresponding processes can be performed. For example, if the ink supplementing process unit 1408 or the cartridge exchanging process unit 1410 performs the process, the printing operation control unit 1406 does not have to prohibit the printing operation. Furthermore, the recording apparatus control unit 2000 can have a configuration that can perform the low ink level corresponding process other than the process explained above and have a configuration which can avoid the inappropriate printing operation by the shortage of ink. Furthermore, the above mentioned low ink level corresponding process is preferable to be performed after the printing of the "predetermined quantity of allowance" after the actuator 106 detects the non-ink status at the mounting position of the actuator 106. The "predetermined quantity of allowance" is set to be an appropriate value which is less than the printing quantity that consume all the ink after the detection of no-ink status by the actuator 106.

Figure 7:
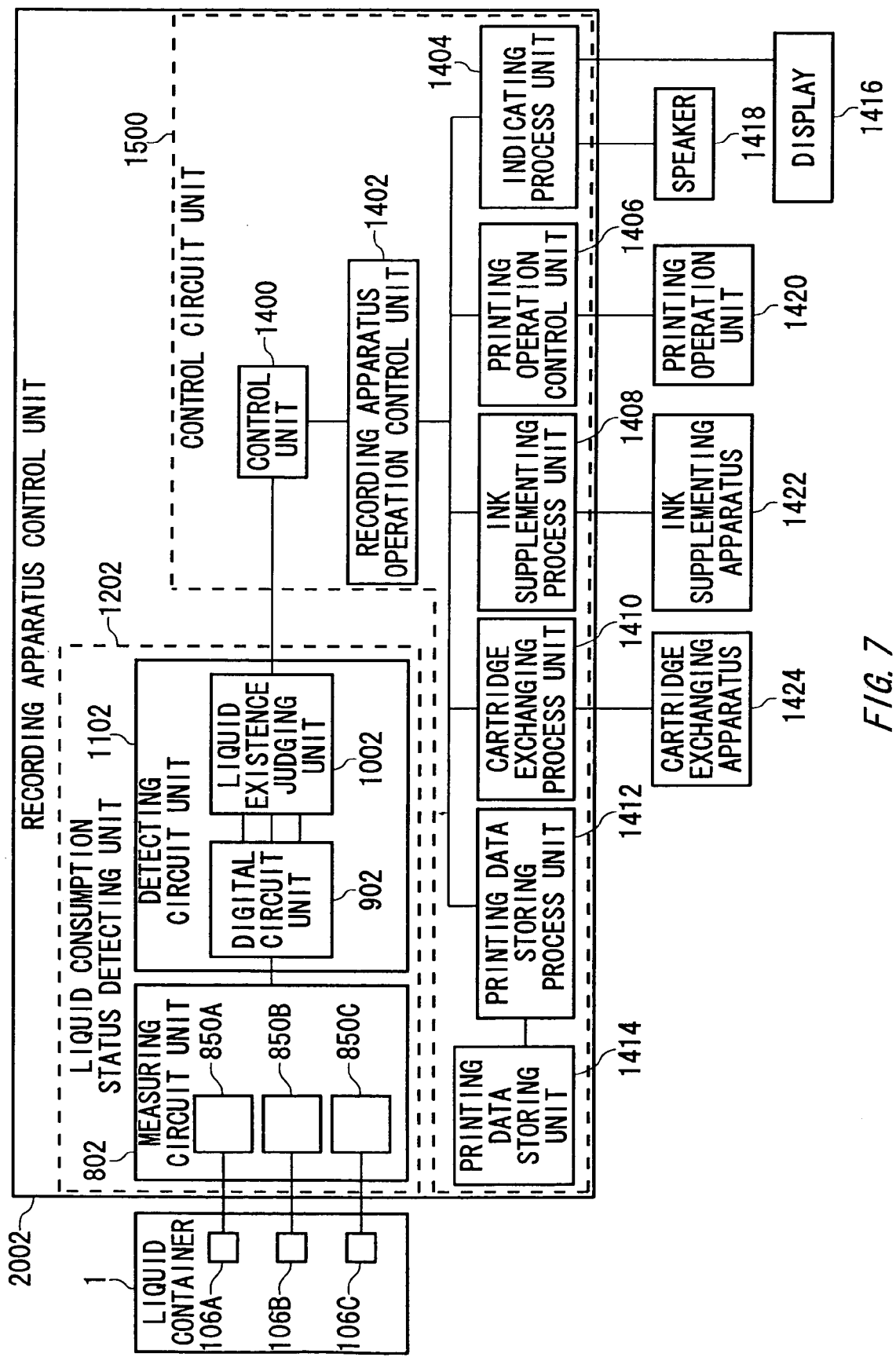
FIG. 7 shows a block diagram of the other embodiment of the recording apparatus control unit 2002.

FIG. 7 shows a block diagram of the other embodiment of the recording apparatus control unit 2002. In the present embodiment, three actuators 106A, 106B, and 106C are mounted on the liquid container 1. Three actuators 106A, 106B, and 106C are mounted on the different position in the direction along which the liquid decreases by the liquid consumption. The measuring circuit unit 802 shown in FIG. 7 includes activating voltage generating units 850A, 850B, and 850C, each of which provides the voltage that activates the actuator to each of actuators 106A, 106B, and 106C which are mounted on the liquid container 1, respectively. The digital circuit unit 902 in the detecting circuit unit 1102 inputs each of the counter electromotive force signals generated by the actuators 106A, 106B, and 106C from the measuring circuit unit 802 and counts the number of pulses within predetermined time range of each of the counter electromotive force signals. Furthermore, the liquid existence judging unit 1002 judges the existence of liquid in the liquid container 1 based on each of the count value of the counter electromotive force signal output from the digital circuit unit 902. Because each of a plurality of actuators is mounted on the different positions along the liquid decreasing direction in the present embodiment, the liquid consumption status at each of the mounting positions of the actuator can be detected step by step. Because the configuration of the recording apparatus control unit 2002 other than the liquid consumption status detecting unit 1202 is the same as the configuration of the recording apparatus control unit 2000 shown in FIG. 6, the explanation of which will be omitted.

The output signal of the actuator is different and depends on whether the liquid level is higher or lower than the level of the mounting position of the actuator. For example, the frequency or amplitude of the detected counter electromotive force changes greatly, and the detection signal changes according to the changes of the frequency or amplitude of the counter electromotive force. The liquid consumption status detecting unit 1202 can judge whether the liquid level has been passed through each level of the mounting position of the actuator 106A, 106B, and 106C based on the detection signal. The detection process is performed periodically, at the previously determined timing.

Here, let the status where the liquid level is lower than the mounting position of the actuator as the "no-liquid status", and let the status where the liquid level is higher that than the actuator as the "liquid-having status". If the liquid level passes through the actuator, the detection result changes from "liquid-having status" to "no-liquid status".

In the present embodiment, the detection of the liquid passing through shows this change of the detection results.

As the characteristic of the present embodiment, the control unit 1400 switches the actuator 106 used for detecting impedance in the direction along which the level of the liquid surface decreases. In detail, just after the mounting of the liquid container 1, that is, when the liquid is fully filled in the liquid container 1, only the actuator 106A is used for detection. If liquid is consumed and the liquid level passes through the actuator 106A, the actuator 106A detects the no-liquid status. Responding to this, the control unit 1400 switches the liquid detection position to middle stage of the liquid container 1. That is, the liquid consumption is detected by using only the actuator 106B. Similarly, if the actuator 106B detects the no-liquid status, the detection position is switched to the mounting position of the lowest actuator 106C.

According to the present embodiment, because the detection position is switched downward sequentially, all the actuators 106 do not have to operate all the time, and the frequency of the operation of the actuator 106 decreases. Therefore, the quantity of data to be processed in the control unit 1400 can be reduced. As a result, the detection process does not decrease the throughput of the printing operation.

In the present embodiment, the number of actuators is three. However, the numbers of actuators 106 can be any number if it is three or more than three. Moreover, the interval of the mounting position of the actuator does not have to be constant. For example, it is preferable to arrange the interval of the actuators narrower as the liquid level decreases. The variation shown above can be similarly applied to the following other embodiments.

Figure 8:
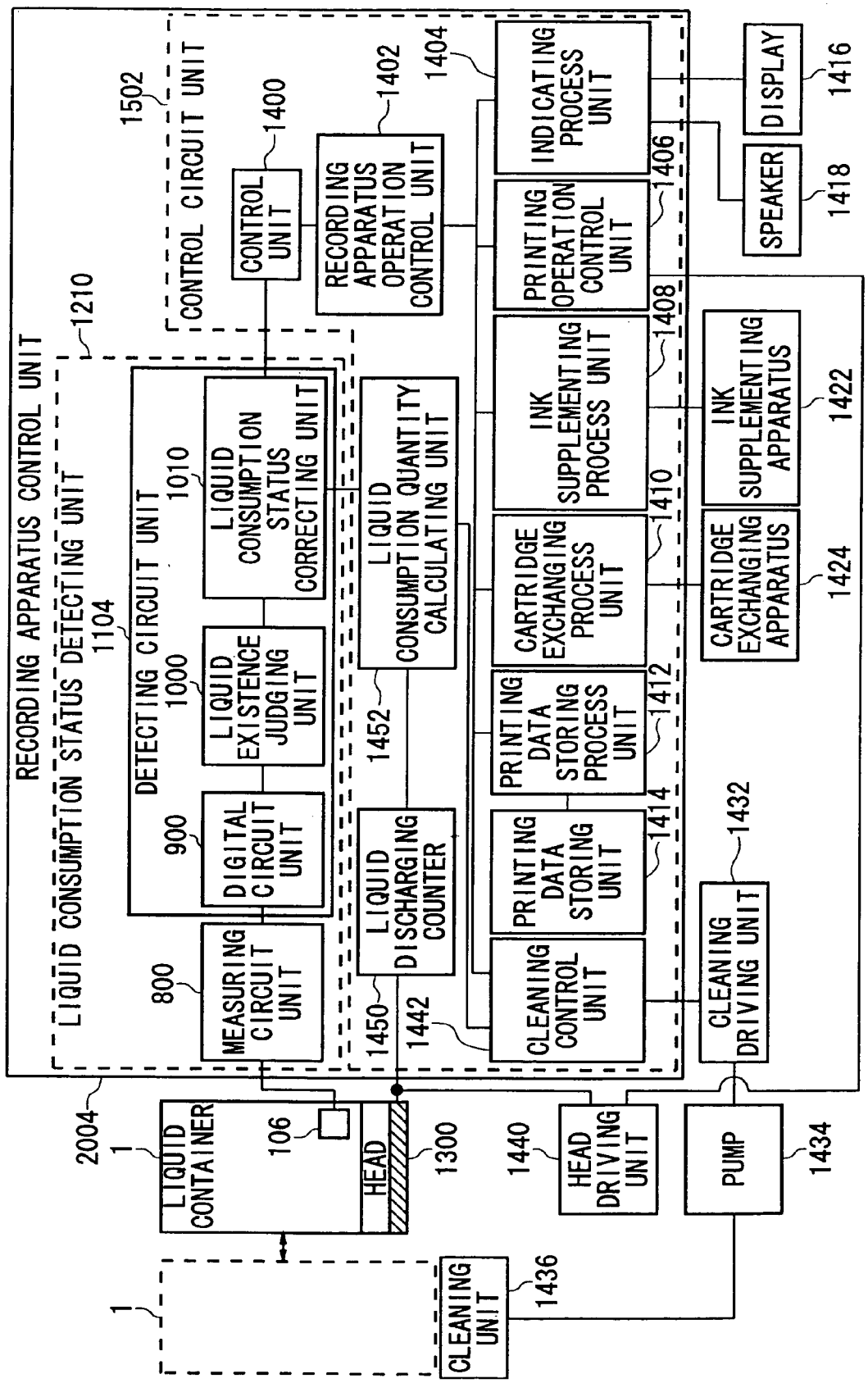
FIG. 8 shows a further embodiment of the recording apparatus control unit 2000 shown in FIG. 6.

FIG. 8 shows further other embodiment of the recording apparatus control unit 2000 shown in FIG. 6. The liquid container 1 shown in FIG. 8 is mounted on a carriage so that the liquid in the liquid container 1 can be communicated to a head 1300 which discharges the liquid in the liquid container 1 to recording medium for printing. The head 1300 is driven by the head driving unit 1440. The recording apparatus shown in FIG. 8 has a cleaning unit 1436 which absorbs the liquid from the head 1300 to clean the nozzle of the head 1300. The cleaning unit 1436 absorbs the liquid from the head 1300 by driving the pump 1434 by the cleaning driving unit 1432.

The control circuit unit 1502 of the recording apparatus control unit 2000 shown in FIG. 8 not only has the element comprised in the recording apparatus control unit 2000 shown in FIG. 6 but further has a liquid discharging counter 1450, a liquid consumption quantity calculating unit 1452, and a cleaning control unit 1442. The liquid discharging counter 1450 counts the number of ink drops discharged from the head 1300. The liquid consumption quantity calculating unit 1452 calculates the quantity of ink consumption based on the number of ink drops counted by the liquid discharging counter 1450. The cleaning control unit 1442 controls the cleaning driving unit 1432 based on the ink consumption status detected by the liquid consumption status detecting unit 1210. Furthermore, the detecting circuit unit 1104 includes a liquid consumption status correcting unit 1010 which corrects the number of ink drops discharged from the head 1300 that is counted by the liquid discharging counter 1450 based on the ink consumption status detected by the actuator 106.

Next, the operation of the element newly added in FIG. 8 will be explained. The liquid discharging counter 1450 counts the number of ink drops discharged from the head 1300 during the printing and outputs to the liquid consumption quantity calculating unit 1452. The liquid consumption quantity calculating unit 1452 calculates the ink quantity discharged from the head 1300 based on the count value of the liquid discharging counter 1450. Furthermore, ink is also consumed by flushing operation. The flushing operation recovers an uneven meniscus around the nozzle opening of the head 1300 and prevents the clogging of the ink in the nozzle opening by discharging the ink drop idly by applying the driving signal, which is not related to the printing operation, to head 1300. Therefore, the liquid discharging counter 1450 also counts the number of the discharged ink drops by the flushing operation and outputs to the liquid consumption quantity calculating unit 1452. The liquid consumption quantity calculating unit 1452 calculates the ink consumption quantity from the number of ink drops discharged from the head 1300 by the printing operation and the flushing operation and outputs the calculated ink consumption quantity to the liquid consumption status correcting unit 1010. The ink quantity calculated by the liquid consumption quantity calculating unit 1452 is displayed by the display 1416 of the indicating process unit 1404.

Furthermore, the ink in the liquid container 1 is also consumed by absorbing ink in the head 1300 to clean the head 1300 by the cleaning unit 1436. Therefore, the liquid consumption quantity calculating unit 1452 calculates the ink consumption quantity consumed by the cleaning operation by multiplying the driving time of the pump 1434, which is driven by the cleaning driving unit 1432, by the quantity of ink absorbed by pump 1434 per time. The liquid consumption quantity calculating unit 1452 inputs the driving time of the pump 1434 through the cleaning control unit 1442 from the cleaning driving unit 1432. As an example of the driving time of the pump 1434, the time while the electricity is supplied to the pump 1434 can be used.

Therefore, the liquid consumption quantity calculating unit 1452 calculates the ink quantity by the liquid discharging counter 1450 and the cleaning control unit 1442. The liquid consumption status correcting unit 1010 corrects the calculated value of the liquid consumption quantity calculating unit 1452 based on the judging result of the liquid existence judging unit 1000.

The reason for using three outputs from the liquid existence judging unit 1000, the liquid consumption quantity calculating unit 1452, and the cleaning control unit 1442 for detecting the ink consumption status will be explained in following. The output of the liquid existence judging unit 1000 is the information which is obtained by actually measuring the level of liquid surface at the mounting position of the actuator 106. On the other hand, the outputs of the liquid consumption quantity calculating unit 1452 and the cleaning control unit 1442 are ink consumption quantity which is estimated from the number of ink drops counted by the liquid discharging counter 1450 and driving time of the pump 1434. This calculated value may cause an error because of the changes of the form of printing of the user or the using environment, for example, changes of the pressure inside the ink cartridge or the viscosity of ink caused by extremes of room temperature or the time elapsed after the the ink cartridge has been unsealed. Therefore, the liquid consumption status correcting unit 1010 corrects the ink consumption quantity, which is calculated based on the output of the liquid consumption quantity calculating unit 1452 and the cleaning control unit 1442, with the judging result of the ink existence output from the liquid existence judging unit 1000. Furthermore, the liquid consumption status correcting unit 1010 corrects the parameter of the equation used by the liquid consumption quantity calculating unit 1452 for calculating the ink consumption quantity based on the judging result of the ink existence output from the liquid existence judging unit 1000. By correcting the parameter of equation, the equation is adapted to the environment in which the ink cartridge is used, so that the value obtained from the equation can be close to the value which is actually used.

If the actuator 106 detects the no-ink status at the mounting position, the printing operation control unit 1406, the ink supplementing process unit 1408, the cartridge exchanging process unit 1410, the printing data storing process unit 1412, and the cleaning control unit 1442, each of which are controlled by the recording apparatus operation control unit 1402, perform the predetermined low ink level corresponding process.

Because the printing operation control unit 1406 controls the head driving unit 1440 to stop the discharging of the ink at the head 1300 and reduce the quantity of discharging the ink, the printing operation after the running out of ink can be avoided. The cleaning control unit 1442 prohibits the cleaning operation, which cleans the head 1300 by the cleaning unit 1436, or reduce the number of times of cleaning or reduce the absorbing quantity of ink by reducing the power of the pump 1434 for absorbing ink as a low ink level corresponding process. Comparatively large amount of ink is absorbed from the head 1300 during the cleaning of the head 1300. Therefore, by prohibiting the cleaning operation when the ink level becomes low in the ink cartridge, the absorbing of the small amount of remained ink from the head 1300 for the cleaning can be avoided, and thus the shortage of ink caused by the cleaning operation can also be avoided. Furthermore, the number of times of cleaning can be reduced, and the absorbing power of the pump 1434 can be reduced as a low ink level corresponding process. Based on the residual quantity of ink in the liquid container 1, the control unit 1400 selects which low ink level corresponding process to be performed by the printing operation control unit 1406 and the cleaning control unit 1442.

Figure 9:
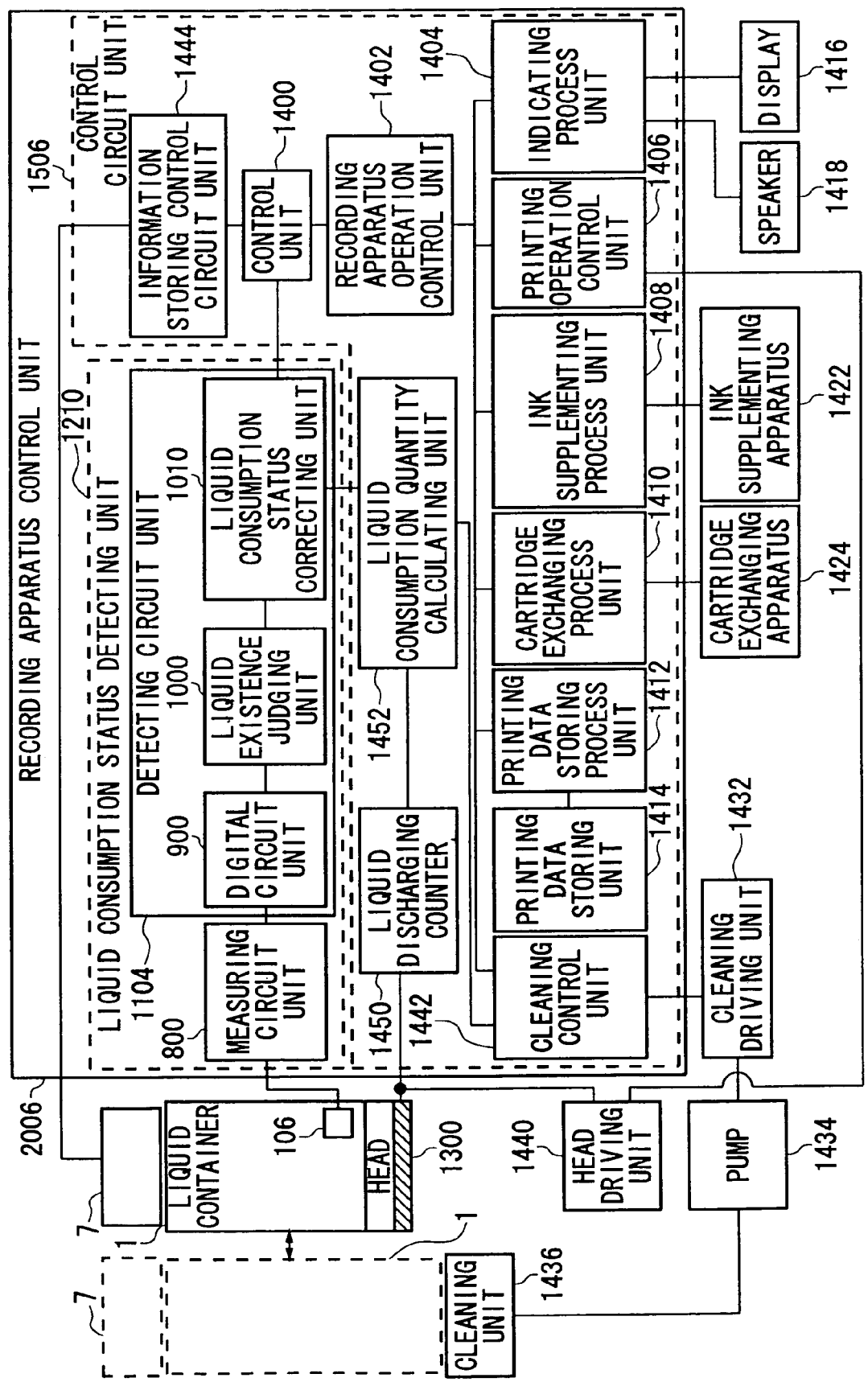
FIG. 9 shows another embodiment of the recording apparatus control unit 2004 shown in FIG. 8.

FIG. 9 shows another embodiment of the recording apparatus control unit 2004 shown in FIG. 8. In this embodiment, a semiconductor memory device 7 is mounted on the liquid container 1, and the recording apparatus control unit 2006 has an information storing control circuit unit 1444. Other configuration is same as the recording apparatus control unit 2004 shown in FIG. 8. Therefore, the elements which are not related to the semiconductor memory device 7 and the information storing control circuit unit 1444 are omitted. The functions and advantages obtained by the configuration that comprising the semiconductor memory device 7 and the information storing control circuit unit 1444 will be explained in following as a characteristic of the present embodiment.

The liquid container 1 has an actuator 106 and a semiconductor memory device 7. The semiconductor memory device 7 is a memory which can be rewritten such as EEPROM. The control circuit unit 1506 has an information storing control circuit unit 1444. The liquid consumption status detecting unit 1210 detects the liquid consumption status in the liquid container 1 by controlling the actuator 106 and outputs the consumption related information, which is related to the detection of the liquid consumption status using the actuator 106, to the control circuit unit 1506. The control unit 1400 writes the consumption related information into the semiconductor memory device 7 through the information storing control circuit unit 1444. Furthermore, the information storing control circuit unit 1444 reads the consumption related information from the semiconductor memory device 7 and outputs to the control unit 1400.

Next, the semiconductor memory device 7 will be explained in detail. The semiconductor memory device 7 stores the consumption related information which is related to the detection of the liquid consumption status using the actuator 106. The consumption related information includes the information of detected consumption status of ink. The information storing control circuit unit 1444 writes the consumption related information obtained by using the actuator 106 into the semiconductor memory device 7. Then, this consumption related information is read out for used at the recording apparatus control unit 2006.

To store the consumption related information in the semiconductor memory device 7 is especially advantageous for the mounting and removing of the liquid container 1. The case is considered in which the liquid container 1 is removed from the ink jet recording apparatus when the liquid is consumed halfway. At this time, the semiconductor memory device 7, which stores the consumption related information, is always together with the liquid container 1. The liquid container 1 is mounted on the same ink jet recording apparatus again or is mounted on another ink jet recording apparatus. At this time, the consumption related information is read out from the semiconductor memory device 7, and the recording apparatus control unit 2006 operates based on the consumption related information. For example, if the consumption related information such that the liquid container 1 mounted on the ink jet recording apparatus is empty or has only a small amount of residual ink, this consumption related information will be conveyed to the user. In this way, the former consumption related information of the liquid container 1 can be reliably used.

The semiconductor memory device 7 may further store the liquid consumption status calculated by the liquid consumption quantity calculating unit 1452 based on the number of ink drop counted by the liquid discharging counter 1450. The actuator 106 can reliably detects the level of the liquid surface to be passed through the mounting position of the actuator 106. Therefore, it is preferable to estimate the ink consumption status, which is the status before and after the liquid level passing through the mounting position of the actuator, from the liquid consumption status calculated by the liquid consumption quantity calculating unit 1452. This estimated value is stored in the semiconductor memory device 7.

Moreover, the consumption related information includes the detection characteristic information, which is to be detected according to the liquid consumption status. In the present embodiment, the detection characteristic information before the consumption and the detection characteristic information after the consumption are stored as the detection characteristic information. The detection characteristic information before the consumption is the detection characteristic before the starting of the ink consumption, that is, the detection characteristic at the ink-full status. The detection characteristic information after the consumption is the detection characteristic estimated to be detected when the ink is consumed to the predetermined detection target, concretely, the detection characteristic when the level of the ink surface becomes lower than the level of the mounting position of the actuator 106.

The information storing control circuit unit 1444 reads out the detection characteristic information from the semiconductor memory device 7, and the liquid consumption status detecting unit 1210 detects the liquid consumption status using the actuator 106 based on the detection characteristic information read out from the semiconductor memory device 7. If the detection signal corresponded to the detection characteristic information before the consumption is obtained, it can be considered that the consumption of liquid is not progressed, and there is large amount of residual ink. At least, it can be reliably known that the level of ink surface is above the mounting position of the actuator 106. On the other hand, if the detection signal corresponded to the detection characteristic information after the consumption is obtained, it can be considered that the consumption of liquid is progressed, and there is small amount of residual ink. Therefore, it can be known that the level of ink surface is below the mounting position of the actuator 106.

One of the advantages to store the detection characteristic information in the semiconductor memory device 7 will be explained. The detection characteristic information is determined by a various kinds of factor such as a shape of the liquid container 1, a specification of actuator 106, and a specification of ink. If there is a change in design such as improvement of design, the detection characteristic may also change. If the liquid consumption status detecting unit 1210 always uses the same detection characteristic information, it is not easy to deal with the change of these detection characteristic. Because the present embodiment stores and uses the detection characteristic information in the semiconductor memory device 7, the present embodiment can easily deal with the change of the detection characteristic information. Of course, even in the case that the liquid container 1 of new specification is provided, the recording apparatus control unit 2000 can easily use the detection characteristic information of the liquid container 1.

Further preferably, the detection characteristic information for each of the liquid containers 1 are measured and stored in the semiconductor memory device 7. Even the specification of the liquid containers 1 are same, each of the detection characteristic information may be different because of the unevenness of manufacturing. For example, there is case that the detection characteristic information is different according to the shape and thickness of the liquid container 1. Because each of the liquid containers 1 includes the semiconductor memory device 7 in the present embodiment, the detection characteristic information characteristic for each of the liquid container 1 can be stored in the semiconductor memory device 7. Therefore, the influence of the unevenness of manufacturing on the detection can be reduced, and the accuracy of detection can be improved. In this way, the present embodiment is advantageous for the difference of the detection characteristic for each of the liquid container 1.

Figure 10:
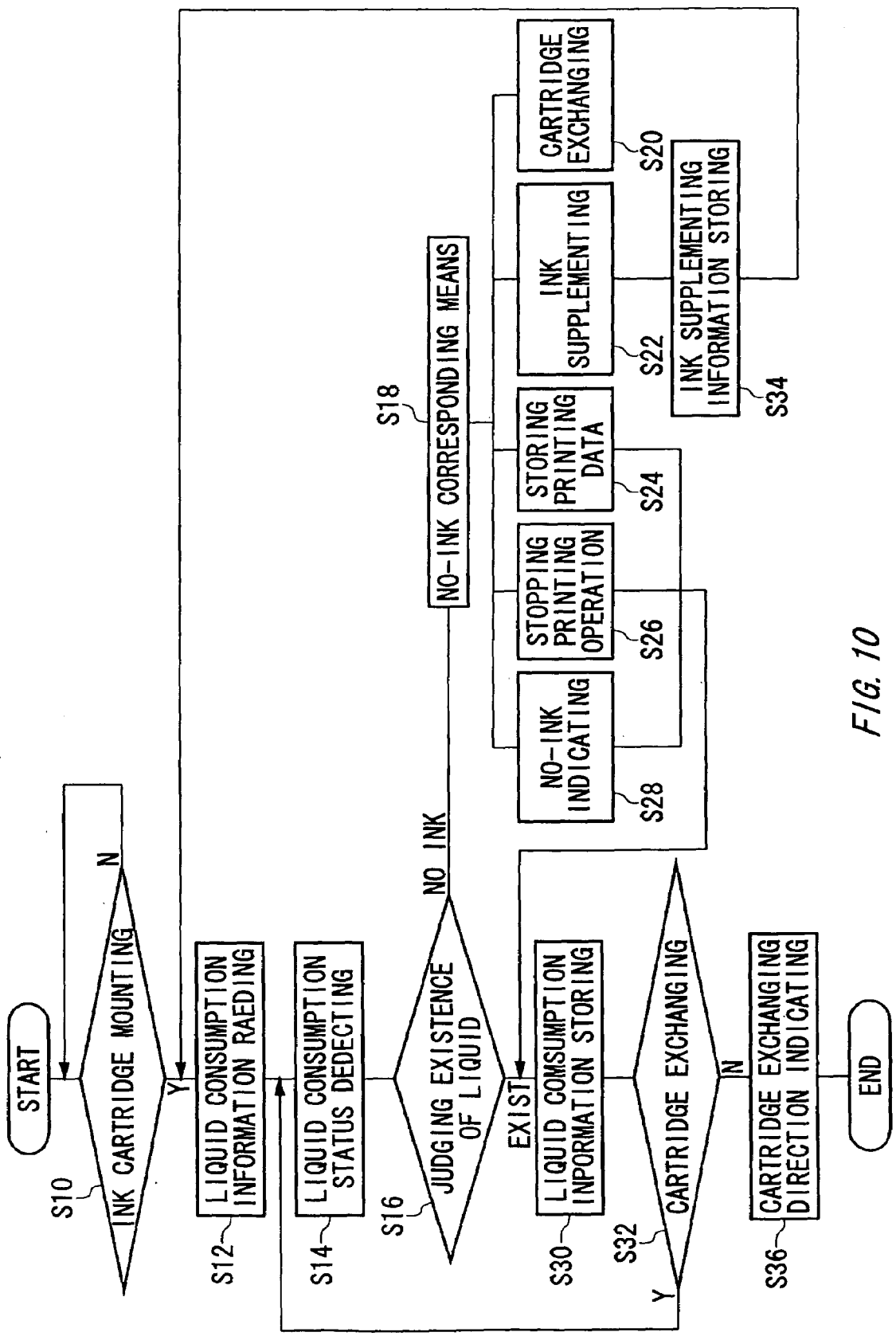
FIG. 10 shows a flow chart of the operation process of the recording apparatus control unit 2006.

FIG. 10 shows a flow chart of the operation process of the recording apparatus control unit 2006. First, it is judged whether the ink cartridge is mounted on the recording apparatus (S10). It is detected that the ink cartridge, which is new or used halfway, is mounted. This process is performed by using the element such as the switch, not shown in the figure, comprised in the ink jet recording apparatus. If the ink cartridge is mounted on the recording apparatus, the consumption related information including the detection characteristic information is read out from the semiconductor memory device 7 (S12). The indicating process unit 1404, the printing operation control unit 1406, the ink supplementing process unit 1408, the cartridge exchanging process unit 1410, the printing data storing process unit 1412, and the cleaning control unit 1442 of the recording apparatus control unit 2006 use the consumption related information which is read out from the semiconductor memory device 7. For example, if it is known that there is only small amount of residual liquid in the liquid container 1 from the consumption related information read out from the semiconductor memory device 7, the display 1416 displays that there is only small amount of residual liquid, and stops the movement of the head 1300.

The liquid consumption status detecting unit 1210 detects the liquid consumption status using the actuator 106 based on the detection characteristic information read out from the semiconductor memory device 7 (S14). Next, the existence of the liquid in the liquid container 1 is judged base on the detected liquid consumption status (S16). If the no-ink status is detected, the no-ink corresponding means (S18) is performed. As an example of the no-ink corresponding means (S18), the steps such as a step of storing the printing data by the printing data storing process unit 1412 (S24), a step of stopping the printing operation by the printing operation control unit 1406 (S26), and a step of indicating a no-ink status by the indicating process unit 1404 (S28) are included. In this case, ink is supplemented to the ink jet recording apparatus, which is performed by user to exchange the ink cartridge according to the direction of the no-ink indicating step (S28).

Moreover, an ink cartridge can be exchanged automatically by the cartridge exchanging process unit 1410 (S20), and ink can be supplemented automatically by the ink supplementing process unit 1408 (S22) as a no-ink corresponding means step (S18). In this case, ink is automatically supplemented to the ink jet recording apparatus, and because user does not have to exchange the ink cartridge, the process is feed back to the liquid consumption information read out process without through the cartridge exchanging judging step (S32). In case of the ink supplementing step (S22), the information of how much quantity of ink is supplemented to the recording apparatus is stored in the semiconductor memory device 7 after the supplement of ink.

After the performing of the printing data storing step (S24), printing operation stopping step (S26), and no-ink indicating step (S28) as an no-ink corresponding means (S18), the detected liquid consumption status is stored in the semiconductor memory device 7 (S30). Then, because the information that there is no-ink in the ink cartridge is conveyed to user by the no-ink indicating step (S28), if user exchanges the ink cartridge (S32, Y) according to the direction of the no-ink indicating step (S28), the process feeds back to the liquid consumption status detecting step (S14). On the other hand, if user does not exchange the ink cartridge, the indication, which indicates user to exchange the ink cartridge, is indicated by the display or speaker, and then the operation process of the recording apparatus control unit 2006 is end.

Figure 11:
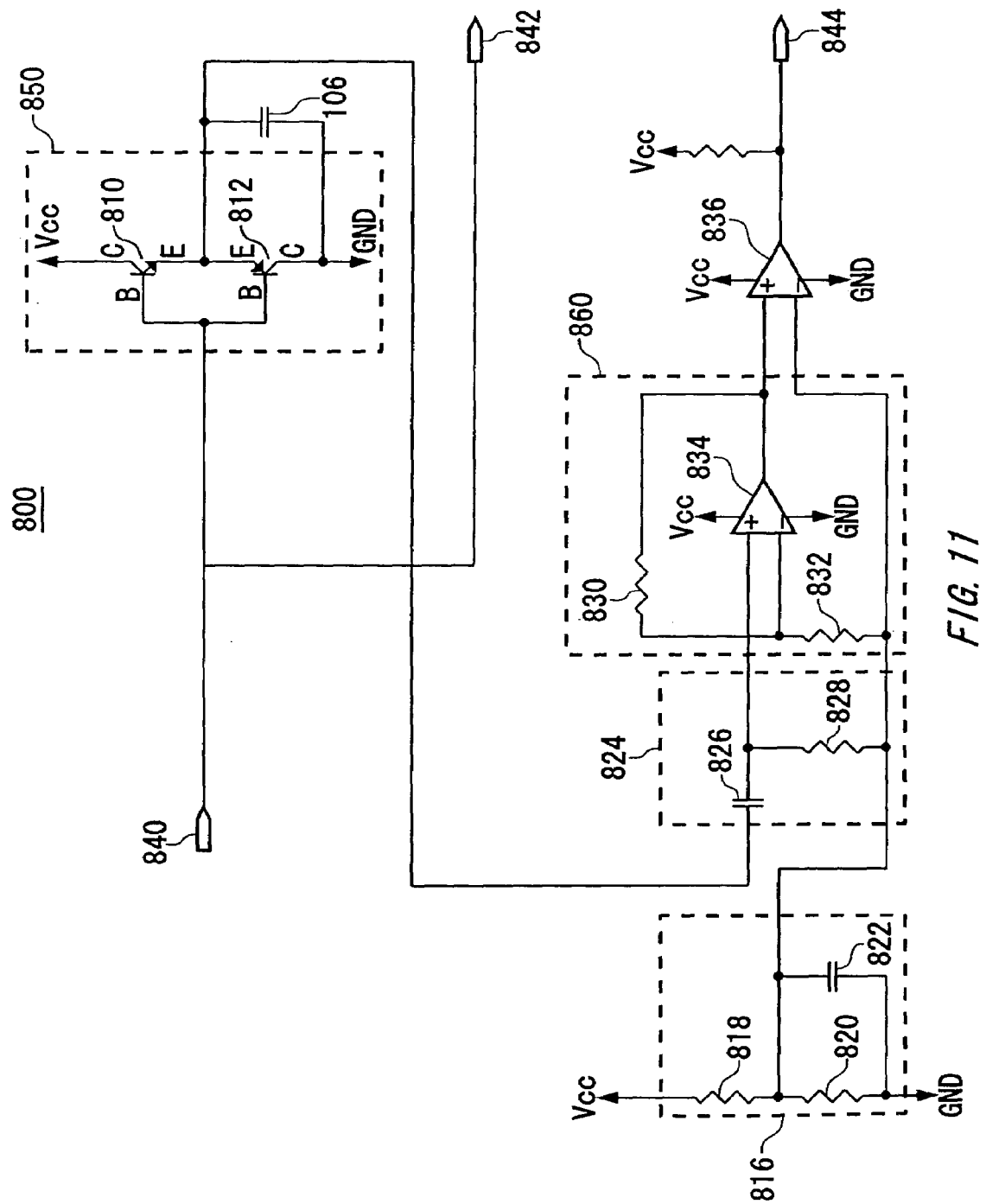
FIG. 11 shows a circuit configuration of the measuring circuit unit 800.

FIG. 11 shows a circuit configuration of the measuring circuit unit 800. The measuring circuit unit 800 has a activating voltage generating unit 850, a reference voltage generating unit 816, a high pass filter 824, a amplifying unit 860, and a comparator 836. The activating voltage generating unit 850 includes two bipolar transistors of a NPN type transistor 810 and a PNP type transistor 812. A base B of the NPN type transistor 810 and a base B of the PNP type transistor 812 are connected with each other in parallel complementary. An emitter E of the NPN type transistor 810 and an emitter E of the PNP type transistor 812 are also connected with each other in parallel complementary. The NPN type transistor 810 and the PNP type transistor 812 are the transistors that activate the actuator 106. One of the terminal of the actuator 106 is connected to the emitter E of which the NPN type transistor 810 and the PNP type transistor 812 is connected each other, and the another terminal of the actuator 106 is connected to the ground GND. The another terminal of the actuator 106 can be connected to the power source Vcc.

A trigger signal, which is input to the activating voltage generating unit 850 from a terminal 840, rises to High signal from Low signal, the base B of the NPN type transistor 810 and the base B of the PNP type transistor 812 connected each other are rising up. Then the NPN type transistor 810 and the PNP type transistor 812 amplifies the current of the input trigger signal and provides to the actuator 106. In FIG. 11, the voltage between the emitter E and the collector C of the PNP type transistor 812 is provided to the actuator 106. Therefore, the actuator 106 is charged rapidly and oscillates. Furthermore, the actuator 106 generates a counter electromotive force by the residual vibration of the actuator 106 itself that is remained after the oscillation of the actuator 106. The counter electromotive force generated by the residual vibration of the actuator 106 is output to the amplifying unit 860 through the high pass filter 824.

The connections between the base B and the emitter E of the NPN type transistor 810 and the PNP type transistor 812 are PN junction. Therefore, the current substantially does not flow at emitter E when the potential difference between the base B and the emitter E is 0.6 V or lower than 0.6V, and the current that is greatly amplified flows at emitter E when the potential difference exceeds 0.6 V. Because each of the NPN type transistor 810 and the PNP type transistor 812 has a 0.6 V of dead band or bias voltage, the NPN type transistor 810 and the PNP type transistor 812 has a bias voltage of about sum of 1.2 V. If the electric potential of the terminal including counter electromotive force of the actuator 106 is within the range of the dead band, the transistors do not operate. Therefore, the operation of transistors does not suppress the residual vibration of the actuator 106. If the transistors do not have dead band, the voltage of the actuator 106 is controlled by the transistors to be a constant value so that the counter electromotive force cannot be measured.

In FIG. 11, a bipolar transistor is used for the NPN type transistor 810 and the PNP type transistor 812, however, a field effect transistor, FET, can be used instead of a bipolar transistor. If using a field effect transistor, an N-type field effect transistor is arranged at the position where the NPN type transistor is arranged in FIG. 11. The gate of the N-type field effect transistor is arranged at the position of the base B of the NPN type transistor 810, and source of the N-type field effect transistor is arranged at the position of the emitter E of the NPN type transistor 810. Furthermore, a P-type field effect transistor is arranged at the position where the PNP type transistor 812 is arranged. The gate of the P-type field effect transistor is arranged at the position of the base B of the PNP type transistor 812, and source of the P-type field effect transistor is arranged at the position of the emitter E of the PNP type transistor 812. Furthermore, the gates of the P-type field effect transistor and the N-type field effect transistor are connected each other, and the sources of the P-type field effect transistor and the N-type field effect transistor are connected each other. One of the terminal of the actuator 106 is preferable to connected to the sources of the P-type field effect transistor and N-type field effect transistor which are connected each other, and another terminal of the actuator 106 is preferable to connected to the power source Vcc or ground GND.

The high pass filter 824 has a capacitor 826 and a resistor 818. The output of the activating voltage generating unit 850 is output to the amplifying unit 860 through the high pass filter 824. The high pass filter 824 removes the low frequency components in the output of the actuator 106 and outputs the high frequency components in the output of the actuator 106 to the amplifying unit 860. Furthermore, the high pass filter 824 has a role to restrain the output of the amplifying unit 860 to fall within a range from 0 V to 5 V from the reference electric potential as a center. The reference voltage generating unit 816 has a resistor 818 and a resistor 820 connected together in series and a capacitor 822 which is connected to the resistor 820 in parallel. The reference voltage generating unit 816 generates a stable direct current electric potential ranges from 2 V to 3 V as a reference electric potential and provides to the high pass filter 824, the amplifying unit 860, and the comparator 836. Therefore, the voltage of the waveform of the signal output from the high pass filter 824 and the amplifying unit 860 vibrates around the reference electric potential as a center.

The amplifying unit 860 has an operational amplifier 834 and a resistor 830 and 832. The operational amplifier 834 and the resistor 818 and 832 are constructed to be a non-inverting amplifier which amplifies an input signal and outputs the input signal without inverting. The amplifying unit 860 inputs the counter electromotive force signal output from the activating voltage generating unit 850 to the plus terminal of the operational amplifier 834 through the high pass filter 824. The minus terminal of the operational amplifier 834 of the amplifying unit 860 is connected to the output of the operational amplifier 834 through the negative feed back resistor 830 and further connected to the reference electric potential through the resistor 832. The operational amplifier 834 amplifies the faint counter electromotive force signal, which is output from the actuator 106, based on the reference electric potential as center. The waveform of this amplified counter electromotive force signal is shown as analog waveform shown in FIG. 5.

The comparator 836 inputs the voltage of the counter electromotive force signal output from the amplifying unit 860 and the reference electric potential output from the reference voltage generating unit 816 and generates the counter electromotive force signal having a digital waveform by outputting High signal when the voltage of the counter electromotive force signal is higher than the reference electric potential and outputting a Low signal when the voltage of the counter electromotive force signal is lower than the reference electric potential. Because the output of the operational amplifier 834 vibrates around the reference electric potential as center, and the voltage at the minus terminal of the comparator 836 is equivalent to the reference electric potential, the comparator 836 compares the voltage of the counter electromotive force signal with the reference electric potential as reference and outputs the counter electromotive force signal having a digital waveform. The comparator 836 outputs the generated counter electromotive force signal having a digital waveform to the terminal 844.

Figure 12:
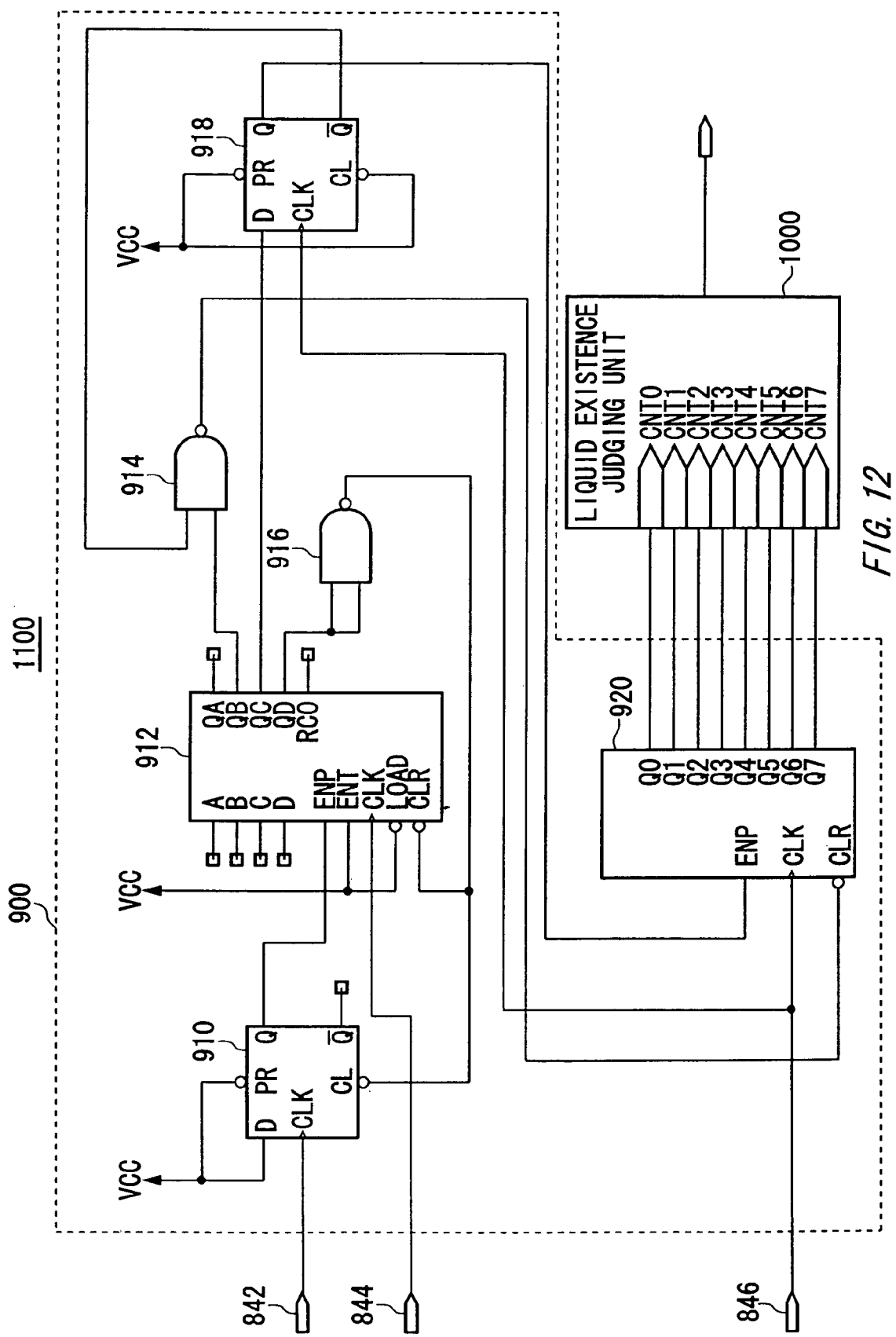
FIG. 12 shows a circuit configuration of the detecting circuit unit 1100.

FIG. 12 shows a circuit configuration of the detecting circuit unit 1100. The detecting circuit unit 1100 has a digital circuit unit 900 and a liquid existence judging unit 1000. The digital circuit unit 900 includes a flip flop 910 and 918, a counter 912 and 920, and an NAND gate 914 and 916. It is assumed that the counter 920 maintains maximum value even if the clock pulse is input to the counter 920 after the counter 912 counts the maximum value (1111, 1111).

When the trigger signal is input to the clock input pin CLK of the flip flop 910 from the terminal 842, the flip flop 910 outputs a signal which controls the counter 912 to start the measuring the pulse number of the counter electromotive force signal output from the measuring circuit unit 800 to the counter 912. Furthermore, if the counter 912 counts eight numbers of the pulse of the counter electromotive force signal, the counter 912 clears the flip flop 910 through the NAND gate 916. Therefore, the flip flop 910 starts providing the High signal to the count enable terminal ENP of the counter 912 when the trigger signal is input to the flip flop 910 and stops providing the High signal when the eight pulses of the counter electromotive force signal is counted by the counter 912. The counter 912 counts the clock only when the signal input the count enable terminal ENP is High. The counter 912 starts counting the pulse number of the counter electromotive force signal when the trigger signal is input to the flip flop 910 and ends counting the pulse number when counting eight numbers of pulses because the signal input to the count enable terminal ENP becomes Low. The counter 912 outputs the signal, which is High from the fourth pulse to the eighth pulse, form the output pin QC to the input pin D of the flip flop 918.

The flip flop 918 inputs the signal, which is High from the fourth pulse to the eighth pulse output from the counter 912, from the input pin D, and inputs a clock having a frequency of 16 MHz, which is input from the terminal 846, from a clock input pin CLK. Then, the flip flop 918 synchronizes the signal input from the input pin D with the clock input from the clock input pin CLK and outputs the synchronized signal. The counter 920 inputs the same clock pulse with the clock pulse input to the flip flop 918 having frequency of 16 MHz from the clock input pin CLK. Therefore, the counter 920 operates with synchronizing with the flip flop 918 so that the counter 920 can counts the pulse number of 16 MHz clock pulse while the output of the output pin /Q of the flip flop 910 is High from the fourth pulse to the eighth pulse. By counting the pulse number of the 16 MHz clock pulse, the time during the four numbers of pulses arise from the fourth pulse to the eighth pulse can be measured. The flip flop 920 outputs the counted value to the liquid existence judging unit 1000. The counter 920 is cleared before the output pin Q of the flip flop 918 becomes High, in other words, before the operating of the counter 920 because the output of the output pin /Q of the flip flop 918 and the output of the output pin QB of the counter 912 are NAND operated at the NAND gate 914 and input to the clear input pin CLR of the counter 920.

In FIG. 12, the pulse number of the 16 MHz clock pulse existed while the fourth pulse to the eighth pulse of the counter electromotive force is counted. However, by using the output of the counter 912 and adding and combining the counting circuit, not only the time until the eighth count but also the time until the desired count can be counted. Therefore, the time during the different count interval can be detected.

Figure 13:
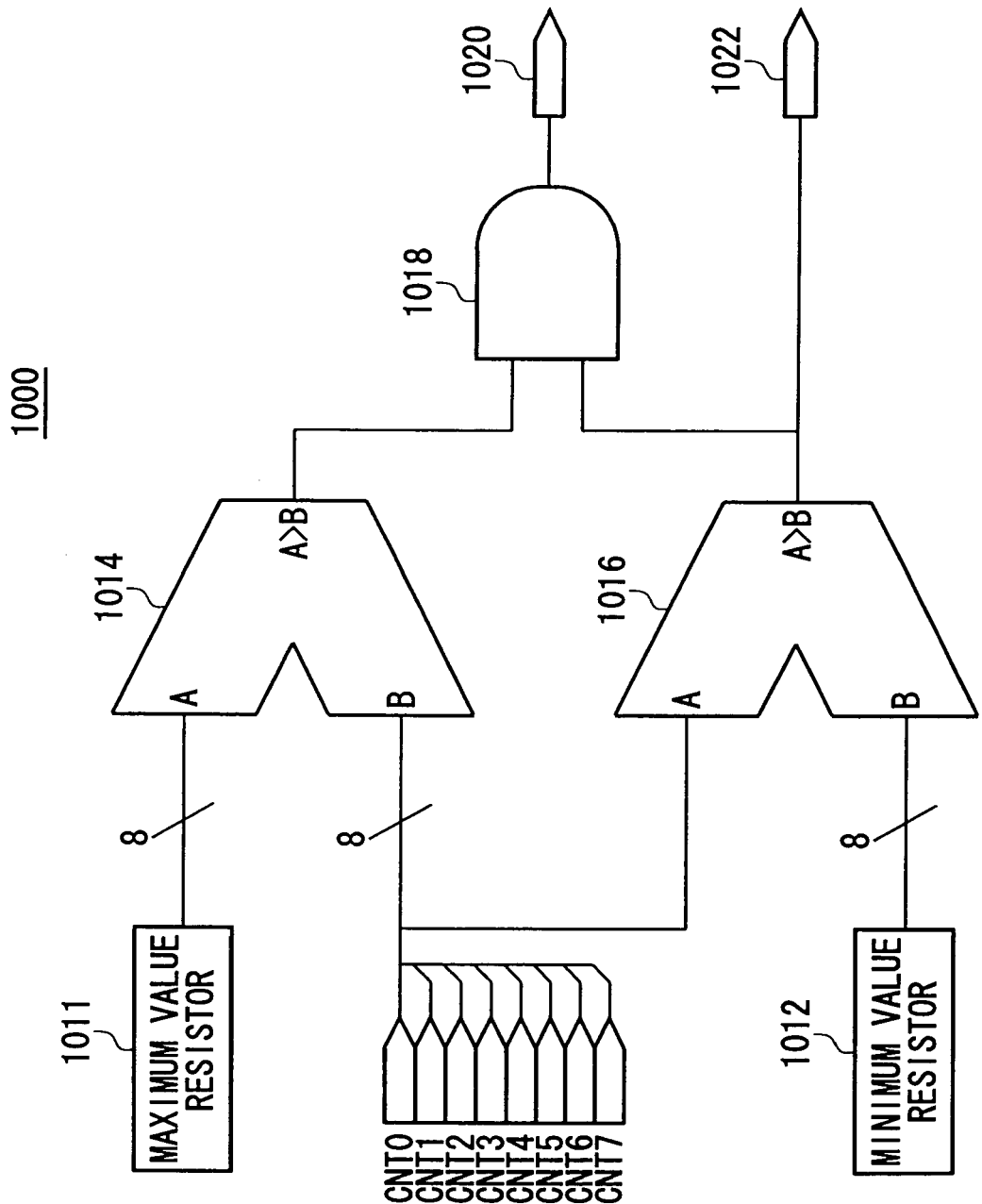
FIG. 13 shows a detailed circuit configuration of the liquid existence judging unit 1000 shown in FIG. 12.

FIG. 13 shows a detailed circuit configuration of the liquid existence judging unit 1000 shown in FIG. 12. The liquid existence judging unit 1000 judges the existence of liquid in the liquid container 1 based on the count value of the number of the 16 MHz clock pulse which arises during the fourth pulse to the eighth pulse of the counter electromotive force signal output by the counter 920. The liquid existence judging unit 1000 has a maximum value resistor 1011, a minimum value resistor 1012, a comparing unit 1014 and 1016, and AND gate 1018. The maximum value of the count value is stored in the maximum value resistor 1011, and minimum value of the count value is stored in the minimum value resistor 1012.

The comparing unit 1014 inputs the count value output from the digital circuit unit 900 to a B terminal and inputs the maximum value of the count value from the maximum value resistor 1011 to an A terminal. If the count value is less than the maximum value, the comparing unit 1014 outputs High signal to the AND gate 1018. On the other hand, if the count value is the maximum value or over, the comparing unit 1014 outputs Low signal to the AND gate 1018. When the count value is the maximum value or over, the frequency of the waveform of the counter electromotive force is lower than the minimum value. Because the waveform of the counter electromotive force is not measured normally, there is possibility that the liquid container is not mounted on the recording apparatus or not mounted on the recording apparatus reliably.

The comparing unit 1016 inputs the count value output from the digital circuit unit 900 to an A terminal and inputs the minimum value of the count value from the minimum value resistor 1012 to an B terminal. If the count value is larger than the minimum value, the comparing unit 1016 outputs High signal to the AND gate 1018 and a terminal 1022. On the other hand, if the count value is the minimum value or under, the comparing unit 1016 outputs Low signal to the AND gate 1018 and the terminal 1022. When the count value is minimum value or under, liquid in the liquid container 1 is not existed at the mounting position of the actuator 106.

If both of the comparing unit 1014 and the comparing unit 1016 outputs high signal, that is, the count value is less than the maximum value and larger than the minimum value, the AND gate 1018 outputs High signal. In this case, because the frequency of the waveform of the counter electromotive force is less than the maximum value, liquid in the liquid container 1 existed at the mounting position of the actuator 106. Furthermore, because the frequency of the waveform of the counter electromotive force is higher than the minimum value, it is known that liquid in the liquid container 1 is in normal status in which the liquid container 1 is reliably mounted on the recording apparatus and liquid exists at the level of the mounting position of the actuator 106. That is, if the terminal 1020 is High, liquid in the liquid container 1 is in normal status in which the liquid container 1 is reliably mounted on the recording apparatus, and liquid exists at the level of the mounting position of the actuator 106.

If the comparing unit 1014 outputs Low signal and the outputs High signal, that is, the count value is the maximum value or over and more than the minimum value, the AND gate 1018 outputs Low signal. Moreover, High signal is input to the terminal 1022. In this case, because the terminal 1020 is Low, liquid in the liquid container 1 is in abnormal status, and because the terminal 1022 is High, it can be judged that the liquid container 1 is not mounted on the recording apparatus or not reliably mounted on the recording apparatus.

Figure 14:
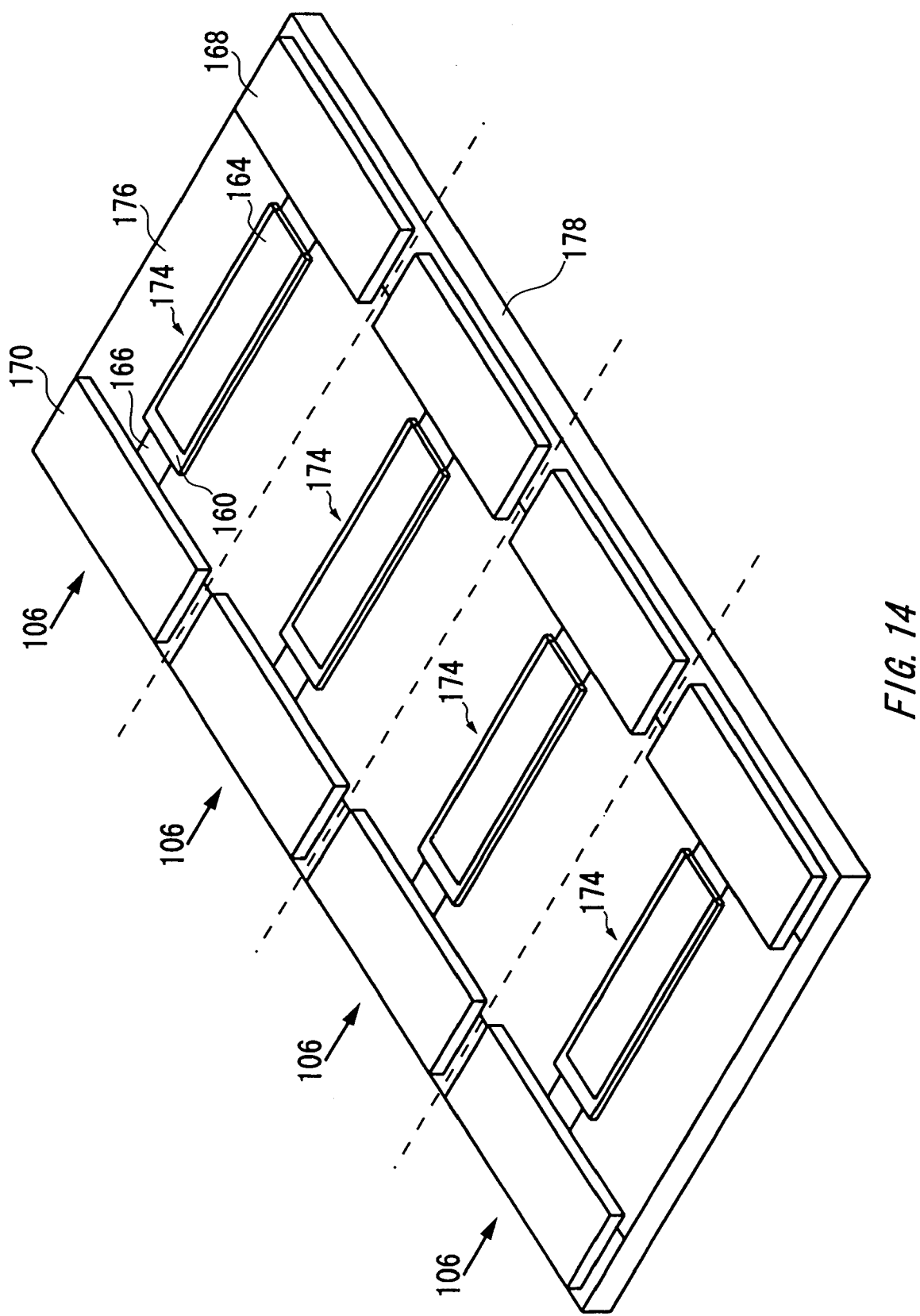
FIG. 14 shows another embodiment of the actuator 106.
Figure 15:
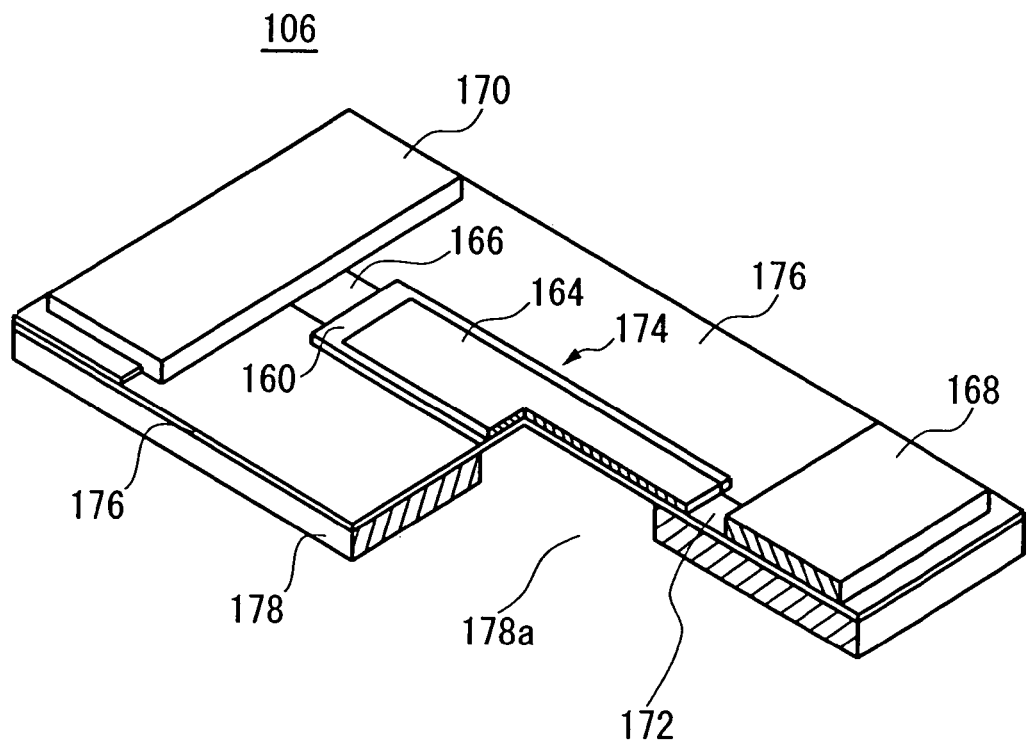
FIG. 15 shows a cross section of a part of the actuator 106 shown in FIG. 14.

FIG. 14 shows the manufacturing method of the actuator 106. A plurality of the actuators 106, four numbers in the case of the FIG. 14, are formed as one body. The actuator 106 shown in FIG. 15 is manufactured by cutting the plurality of actuator 106, which is formed in one body as shown in FIG. 14, at each of the actuator 106. If the each of the piezoelectric elements of the each of the plurality of the actuator 106, which is formed in one body as shown in FIG. 14, are circular shape, the actuator 106 shown in FIG. 1 can be manufactured by cutting the actuator 106, which is formed as one body, at each of actuator 106. By forming a plurality of the actuator 106 in one body, a plurality of actuator 106 can be manufactured effectively at the same time, and also the handling during the transportation becomes easy.

The actuator 106 has a thin plate or a vibrating plate 176, a base plate 178, an elastic wave generating device or piezoelectric element 174, a terminal forming member or an upper electrode terminal 168, and a terminal forming member or a lower electrode terminal 170. The piezoelectric element 174 includes a piezoelectric vibrating plate or a piezoelectric layer 160, an upper electrode 164, and a lower electrode 166. The vibrating plate 176 is formed on the top surface of the base plate 178, and the lower electrode 166 is formed on the top surface of the vibrating plate 176. The piezoelectric layer 160 is formed on the top surface of the lower electrode 166, and the upper electrode 164 is formed on the top surface of the piezoelectric layer 160. Therefore, the main portion of the piezoelectric layer 160 is formed by sandwiching the main portion of the piezoelectric layer 160 by the main portion of the upper electrode 164 and the main portion of the lower electrode 166 from top side and from bottom side.

A plurality of the piezoelectric element 174, four numbers in the case of FIG. 14, is formed on the vibrating plate 176. The lower electrode 166 is formed on the top surface of the vibrating plate 176. The piezoelectric layer 160 is formed on the top surface of the lower electrode 166, and the upper electrode 164 is formed on the top surface of the piezoelectric layer 160. The upper electrode terminal 168 and the lower electrode terminal 170 are formed on the end portion of the upper electrode 164 and the lower electrode 166. The four numbers of the actuator 106 are used separately by cutting each of the actuator 106 separately.

Figure 16:
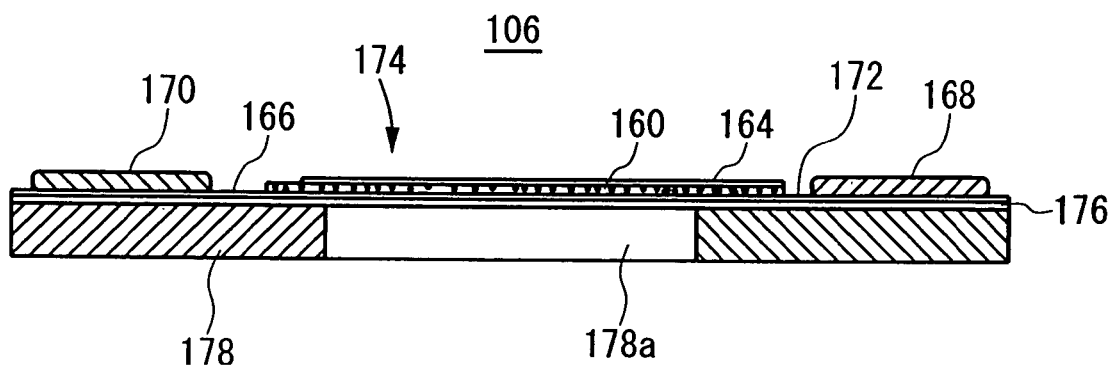
FIG. 16 shows a cross section of the entire actuator 106 shown in FIG. 14.

FIG. 15 shows a cross-section of a part of the actuator 106 shown in FIG. 15. The through hole 178a is formed on the face of the base plate 178 which faces with the piezoelectric element 174. The through hole 178a is sealed by the vibrating plate 176. The vibrating plate 176 is formed by the material which has electric insulating characteristic such as alumina and zirconium oxide and also possible to be deformed elastically. The piezoelectric element 174 is formed on the vibrating plate 176 to face with the through hole 178a. The lower electrode 166 is formed on the surface of the vibrating plate 176 so as to be extended to the one direction, left direction in FIG. 16, from the region of the through hole 178a. The upper electrode 164 is formed on the surface of the piezoelectric layer 160 so as to be extended to the opposite direction of the lower electrode 166, which is right direction in FIG. 16, from the region of the through hole 178a. Each of the upper electrode terminal 168 and the lower electrode terminal 170 is formed on the surface of the each of supplementary electrode 172 and the lower electrode 166, respectively. The lower electrode terminal 170 with the lower electrode 166 electrically, and the upper electrode terminal 168 contacts with the upper electrode 164 electrically through the supplementary electrode 172 to deliver a signal between the piezoelectric element and the outside of the actuator 106. The upper electrode terminal 168 and the lower electrode terminal 170 has a height higher than the height of the piezoelectric element which is the sum of the height of the electrodes and the piezoelectric layer.

Figure 17:
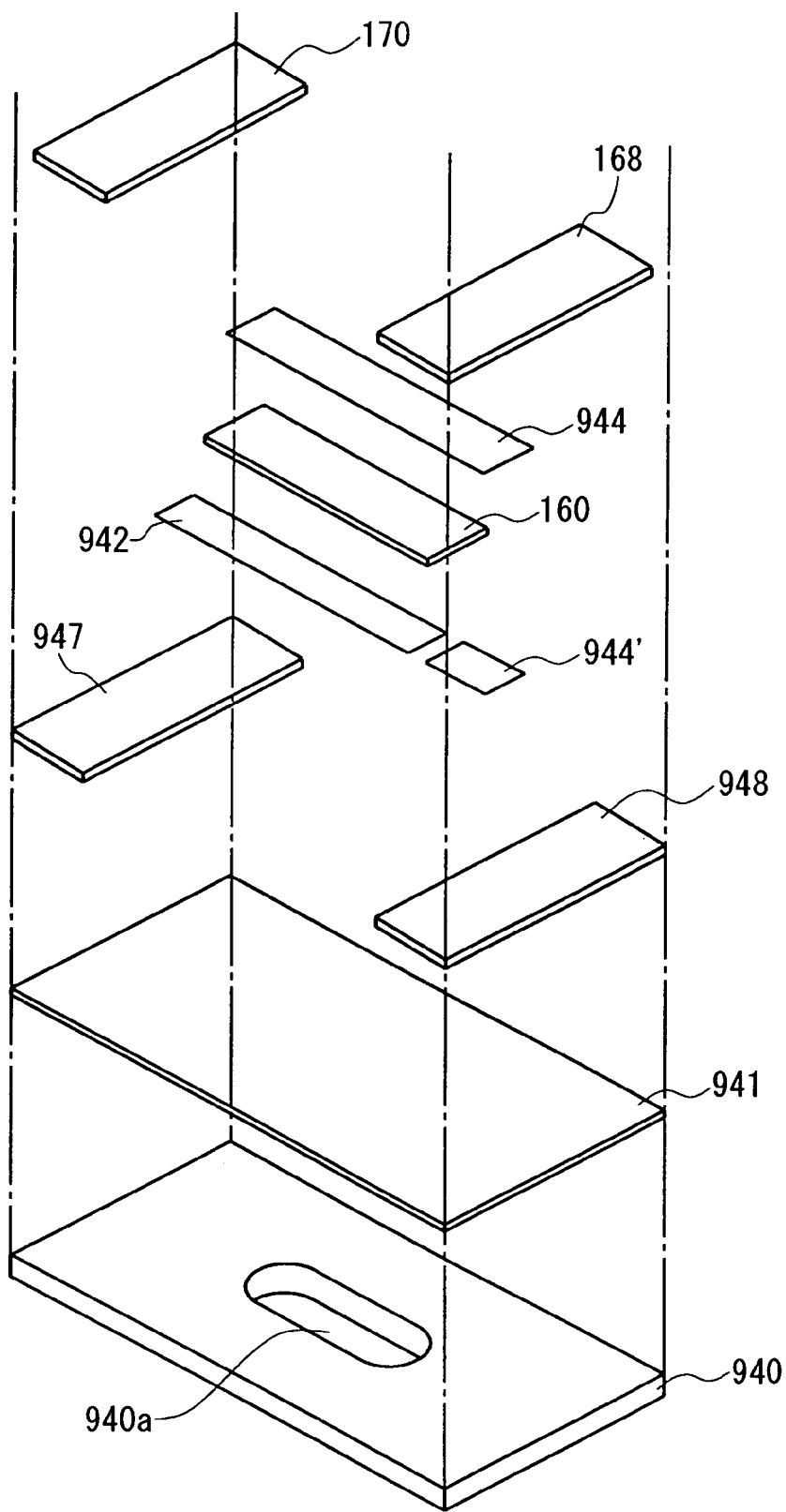
FIG. 17 shows a manufacturing method of the actuator 106 shown in FIG. 14.

FIG. 17 shows the manufacturing method of the actuator 106 shown in FIG. 14. First, a through hole 940a is formed on a green sheet 940 by perforating the green sheet 940 by a press or laser processing. The green sheet 940 becomes the base plate 178 after the burning process. The green sheet 940 is formed by the material such as ceramic material. Then, a green sheet 941 is laminated on the surface of the green sheet 940. The green sheet 941 becomes the vibrating plate 176 after the burning process. The green sheet 941 is formed by the material such as zirconium oxide. Then, a conductive layer 942, the piezoelectric layer 160, and a conductive layer 944 is formed on the surface of the green sheet 941 sequentially by the method such as printing. The conductive layer 942 becomes the lower electrode 166, and the conductive layer 944 becomes the upper electrode 164 after the burning process. Next, the green sheet 940, the green sheet 941, the conductive layer 942, the piezoelectric layer 160, and the conductive layer 944 are dried and burned. The spacer member 947 and 948 are provided on the green sheet 941 to raising the height of the upper electrode terminal 168 and the lower electrode terminal 170 to be higher than the piezoelectric element. The spacer member 947 and 948 is formed by printing the same material with the green sheet 940 and 941 or by laminating the green sheet on the green sheet 941. By this spacer member 947 and 948, the quantity of the material of the upper electrode terminal 168 and the lower electrode terminal 170, which is a noble metal, can be reduced. Moreover, because the thickness of the upper electrode terminal 168 and the lower electrode terminal 170 can be reduced, the upper electrode terminal 168 and the lower electrode terminal 170 can be accurately printed to be a stable height.

If a connection part 944', which is connected with the conductive layer 944, and the spacer member 947 and 948 are formed at the same time when the conductive layer 942 is formed, the upper electrode terminal 168 and the lower electrode terminal 170 can be easily formed and firmly fixed. Finally, the upper electrode terminal 168 and the lower electrode terminal 170 are formed on the end region of the conductive layer 942 and the conductive layer 944. During the forming of the upper electrode terminal 168 and the lower electrode terminal 170, the upper electrode terminal 168 and the lower electrode terminal 170 are formed to be connected with the piezoelectric layer 160 electrically.

Figure 18A:
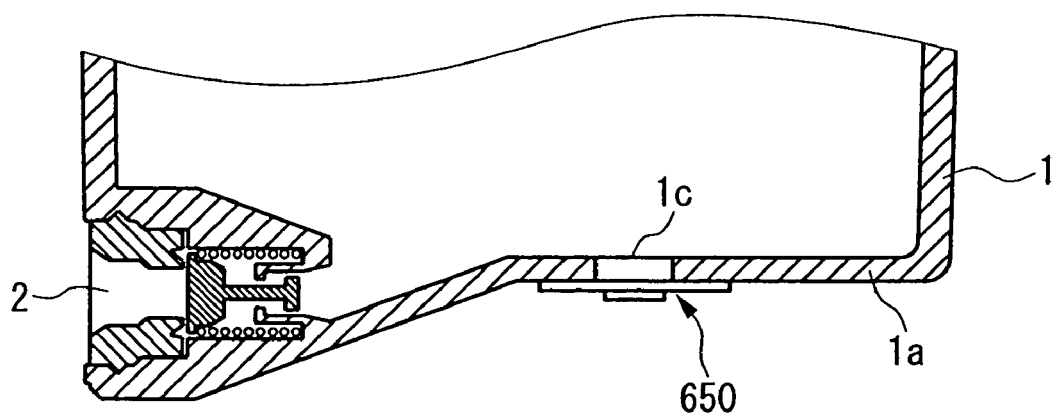
FIGS. 18A, 18B and 18C show an ink cartridge according to still another embodiment of the present invention.

FIG. 18 shows further other embodiment of the ink cartridge of the present invention. FIG. 18(A) is a cross sectional view of the bottom part of the ink cartridge of the present embodiment. The ink cartridge of the present embodiment has a through hole 1c on the bottom face 1a of the container 1, which contains ink. The bottom part of the through hole 1c is closed by the actuator 650 and forms an ink storing part.

Figure 18B:
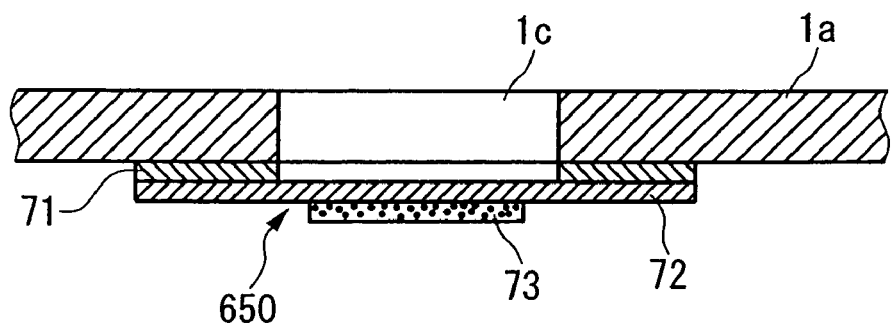
Figure 18C:
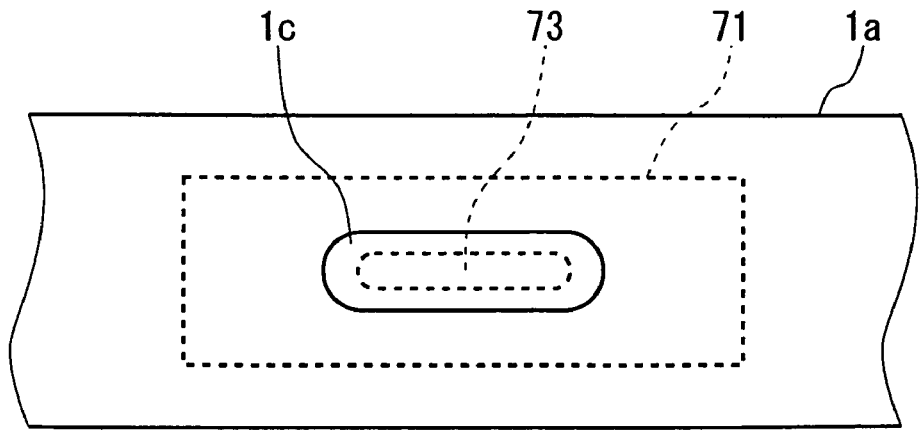

FIG. 18(B) shows a detailed cross section of the actuator 650 and the through hole 1c shown in FIG. 18(A). FIG. 18(C) shows a plan view of the actuator 650 and the through hole 1c shown in FIG. 18(B). The actuator 650 has a vibrating plate 72 and a piezoelectric element 73 which is fixed to the vibrating plate 72. The actuator 650 is fixed to the bottom face of the container 1 such that the piezoelectric element 73 can face to the through hole 1c through the vibrating plate 72 and the base plate 72. The vibrating plate 72 can be elastically deformed and is ink resistant.

Amplitude and frequency of the counter electromotive force generated by the residual vibration of the piezoelectric element 73 and the vibrating plate 72 changes with the ink quantity in the container 1. The through hole 1c is formed on the position which is faced to actuator 650, and the minimum constant amount of ink is secured in the through hole 1c. Therefore, the status of the end of ink end can be reliably detected by previously measuring the characteristic of the vibration of the actuator 650, which is determined by the ink quantity secured in the through hole 1c.

Figure 19A:
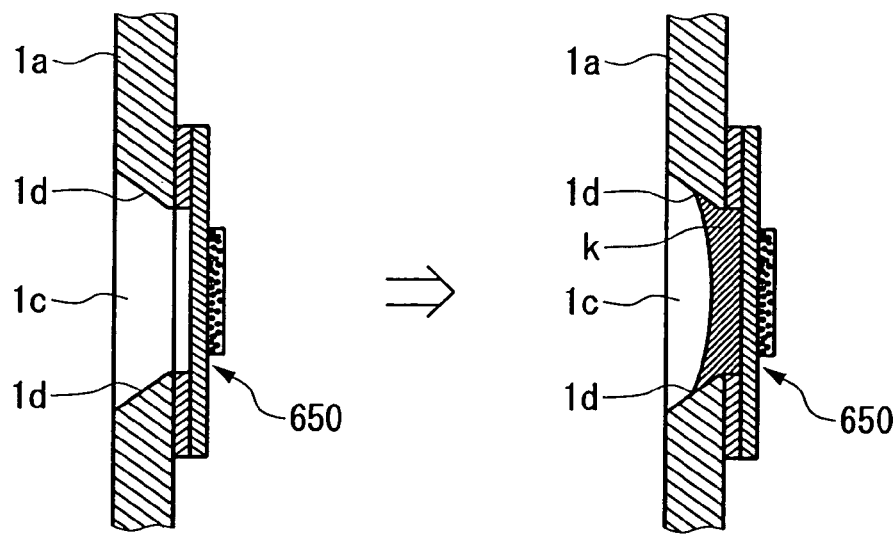
FIGS. 19A, 19B and 19C show another embodiment of the through hole 1c.
Figure 19B:
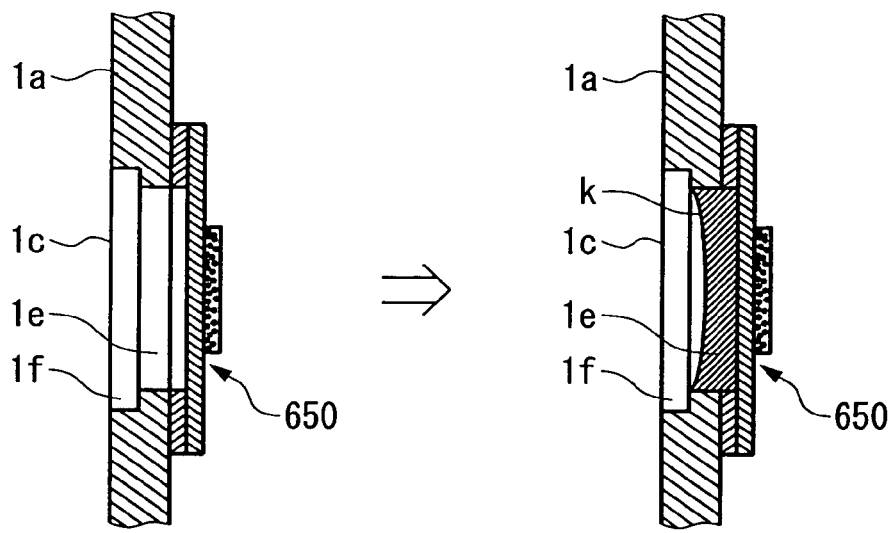
Figure 19C:
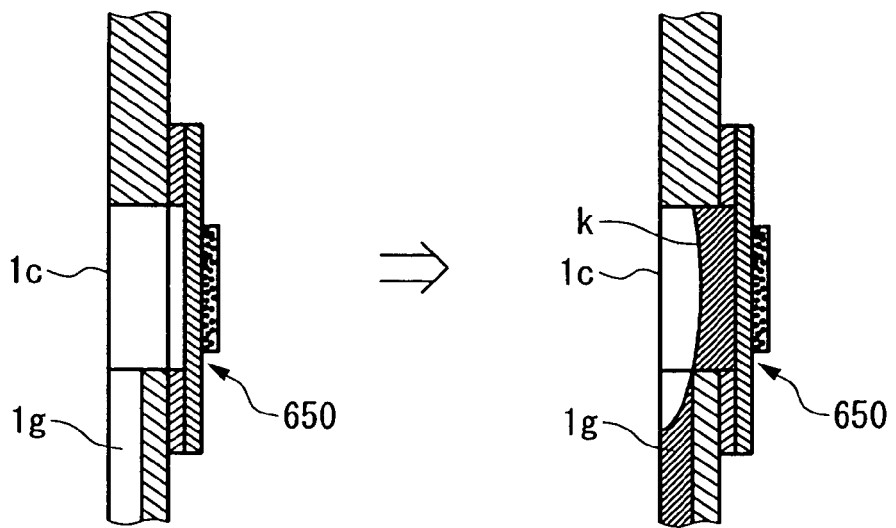

FIG. 19 shows other embodiment of the through hole 1c. In each of FIGS. 19(A), (B), and (C), the left hand side of the figure shows the status that there is no ink K in the through hole 1c, and the right hand side of the figure shows the status that ink K is remained in the through hole 1c. In the embodiment of FIG. 18, the side face of the through hole 1c is formed as the vertical wall. In FIG. 19(A), the side face id of the through hole 1c is slanted in vertical direction and opens with expanding to the outside. In FIG. 19(B), a stepped portion 1e and 1f are formed on the side face of the through hole 1c. The stepped portion if, which is provided above the stepped portion 1e, is wider than the stepped portion 1e. In FIG. 19(C), the through hole 1c has a groove 1g that extends to the direction in which ink is easily discharged, that is, the direction to a ink supply port 2.

According to the shape of the through hole 1c shown in FIG. 19(A) to 19(C), the quantity of ink K in the ink storing part can be reduced. Therefore, because the M'cav can be smaller than the M'max explained in FIG. 1 and FIG. 2, the vibration characteristic of the actuator 650 at the time of the ink end status can be greatly different with the vibration characteristic when enough quantity of ink K for printing is remained in the container 1, and thus the ink end status can be reliably detected.

Figure 20:
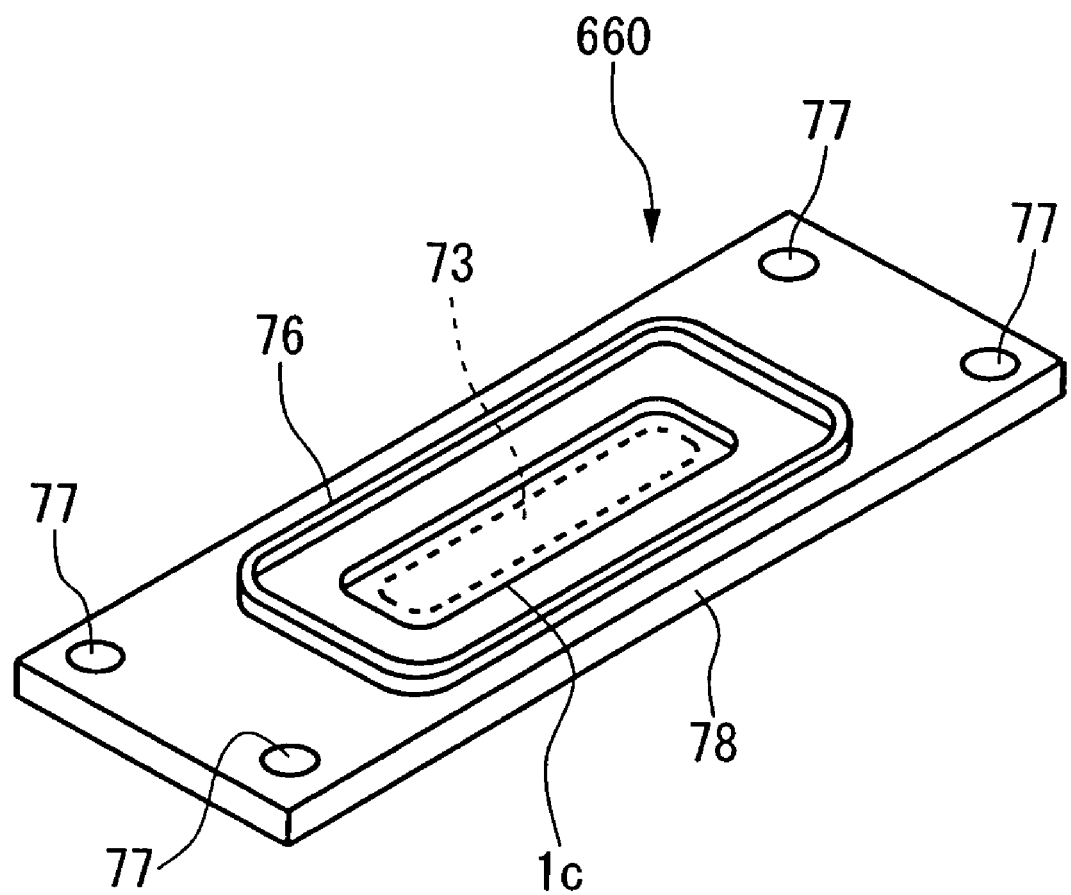
FIG. 20 shows an actuator 660 according to another embodiment.

FIG. 20 shows a slant view of the other embodiment of the actuator. The actuator 660 has packing 76 on the outside of the base plate, which constitutes the actuator 660, or the through hole 1c of a mounting plate 72. Caulking holes 77 are formed on the outskirts of the actuator 660. The actuator 660 is fixed to the container 1 through the caulking hole 77 with caulking.

Figure 21:
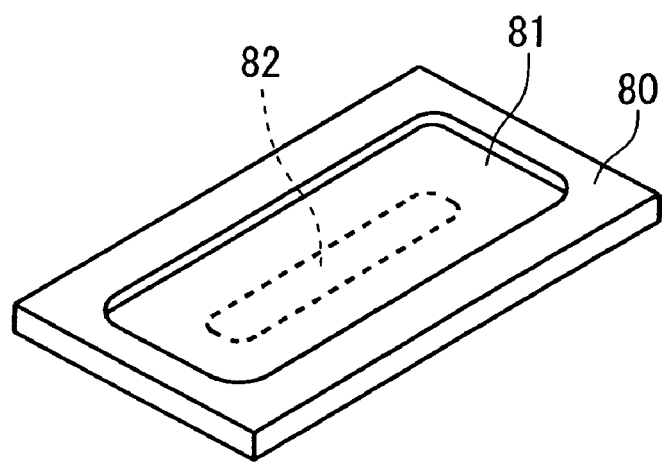
FIGS. 21A and 21B show an actuator 670 according to still another embodiment.
Figure 21:
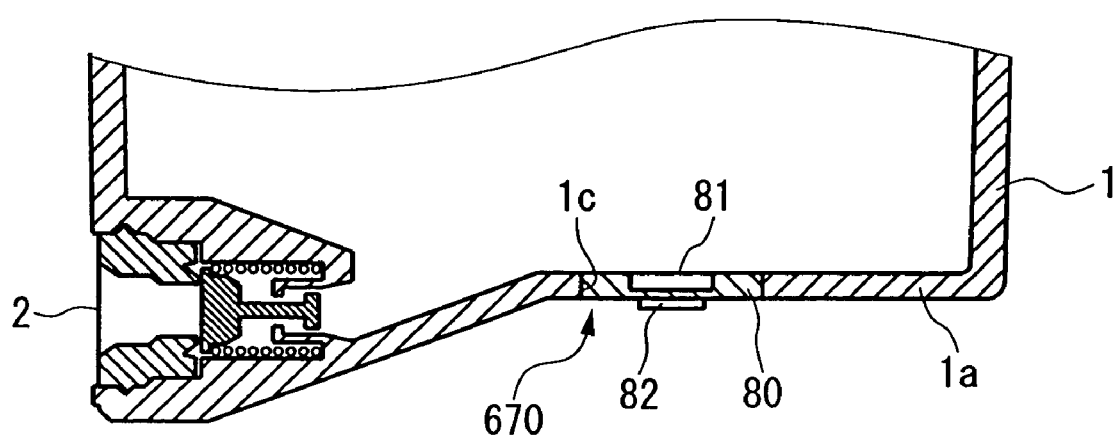

FIGS. 21(A) and 21(B) is a slant view of the further other embodiment of the actuator. In this embodiment, the actuator 670 comprises a concave part forming base plate 80 and a piezoelectric element 82. The concave part 81 is formed on the one side of the face of the concave part forming base plate 80 by the technique such as etching, and piezoelectric element 82 is mounted on the other side of the face of the concave part forming base plate 80. The bottom portion of the concave part 81 operates as a vibrating region within the concave part forming base plate 80. Therefore, the vibrating region of the actuator 670 is determined by the periphery of the concave part 81. Furthermore, the actuator 670 has the similar structure with the structure of the actuator 106 shown in FIG. 1, in which the base plate 178 and the vibrating plate 176 is formed as one body. Therefore, the manufacturing process during the manufacturing an ink cartridge can be reduced, and the cost for manufacturing an ink cartridge also can be reduced. The actuator 670 has a size which can be embedded into the through hole 1c provided on the container 1. By this embedding process, the concave part 81 can operates as the cavity. The actuator 106 shown in FIG. 1 can be formed to be embedded into through hole 1c as actuator 670 shown in FIG. 21.

Figure 22:
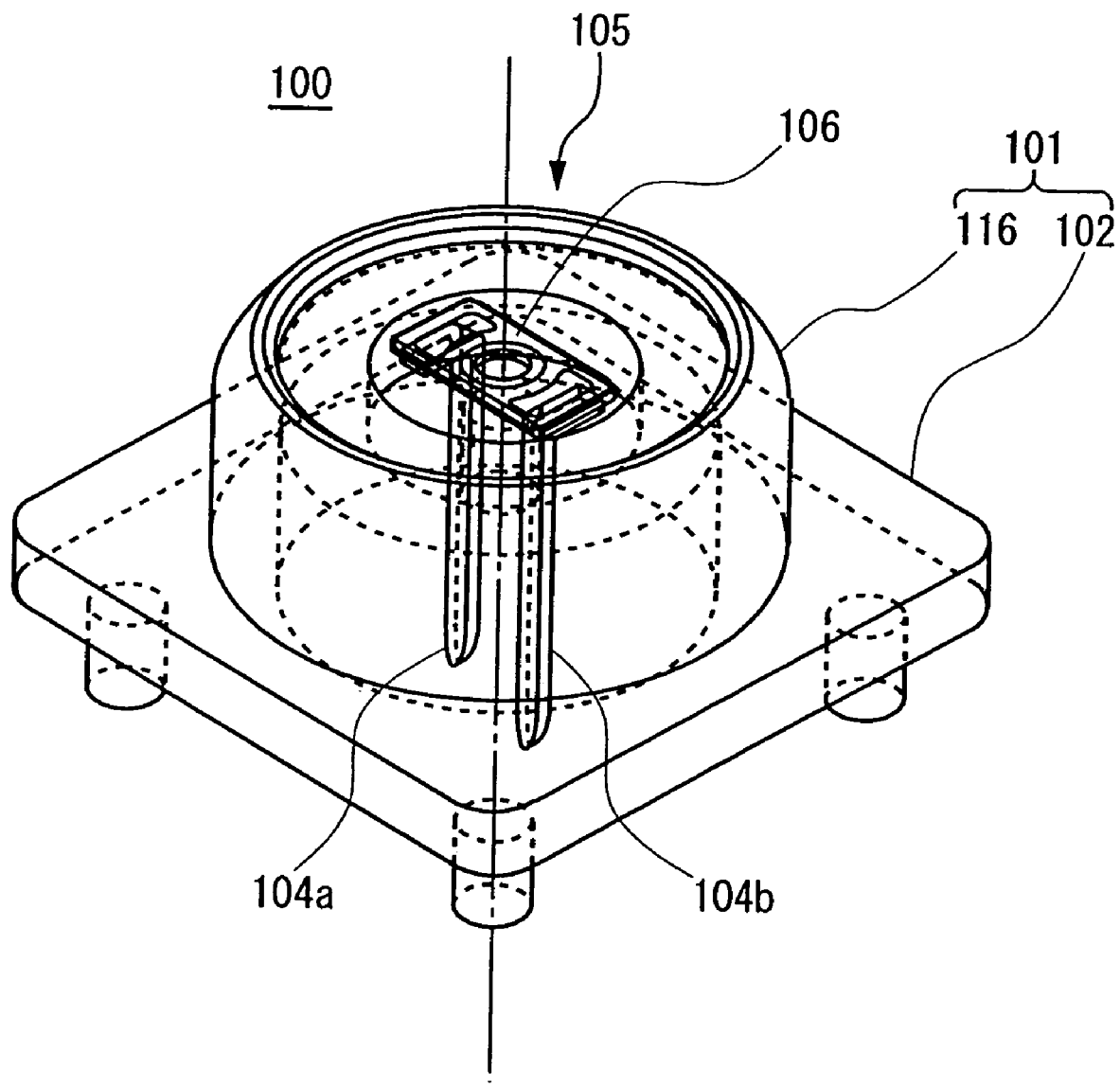
FIG. 22 is a perspective view showing a module 100.

FIG. 22 shows a slant view of the configuration that forms the actuator 106 in one body as a mounting module 100. The module 100 is mounted on the predetermined position of the container 1 of an ink cartridge. The module 100 is constituted to detect the ink consumption status in the container 1 by detecting at least the change of acoustic impedance of the ink liquid. The module 100 of the present embodiment has a liquid container mounting member 101 for mounting the actuator 106 to the container 1. The liquid container mounting member 101 has a structure which mounts a cylindrical part 116 that contains the actuator 106 which oscillates by the driving signal on a base mount 102, the plan of which is substantially rectangular. Because the module 100 is constructed so that the actuator 106 of the module 100 can not be contact from outside when the module 100 is mounted on the ink cartridge, the actuator 106 can be protected from outside contact. The top side of the edge of the cylindrical part 116 is chamfered so that the cylindrical part 116 can be easily fit into the hole which is formed in the ink cartridge.

Figure 23:
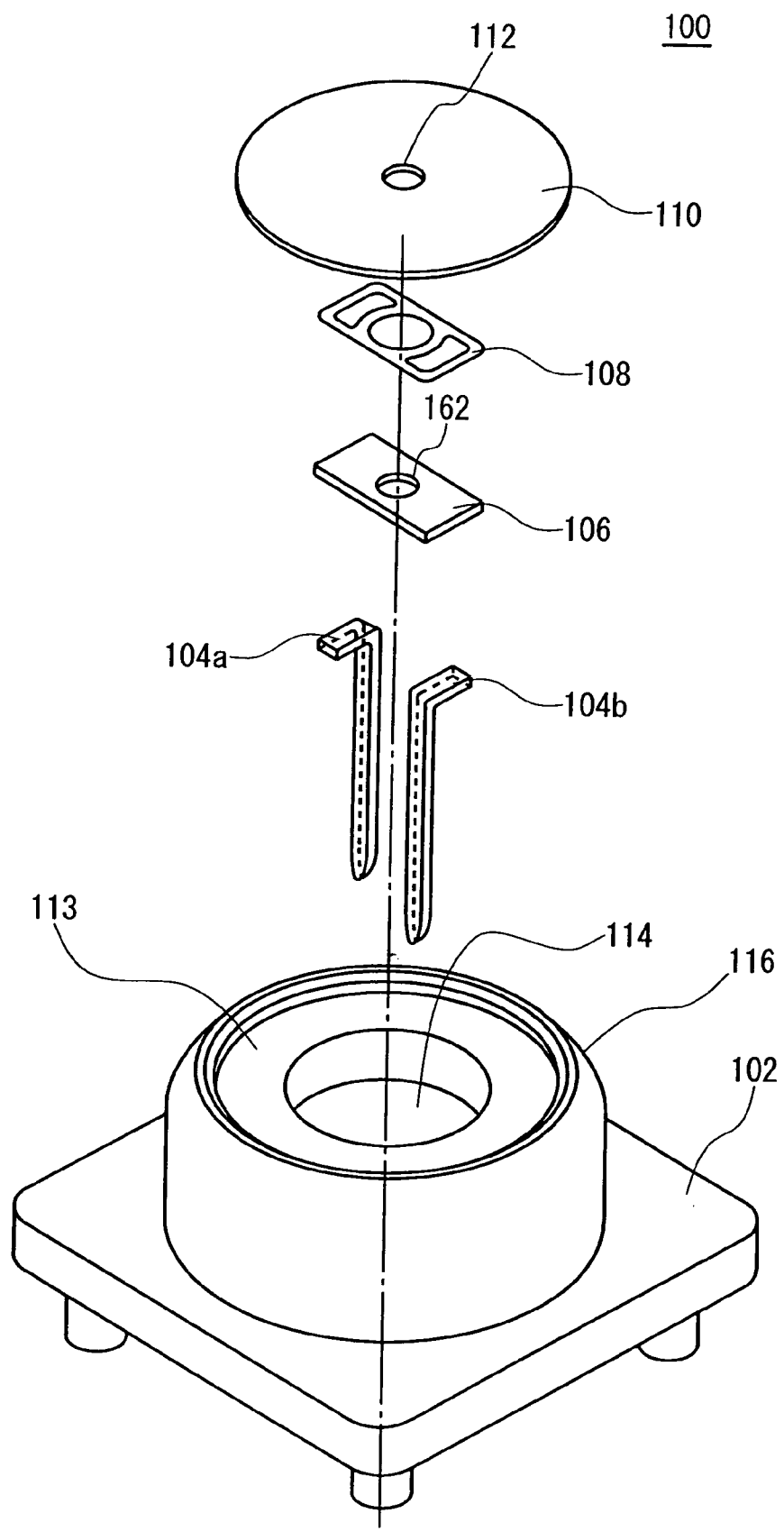
FIG. 23 is an exploded view showing the structure of the module 100 shown in FIG. 22.

FIG. 23 shows an exploded view of the module 100 shown in FIG. 22 to show the structure of the module 100. The module 100 includes a liquid container mounting member 101 made from a resin and a piezoelectric device mounting member 105 which has a plate 110 and a concave part 113. Furthermore, the module 100 has a lead wire 104a and 104b, actuator 106, and a film 108. Preferably, the plate 110 is made from a material which is difficult to be rust such as stainless or stainless alloy. The opening 114 is formed on the central part of the cylindrical part 116 and the base mount 102 which are included in the liquid container mounting member 101 so that the cylindrical part 116 and the base mount 102 can contain the lead wire 104a and 104b. The concave part 113 is formed on the central part of the cylindrical part 116 and the base mount 102 so that the cylindrical part 116 and the base mount 102 can contain the actuator 106, the film 108, and the plate 110. The actuator 106 is connected to the plate 110 through the film 108, and the plate 110 and the actuator 106 are fixed to the liquid container mounting member 101. Therefore, the lead wire 104a and 104b, the actuator 106, the film 108 and the plate 110 are mounted on the liquid container mounting member 101 as one body. Each of the lead wire 104a and 104b transfer a driving signal to piezoelectric layer by coupling with the upper electrode and the lower electrode 166 of the actuator 106, and also transfer the signal of resonant frequency detected by the actuator 106 to recording apparatus. The actuator 106 oscillates temporally based on the driving signal transferred from the lead wire 104a and 104b. The actuator 106 vibrates residually after the oscillation and generates a counter electromotive force by the residual vibration. By detecting the vibrating period of the waveform of the counter electromotive force, the resonant frequency corresponding to the consumption status of the liquid in the liquid container can be detected. The film 108 bonds the actuator 106 and the plate 110 to seal the actuator 106. The film 108 is preferably formed by such as polyolefin and bonded to the actuator 106 and the plate 110 by heat sealing. By bonding the actuator 106 and the plate 110 with the film 108 face with face, the unevenness of the bonding on location decreases, and thus the portion other than the vibrating plate does not vibrate. Therefore, the change of the resonant frequency before and after bonding the actuator 106 to plate 110 is small.

The plate 110 is circular shape, and the opening 114 of the base mount 102 is formed in cylindrical shape. The actuator 106 and the film 108 are formed in rectangular shape. The lead wire 104, the actuator 106, the film 108, and the plate 110 can be attached to and removed from the base mount 102. Each of the base mount 102, the lead wire 104, the actuator 106, the film 108, and the plate 110 is arranged symmetric with respect to the central axis of the module 100. Furthermore, each of the centers of the base mount 102, the actuator 106, the film 108, and the plate 110 is arranged substantially on the central axis of the module 100.

The opening 114 of the base mount 102 is formed such that the area of the opening 114 is larger than the area of the vibrating region of the actuator 106. The through hole 112 is formed on the center of the plate 110 where the vibrating section of the actuator 106 faces. As shown in FIG. 1 and FIG. 2, the cavity 162 is formed on the actuator 106, and both of the through holes 112 and the cavity 162 forms ink storing part. The thickness of the plate 110 is preferably smaller than diameter of the through hole 112 to reduce the influence of the residual ink. For example, the depth of the through hole 112 is preferably smaller than one third of the diameter of the through hole 112. The shape of the through hole 112 is substantially true circle and symmetric with respect to the central axis of the module 100. Furthermore, the area of the through hole 112 is larger than the area of opening of the cavity 162 of the actuator 106. The periphery of the shape of the cross-section of the through hole 112 can be tapered shape of stepped shape. The module 100 is mounted on the side, top, or bottom of the container 1 such that the through hole 112 faces to the inside of the container 1. When the ink is consumed, and the ink around the actuator 106 is exhausted, the resonant frequency of the actuator 106 greatly changes. The change of the ink level can thus be detected.

Figure 24:
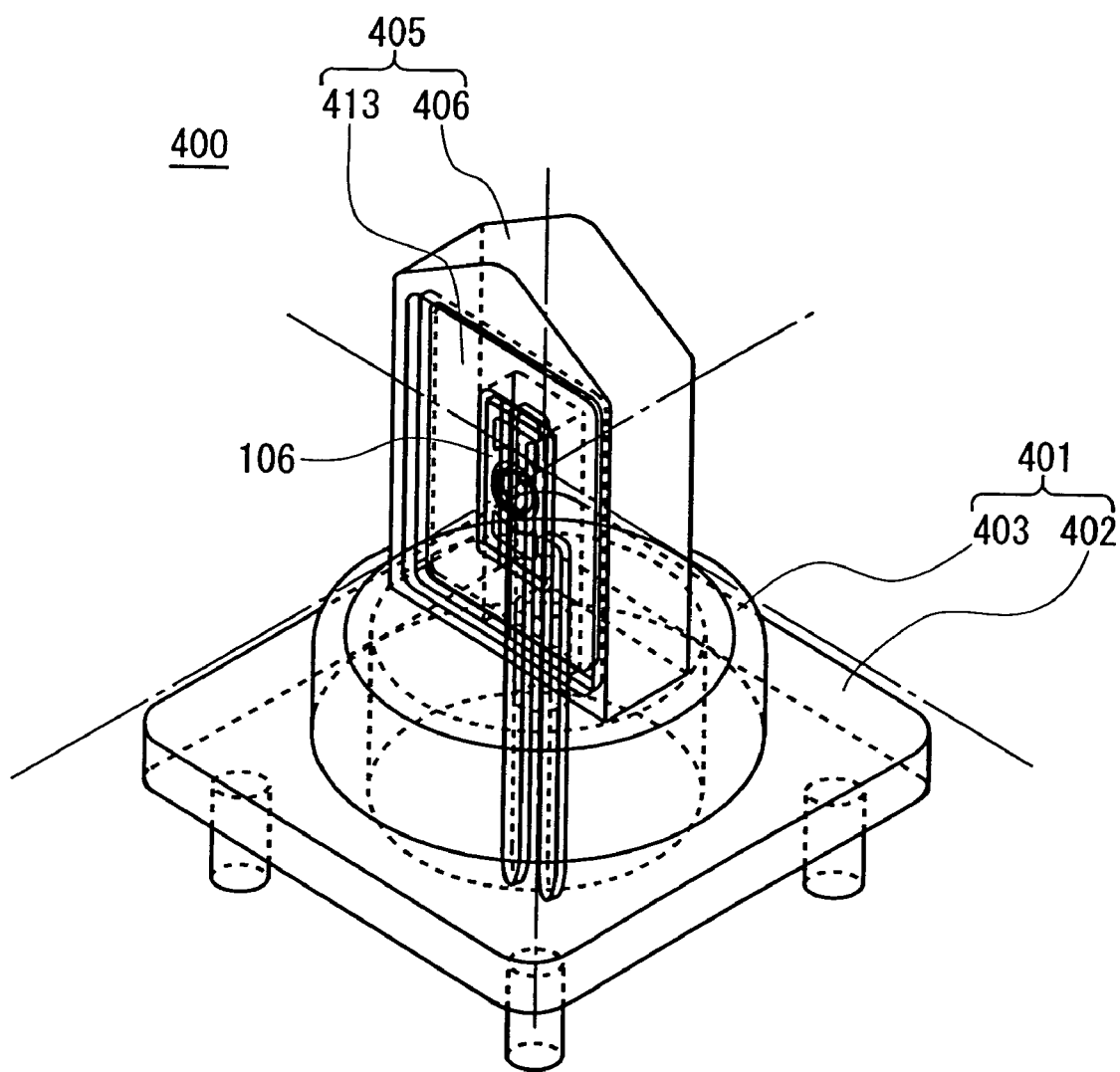
FIG. 24 shows another embodiment of the module 100.

FIG. 24 shows the slant view of the other embodiments of the module. The piezoelectric device mounting member 405 is formed on the liquid container mounting member 101 in the module 400 of the present embodiment. The cylindrical part 403, which has a cylindrical shape, is formed on the base mount 102, which has a square shaped plan, the edges of which are rounded, in the liquid container mounting member 401. Furthermore, the piezoelectric apparatus mounting member 405 includes a board shaped element 405, which is set up on the cylindrical part 403, and a concave part 413. The actuator 106 is arranged on the concave part 413 provided on the side face of the board shaped element 406. The top end of the board shaped element 406 is chamfered in predetermined angle so that the board shaped element is easy to fit into hole formed on the ink cartridge when mounting the actuator 106 to ink cartridge.

Figure 25:
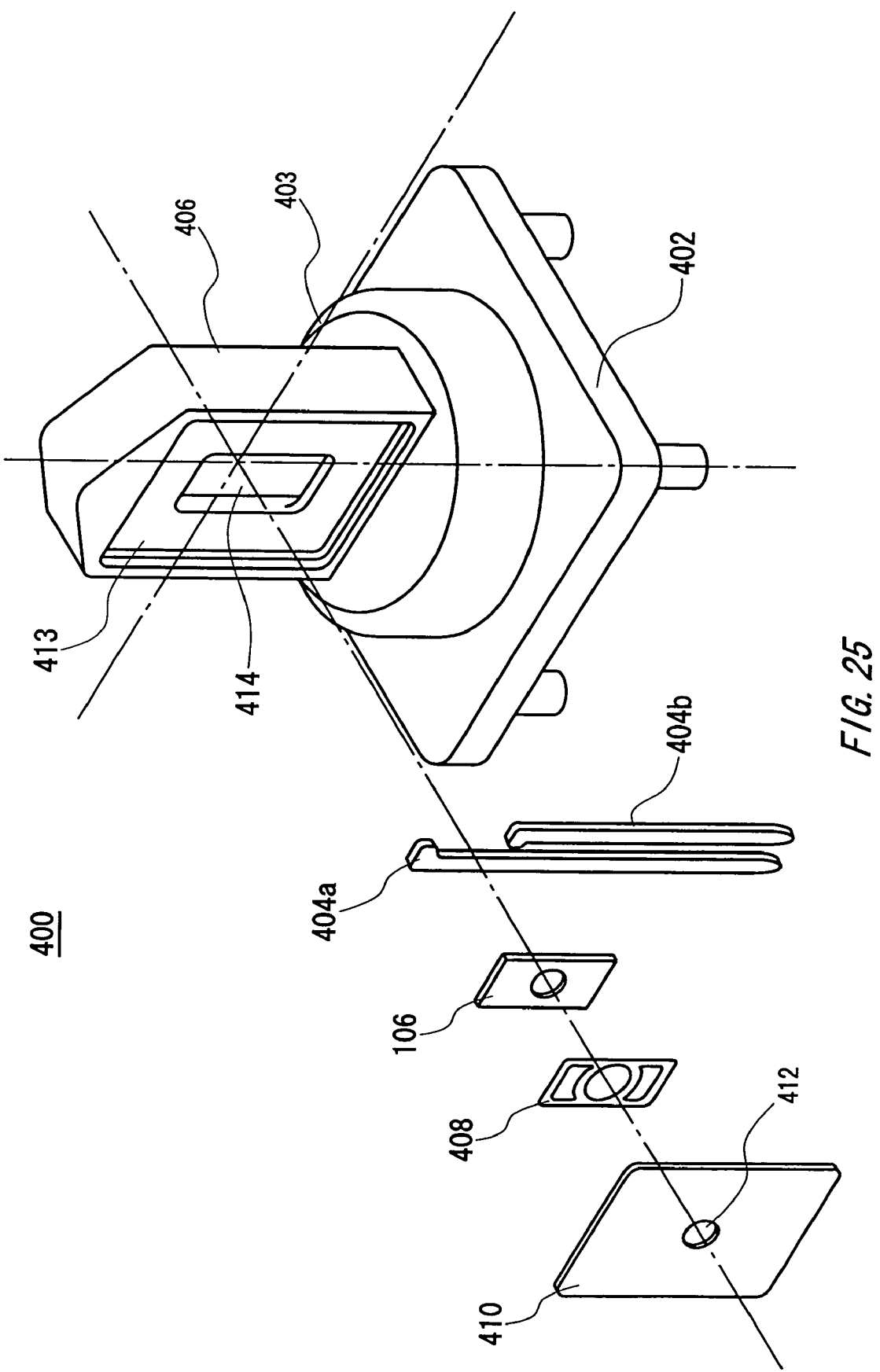
FIG. 25 is an exploded view showing the structure of the module 400 shown in FIG. 24.

FIG. 25 shows an exploded view of the module 400 shown in FIG. 24 to show the structure of the module 400. As the module 100 shown in FIG. 22, the module 400 includes a liquid container mounting member 401 and a piezoelectric device mounting member 405. The liquid container mounting member 401 has the base mount 402 and the cylindrical part 403, and the piezoelectric device mounting member 405 has the board shaped element 406 and the concave part 413. The actuator 106 is connected to the plate 410 and fixed to the concave part 413. The module 400 has a lead wire 404a and 404b, actuator 106, and a film 408.

According to the present embodiment, the plate 410 is rectangular shape, and the opening 414 provided on the board shaped element 406 is formed in rectangular shape. The lead wire 404a and 404b, the actuator 106, the film 408, and the plate 410 can be attached to and removed from the base mount 402. Each of the actuator 106, the film 408, and the plate 410 is arranged symmetric with respect to the central axis which is extended to perpendicular direction to the plan of opening 414 and also pass through the center of opening 414. Furthermore, each of the centers of the actuator 106, the film 408, and the plate 410 is arranged substantially on the central axis of the opening 414.

The through hole 412 provided on the center of the plate 410 is formed such that the area of the through hole 412 is larger than the area of the opening of the cavity 162 of the actuator 106. The cavity 162 of the actuator 106 and the through hole 412 together forms ink storing part. The thickness of the plate 410 is preferably smaller than diameter of the through hole 412. For example, the thickness of the plate 410 is smaller than one third of the diameter of the through hole 412. The shape of the through hole 412 is substantially true circle and symmetric with respect to the central axis of the module 400. The shape of the cross-section of the periphery of the through hole 112 can be tapered shape or stepped shape. The module 400 can be mounted on the bottom of the container 1 such that the through hole 412 is arranged inside of the container 1. Because the actuator 106 is arranged inside the container 1 such that the actuator 106 extends in the vertical direction, the setting of the timing of the ink end can be easily changed by changing the height of the mounting position of the actuator 106 in the container 1 by changing the height of the base mount 402.

Figure 26:
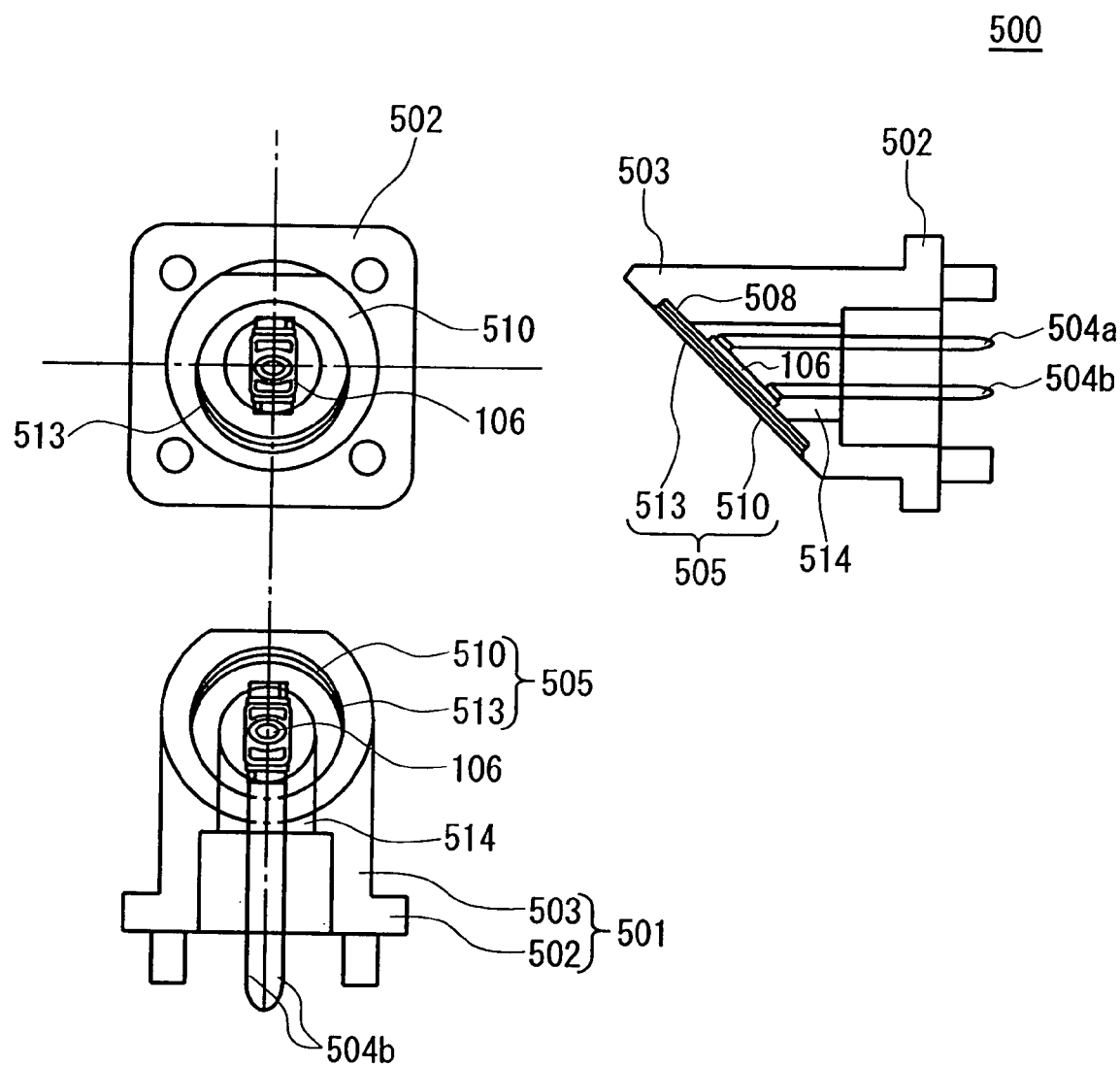
FIG. 26 shows still another embodiment of the module 100.

FIG. 26 shows the further other embodiment of the module. As the module 100 shown in FIG. 22, the module 500 of FIG. 26 includes a liquid container mounting member 501 which has a base mount 502 and a cylindrical part 503. Furthermore, the module 500 further has a lead wire 504a and 504b, actuator 106, a film 508, and a plate 510. The opening 514 is formed on the center of the base mount 502, which is included in the liquid container mounting member 501, so that the base mount 502 can contain the lead wire 504a and 504b. The concave part 513 is formed on the cylindrical part 503 so that the cylindrical part 503 can contain the actuator 106, the film 508, and the plate 510. The actuator 106 is fixed to the piezoelectric device mounting member 505 through the plate 510. Therefore, the lead wire 504a and 504b, the actuator 106, the film 508, and the plate 510 are mounted on the liquid container mounting member 501 as one body. The cylindrical part 503, the top face of which is slanted in vertical direction, is formed on the base mount which has a square shaped plan and the edges of which are rounded. The actuator 106 is arranged on the concave part 513 which is provided on the top surface of the cylindrical part 503 that is slanted in vertical direction.

The top end of the module 500 is slanted, and the actuator 106 is mounted on this slanted surface. Therefore, if the module 500 is mounted on the bottom or the side of the container 1, the actuator 106 slants in the vertical direction of the container 1. The slanting angle of the top end of the module 500 is substantially between 30 degree and 60 degree with considering the detecting performance.

The module 500 is mounted on the bottom or the side of the container 1 so that the actuator 106 can be arranged inside the container 1. When the module 500 is mounted on the side of the container 1, the actuator 106 is mounted on the container 1 such that the actuator 106 faces the upside, downside, or side of the container 1 with slanting. When the module 500 is mounted on the bottom of the container 1, the actuator 106 is preferable to be mounted on the container 1 such that the actuator 106 faces to the ink supply port side of the container 1 with slanting.

Figure 27:
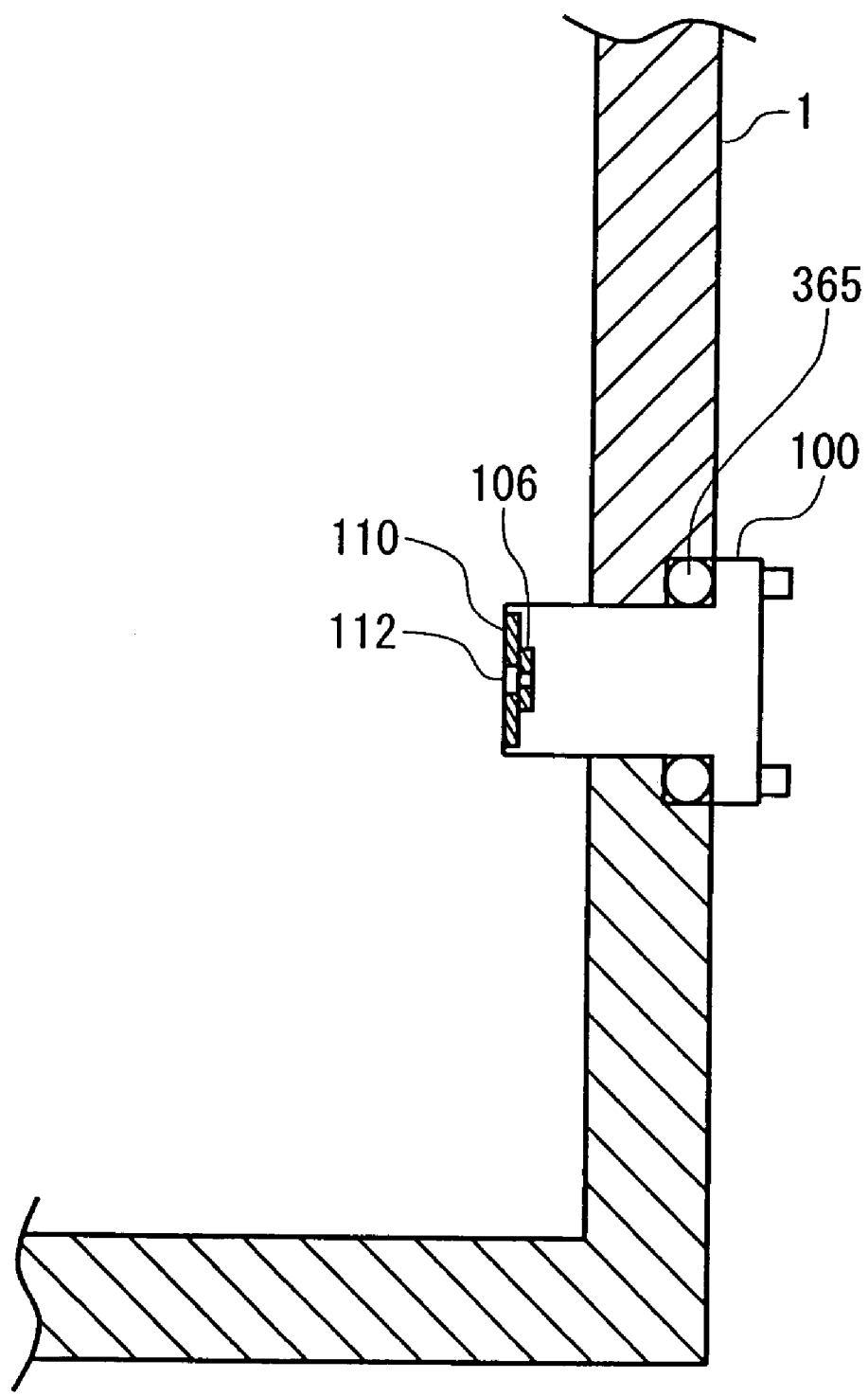
FIG. 27 shows an exemplary cross section of the module 100 shown in FIG. 22 where the module 100 is mounted to the ink container.

FIG. 27 shows a cross-sectional view around the bottom of the container 1 when the module 100 shown in FIG. 22 is mounted on the container 1. The module 100 is mounted on the container 1 so that the module 100 penetrates through the side wall of the container 1. The O-ring 365 is provided on the connection face of between the side wall of the container 1 and the module 100 to seal between the module 100 and the container 1. The module 100 is preferable to include the cylindrical part as explained in FIG. 22 so that the module 100 can be sealed by the O-ring. By inserting the top end of the module 100 inside the container 1, ink in the container 1 contacts with the actuator 106 through the through hole 112 of the plate 110. Because the resonant frequency of the residual vibration of the actuator 106 is different depends on whether the circumference of the vibrating section of the actuator 106 is liquid or gas, the ink consumption status can be detected using the module 100. Furthermore, not only the module 100 can be mounted on the container 1 and detect the existence of ink, but also the module 400 shown in FIG. 24, module 500 shown in FIG. 26, or the module 700A and 700B shown in FIG. 28, and a mold structure 600 can be mounted on the container 1 and detect the existence of the ink.

Figure 28C:
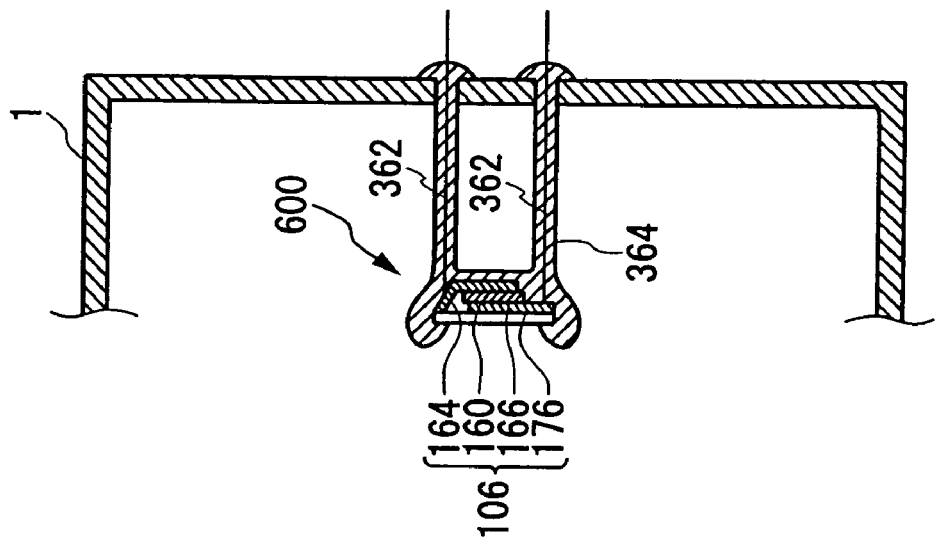
FIGS. 28A, 28B, and 28C show still another embodiment of the module 100.
Figure 28B:
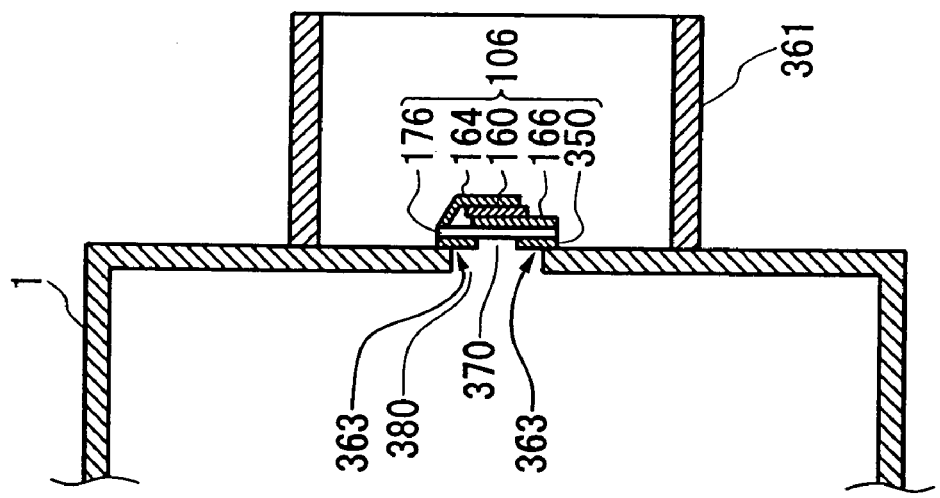
Figure 28A:
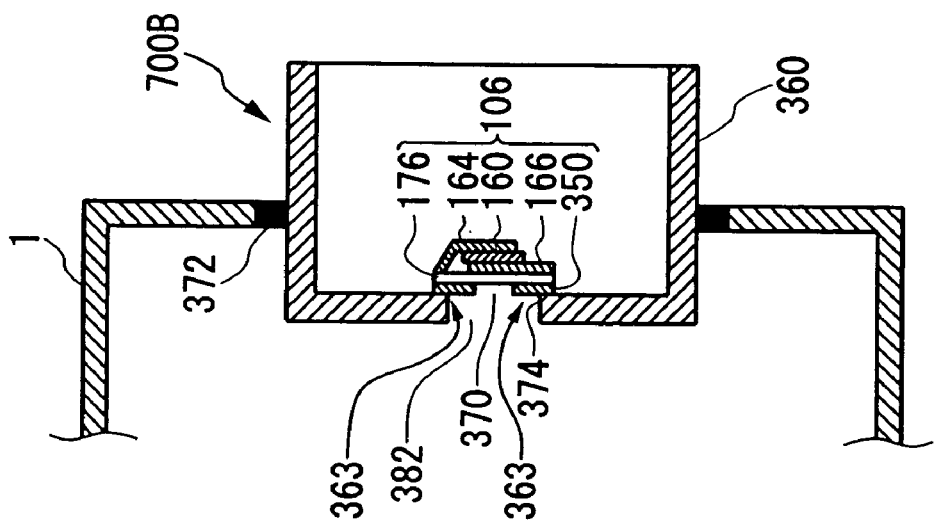

FIG. 28(A) shows the cross section of the ink container when mounting module 700B on the container 1. The present embodiment uses a module 700B as an example of a mounting structure. The module 700B is mounted on the container 1 such that the liquid container mounting member 360 protrude into the inside of the A through hole 370 is formed in the mounting plate 350, and the through hole 370 faces to the vibrating section of the actuator 106. Furthermore, a hole 382 is formed on the bottom wall of the module 700B, and a piezoelectric device mounting member 363 is formed. The actuator 106 is arranged to close the one of the face of the hole 382. Therefore, ink contacts with the vibrating plate 176 through the hole 382 of the piezoelectric device mounting member 363 and the through hole 370 of the mounting plate 350. The hole 382 of the piezoelectric device mounting member 363 and the through hole 370 of the mounting plate 350 together forms an ink storing part. The piezoelectric device mounting member 363 and the actuator 106 are fixed by the mounting plate 350 and the film material. The sealing structure 372 is provided on the connection part of the liquid container mounting member 360 and the container 1. The sealing structure 372 can be formed by the plastic material such as synthetic resin or O-ring. In FIG. 28(A), the module 700B and the container 1 is separate body, however, the piezoelectric device mounting member can be constituted by a part of the container 1 as shown in FIG. 28(B).

The module 700B shown in FIG. 28 does not need to embed the lead wire into the module as shown in FIG. 22 to FIG. 26. Therefore, the forming process becomes simple. Also, the exchange of the module 700B becomes possible so that the recycling of the module 700B also becomes possible.

There is possibility that the actuator 106 malfunctions by the contact of the ink which is dropped from a top face or a side face of the container 1 with the actuator 106, the ink of which is attached to the top face or the side face of the container 1 when the ink cartridge is shaken. However, because the liquid container mounting member 360 of the module 700B protrudes into the inside of the container 1, the actuator 106 does not malfunction by the ink dropped from the top face or the side face of the container 1.

Furthermore, the module 700B is mounted on the container 1 so that only part of the vibrating plate 176 and the mounting plate 350 are contact with ink inside of the container 1 in the embodiment of FIG. 28(A). The embedding of the electrode of the lead wire 104*a*, 104*b*, 404*a*, 404*b*, 504*a*, and 504 shown in FIG. 22 to FIG. 26 into the module becomes unnecessary for the embodiment shown in FIG. 28(A). Therefore, the forming process becomes simple. Also, the exchange of the actuator 106 becomes possible so that the recycling of the actuator 106 also becomes possible.

FIG. 28(B) shows the cross section of the ink container when mounting actuator 106 on the container 1. A protecting member 361 is mounted on the container separately with the actuator 106 in the ink cartridge of the embodiment shown in FIG. 28(B). Therefore, the protecting member 361 and the actuator 106 is not one body as a module, and the protecting member 361 thus can protect the actuator 106 not to be contact by the user. A hole 380 which is provide on the front face of the actuator 106 is arranged on the side wall of the container 1. The actuator 106 includes the piezoelectric layer 160, the upper electrode 164, the lower electrode 166, the vibrating plate 176, and the mounting plate 350. The vibrating plate 176 is formed on the mounting plate 350, and the lower electrode 166 is formed on the vibrating plate 176. The piezoelectric layer 160 is formed on the top face of the lower electrode 166, and the upper electrode 164 is formed on the top face of the piezoelectric layer 160. Therefore, the main portion of the piezoelectric layer 160 is formed by sandwiching the main portion of the piezoelectric layer 160 by the main portion of the upper electrode 164 and the lower electrode 166 from top and bottom. The circular portion, which is a main portion of each of the piezoelectric layer 160, the upper electrode 164, and the lower electrode 166, forms a piezoelectric element. The piezoelectric element is formed on the vibrating plate 176. The vibrating region of the piezoelectric element and the vibrating plate 176 constitutes the vibrating section, on which the actuator 106 actuary vibrates. A through hole 370 is provided on the mounting plate 350. Furthermore, a hole 380 is formed on the side wall of the container 1. Therefore, ink contacts with the vibrating plate 176 through the hole 380 of the container 1 and the through hole 370 of the mounting plate 350. The hole 380 of the container land the through hole 370 of the mounting plate 350 together forms ink storing part. Moreover, because the actuator 106 is protected by the protecting member 361, the actuator 106 can be protected form the outside contact. The base plate 178 shown in FIG. 1 can be used instead of the mounting plate 350 in the embodiment shown in FIGS. 28(A) and (B).

FIG. 28(C) shows an embodiment that comprises a mold structure 600 which includes the actuator 106. In the present embodiment, a mold structure 600 is used as one example of the mounting structure. The mold structure 600 has the actuator 106 and a mold member 364. The actuator 106 and the mold member 364 are formed in one body. The mold member 364 is formed by a plastic material such as silicon resin. The mold member 364 includes a lead wire 362 in its inside. The mold member 364 is formed so that the mold member 364 has two legs extended from the actuator 106. The end of the two legs of the mold member 364 are formed in a shape of hemisphere to liquid tightly fix the mold member 364 with container 1. The mold member 364 is mounted on the container 1 such that the actuator 106 protrudes into the inside of the container 1, and the vibrating section of the actuator 106 contacts with ink inside the container 1. The upper electrode 164, the piezoelectric layer 160, and the lower electrode 166 of the actuator 106 are protected from ink by the mold member 364.

Because the mold structure 600 shown in FIG. 28(C) does not need the sealing structure 372 between the mold member 364 and the container 1, the leaking of ink from the container 1 can be reduced. Moreover, because the mold structure 600 has a form that the mold structure 600 does not protrude from the outside of the container 1, the mold structure 600 can protect the actuator 106 from the outside contact. There is possibility that the actuator 106 malfunctions by the contact of the ink which is dropped from a top face or a side face of the container 1 with the actuator 106, the ink of which is attached to the top face or the side face of the container 1 when the ink cartridge is shaken. Because the mold member 364 of the mold structure 600 protrudes into the inside of the container 1, the actuator 106 does not malfunction by the ink dropped from the top face or the side face of the container 1.

Figure 29:
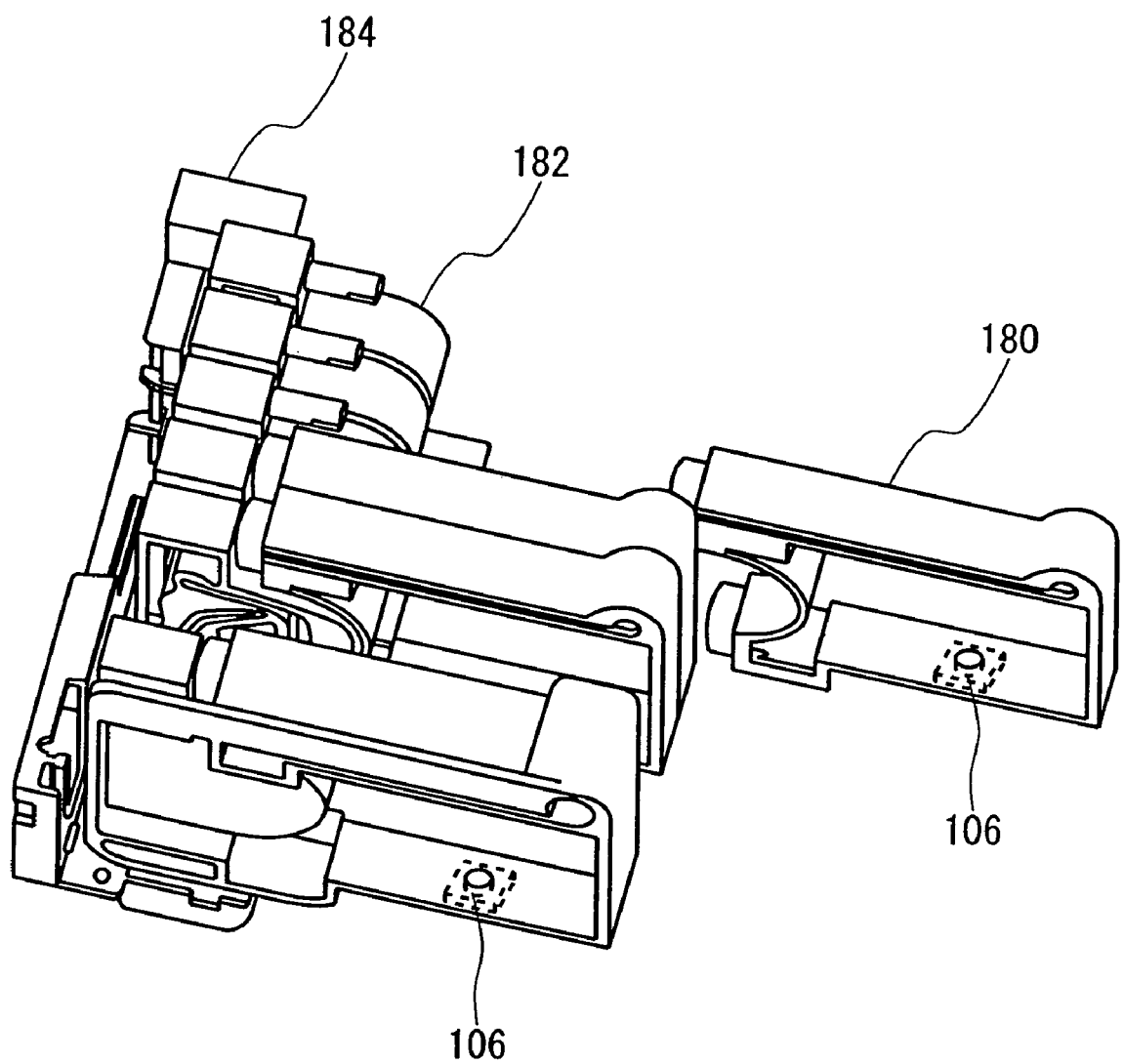
FIG. 29 shows an embodiment of an ink cartridge using the actuator 106 shown in FIG. 1 and an ink-jet recording apparatus therefor.

FIG. 29 shows an embodiment of ink cartridge and ink jet recording apparatus which uses the actuator 106 shown in FIG. 1. A plurality of ink cartridges 180 is mounted on the ink jet recording apparatus which has a plurality of ink introducing members 182 and a holder 184 each corresponding to the each of ink cartridge 180, respectively. Each of the plurality of ink cartridges 180 contains different types of ink, for example, different color of ink. The actuator 106, which detects at least acoustic impedance, is mounted on the each of bottom of the plurality of ink cartridge 180. The residual quantity of ink in the ink cartridge 180 can be detected by mounting the actuator 106 on the ink cartridge 180.

Figure 30:
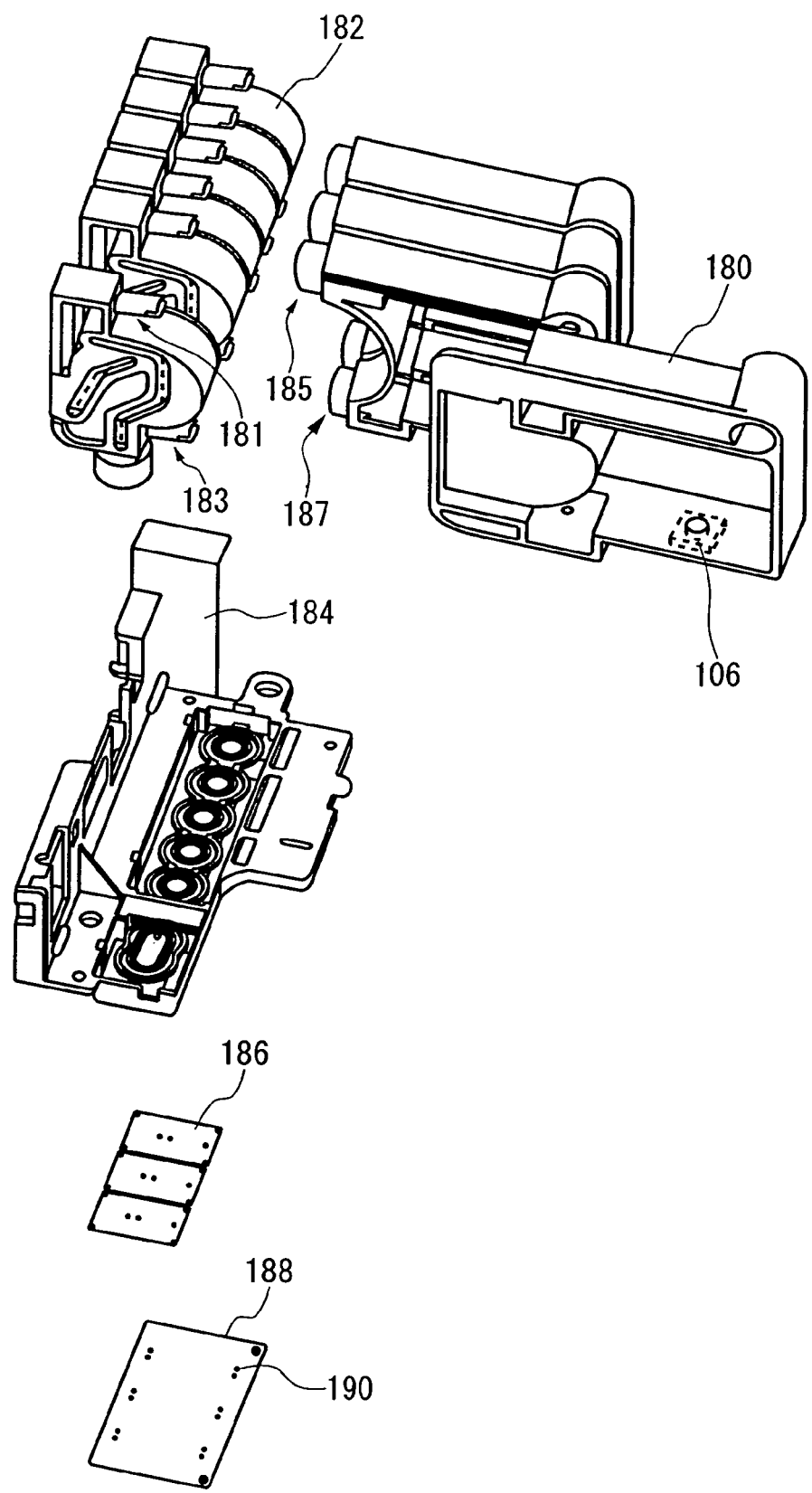
FIG. 30 shows a detail of the ink-jet recording apparatus.

FIG. 30 shows a detail around the head member of the ink jet recording apparatus. The ink jet recording apparatus has an ink introducing member 182, a holder 184, a head plate 186, and a nozzle plate 188. A plurality of nozzle 190, which jet out ink, is formed on the nozzle plate 188. The ink introducing member 182 has an air supply hole 181 and an ink introducing inlet 183. The air supply hole 181 supplies air to the ink cartridge 180. The ink introducing inlet 183 introduces ink from the ink cartridge 180. The ink cartridge 180 has an air introducing inlet 185 and an ink supply port 187. The air introducing inlet 185 introduces air from the air supply hole 181 of the ink introducing member 182. The ink supply port 187 supplies ink to the ink introducing inlet 183 of the ink introducing member 182. By introducing air from the ink introducing member 182 to the ink cartridge 180, the ink cartridge 180 accelerates the supply of ink from the ink cartridge 180 to the ink introducing member 182. The holder 184 communicates ink supplied from the ink cartridge 180 through the ink introducing member 182 to the head plate 186.

Figure 31:
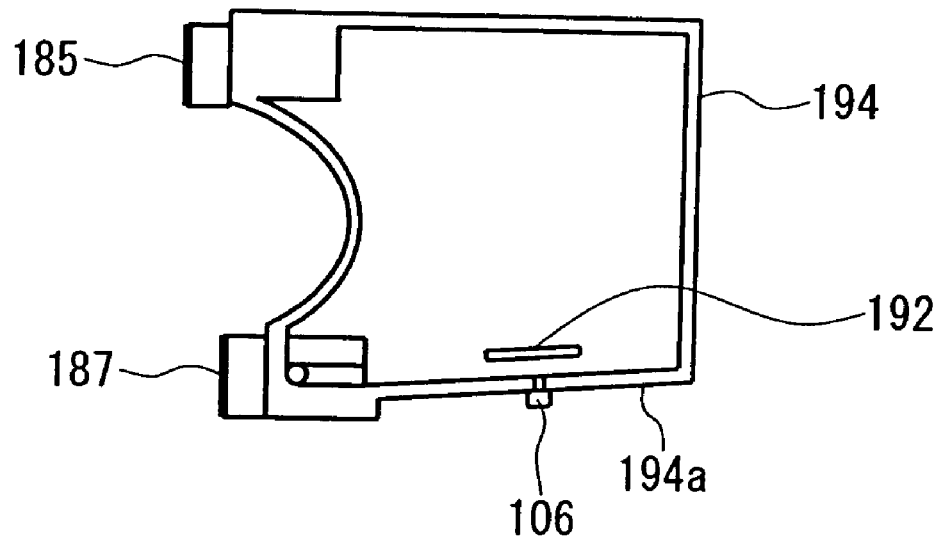
FIGS. 31A and 31B show other embodiments of the ink cartridge 180 shown in FIG. 30.
Figure 31:
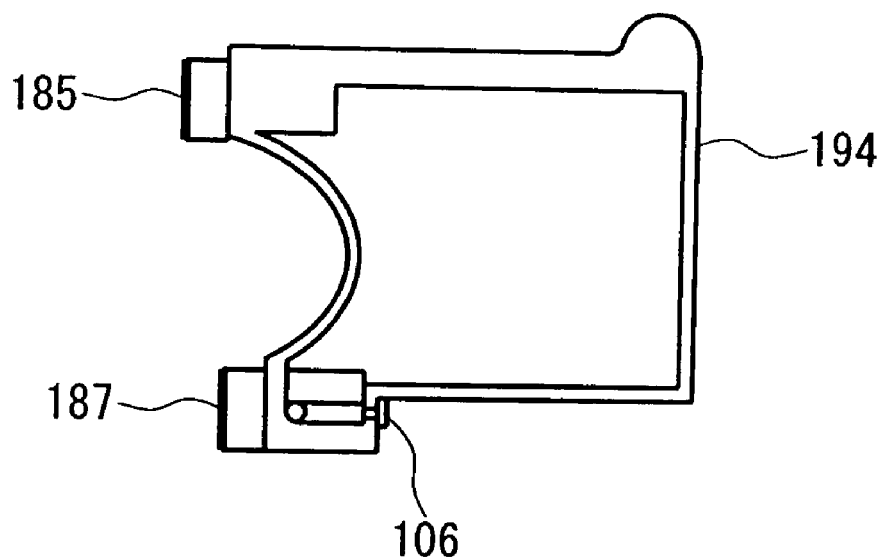

FIG. 31 shows other embodiment of the ink cartridge 180 shown in FIG. 30. The actuator 106 is mounted on the bottom face 194*a*, which is formed to be slanted in vertical direction, of the ink cartridge 180A shown in the FIG. 31(A). A wave preventing wall 192 is provided on the position where has the predetermined height from the bottom face of the inside the ink container 194 and also faces to the actuator 106 inside the ink container 194 of the ink cartridge 180. Because the actuator 106 is mounted on the ink container 194 slanted in vertical direction, the drainage of ink can be improved.

A gap, which is filled with ink, is formed between the actuator 106 and the wave preventing wall 192. The space between the wave preventing wall 192 and the actuator 106 has a space such that the space does not hold ink by capillary force. When the ink container 194 is rolled, ink wave is generated inside the ink container 194 by the rolling, and there is possibility that the actuator 106 malfunctions by detecting gas or an air bubble caused by the shock of the ink wave. By providing the wave preventing wall 192, ink wave around the actuator 106 can be prevented so that the malfunction of the actuator 106 can be prevented.

The actuator 106 of the ink cartridge 180B shown in FIG. 31 is mounted on the side wall of the supply port of the ink container 194. The actuator 106 can be mounted on the side wall or bottom face of the ink container 194 if the actuator 106 is mounted nearby the ink supply port 187. The actuator 106 is preferably mounted on the center of the width direction of the ink container 194. Because ink is supplied to the outside through the ink supply port 187, ink and actuator 106 reliably contacts until the timing of the ink near end by providing the actuator 106 nearby the ink supply port 187. Therefore, the actuator 106 can reliably detect the timing of the ink near end.

Furthermore, by providing the actuator 106 nearby the ink supply port 187, the setting position of the actuator 106 to the connection point on the carriage on the ink container becomes reliable during the mounting of the ink container on the cartridge holder of the carriage. It is because the reliability of coupling between the ink supply port with the ink supply needle is most important during the coupling of the ink container and the carriage. If there is even a small gap, the tip of the ink supply needle will be hurt or a sealing structure such as O-ring will be damaged so that the ink will be leaked. To prevent this kind of problems, the ink jet printer usually has a special structure that can accurately positioning the ink container during the mounting of the ink container on the carriage. Therefore, the positioning of the actuator 106 becomes reliable by arranging the actuator nearby the ink supply port. Furthermore, the actuator 106 can be further reliably positioned by mounting the actuator 106 at the center of the width direction of the ink container 194. It is because the rolling is the smallest when the ink container rolls along an axis, the center of which is center line of the width direction, during the mounting of the ink container on the holder.

Figure 32A:
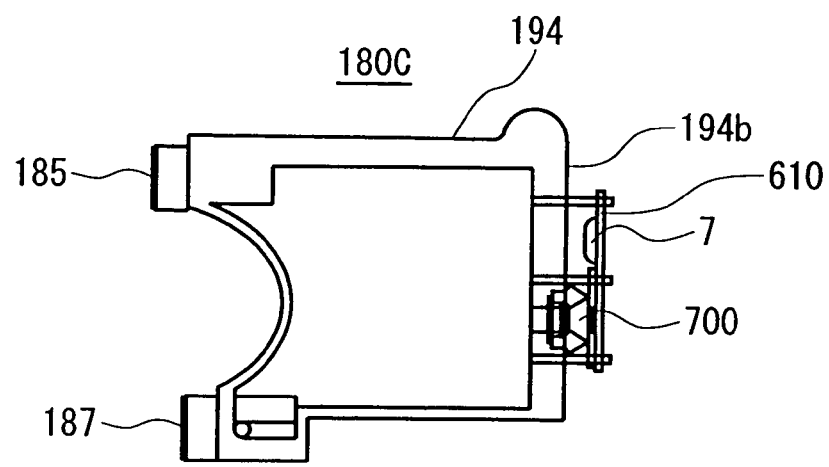
FIGS. 32A, 32B and 32C show still another embodiment of the ink cartridge 180.
Figures 32B, 32C:
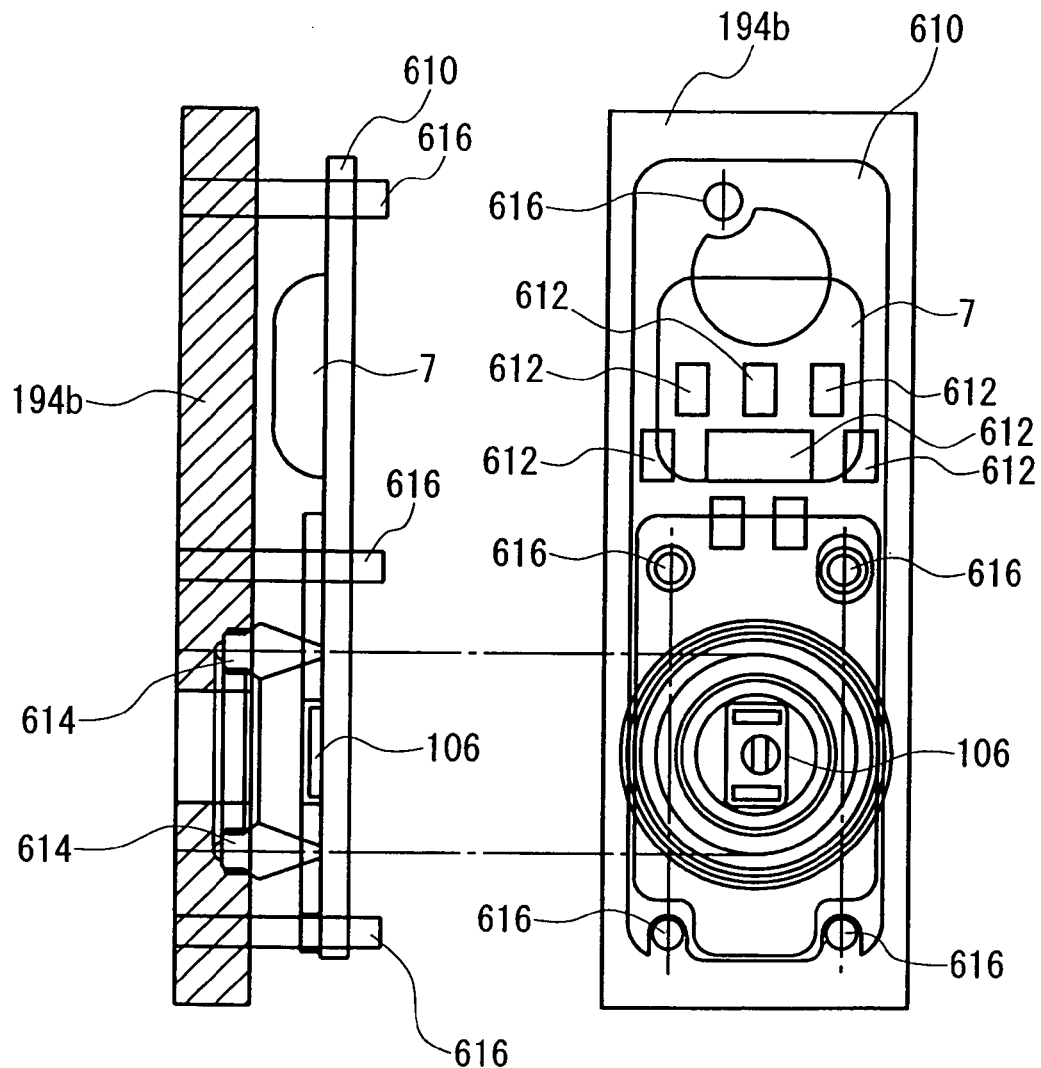

FIG. 32 shows further other embodiment of the ink cartridge 180. FIG. 32(A) shows a cross section of an ink cartridge 180C, and FIG. 32(B) shows a cross section which enlarges the side wall 194*b* of an ink cartridge 180C shown in FIG. 32(A). FIG. 32(C) shows perspective view from the front of the side wall 194*b* of the ink cartridge 180C. The semiconductor memory device 7 and the actuator 106 are formed on the same circuit board 610 in the ink cartridge 180C. As shown in FIGS. 32(B) and (C), the semiconductor memory device 7 is formed on the upper side of the circuit board 610, and the actuator 106 is formed on the lower side of the semiconductor memory device 7 on the same circuit board 610. A different-type O-ring 614 is mounted on the side wall 194*b* such that the different-type O-ring 614 surrounds the actuator 106. A plurality of caulking part 616 is formed on the side wall 194*b* to couple the circuit board 610 with the ink container 194. By coupling the circuit board 610 with the ink container 194 using the caulking part 616 and pushing the different-type O-ring 614 to the circuit board 610, the vibrating region of the actuator 106 can contacts with ink, and at the same time, the inside of the ink cartridge is sealed from outside of the ink cartridge.

A terminals 612 are formed on the semiconductor memory device 7 and around the semiconductor memory device 7. The terminal 612 transfer the signal between the semiconductor memory device 7 and outside the ink jet recording apparatus. The semiconductor memory device 7 can be constituted by the semiconductor memory which can be rewritten such as EEPROM. Because the semiconductor memory device 7 and the actuator 106 are formed on the same circuit board 610, the mounting process can be finished at one time during mounting the semiconductor memory device 7 and the actuator 106 on the ink cartridge 180C. Moreover, the working process during the manufacturing of the ink cartridge 180C and the recycling of the ink cartridge 180C can be simplified. Furthermore, the manufacturing cost of the ink cartridge 180C can be reduced because the numbers of the parts can be reduced.

The actuator 106 detects the ink consumption status inside the ink container 194. The semiconductor memory device 7 stores the information of ink such as residual quantity of ink detected by the actuator 106. That is, the semiconductor memory device 7 stores the information related to the characteristic parameter such as the characteristic of ink and the ink cartridge used for the actuator 106 when detecting the ink consumption status. The semiconductor memory device 7 previously stores the resonant frequency of when ink inside the ink container 194 is full, that is, when ink is filled in the ink container 194 sufficiently, or when ink in the ink container 194 is end, that is, ink in the ink container 194 is consumed, as one of the characteristic parameter. The resonant frequency when the ink inside the ink container 194 is full status or end status can be stored when the ink container is mounted on the ink jet recording apparatus for the first time. Moreover, the resonant frequency when the ink inside the ink container 194 is full status or end status can be stored during the manufacturing of the ink container 194. Because the unevenness of the detection of the residual quantity of ink can be corrected by storing the resonant frequency when the ink inside the ink container 194 is full status or end status in the semiconductor memory device 7 previously and reading out the data of the resonant frequency at the ink jet recording apparatus side, it can be accurately detected that the residual quantity of ink is decreased to the reference value.

Figure 33A:
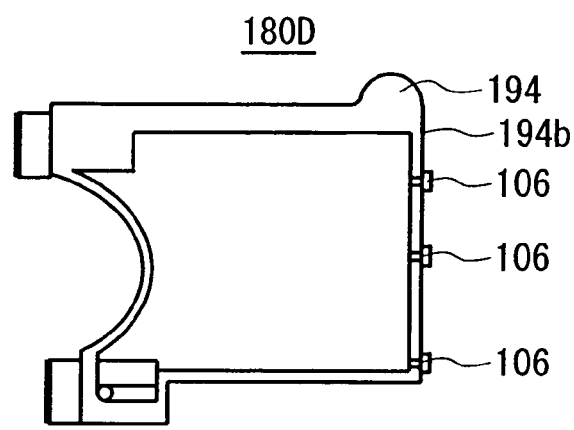
FIGS. 33A, 33B and 33C show still another embodiment of the ink cartridge 180.

FIG. 33 shows further other embodiment of the ink cartridge 180. A plurality of actuators 106 is mounted on the side wall 194b of the ink container 194 in the ink cartridge 180D shown in FIG. 33(A). It is preferable to use the plurality of the actuators 106 which is formed in one body as shown in FIG. 14 for these plurality of actuators 106. The plurality of actuators 106 is arranged on the side wall 194b with interval in vertical direction. By arranging the plurality of actuators 106 on the side wall 194b with interval in vertical direction, the residual quantity of ink can be detected step by step.

Figure 33B:
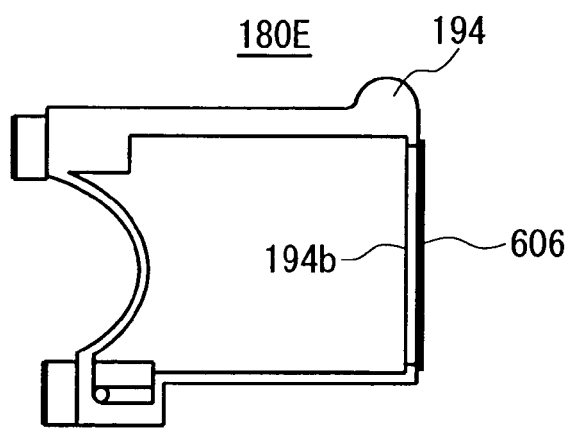

The ink cartridge 180E shown in FIG. 33(B) mounts a actuator 606 which is long in vertical direction on the side wall 194b of the ink container 194. The change of the residual quantity of ink inside the ink container 194 can be detected continuously by the actuator 606 which is long in vertical direction. The length of the actuator 606 is preferably longer than the half of the height of the side wall 194b. In FIG. 33(B), the actuator 606 has the length from the substantially from the top end to the bottom end of the side wall 194b.

Figure 33C:
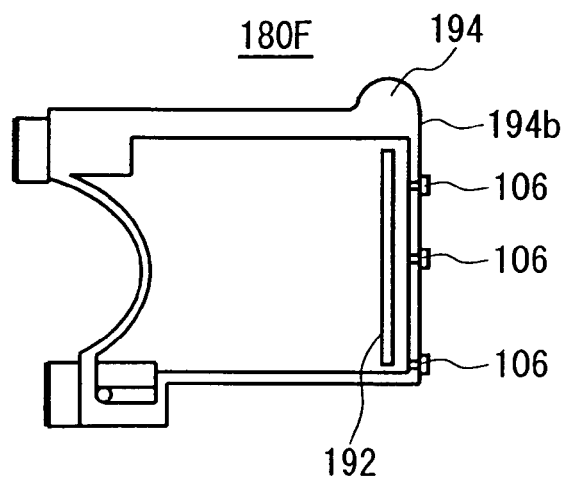

The ink cartridge 180F shown in FIG. 33(C) mounts a plurality of actuators 106 on the side wall 194b of the ink container 194 as the ink cartridge 180D shown in FIG. 33(A). The ink cartridge 180F further comprises the wave preventing wall 192, which is long in vertical direction, along the side wall 194b with predetermined space with the side wall 194b such that the wave preventing wall 192 faces directly to the plurality of actuators 106. It is preferable to use the plurality of the actuators 106 which is formed in one body as shown in FIG. 14 for these plurality of actuators 106. A gap which is filled with ink is formed between the actuator 106 and the wave preventing wall 192. Moreover, the gap between the wave preventing wall 192 and the actuator 106 has a space such that the gap does not hold ink by capillary force. When the ink container 194 is rolled, ink wave is generated inside the ink container 194 by the rolling, and there is possibility that the actuator 106 malfunctions by detecting gas or an air bubble caused by the shock of the ink wave. By providing the wave preventing wall 192, ink wave around the actuator 106 can be prevented so that the malfunction of the actuator 106 can be prevented. The wave preventing wall 192 also prevents the air bubble generated by the rolling of ink to enter to the actuator 106.

FIG. 34 shows further other embodiment of the ink cartridge 180. The ink cartridge 180G shown in FIG. 34(A) has a plurality of partition walls 212, each of which extends downward from the top face 194c of the ink container 194. Because each of lower end of the partition walls 212 and the bottom face of the ink container 194 has a predetermined gap, the bottom part of the ink container 194 communicates with each other. The ink cartridge 180G has a plurality of containing chambers 213 divided by the each of plurality of partition walls 212. The bottom part of the plurality of the containing chambers 213 communicates with each other. In each of the plurality of the containing chamber 213, the actuator 106 is mounted on the top face 194c of the ink container 194. It is preferable to use the plurality of the actuators 106 which is formed in one body as shown in FIG. 14 for these plurality of actuators 106. The actuator 106 is arranged on substantially center of the top face 194c of the containing chamber 213 of the ink container 194. The volume of the containing chamber 213 is arranged such that the volume of the containing chamber 213 of the ink supply port 187 is the largest, and the volume of the containing chamber 213 gradually decreases as the distance from the ink supply port 187 increases to the inner part of the ink cartridge 180G. Therefore, the space between each of the actuator 106 is widest at the ink supply port 187 side and becomes narrower as the distance from the ink supply port 187 increases to the inner part of the ink cartridge 180G. Because ink is drained from the ink supply port 187, and air enters from the air introducing inlet 185, ink is consumed from the containing chamber 213 of the ink supply port 187 side to the containing chamber 213 of the inner part of the ink cartridge 180G. For example, the ink in the containing chamber 213 which is most near to the ink supply port 187 is consumed, and during the ink level of the containing chamber 213 which is most near to the ink supply port 187 decreases, the other containing chamber 213 are filled with ink. When the ink in the containing chamber 213 which is most near to the ink supply port 187 is consumed totally, air enters to the containing chamber 213 which is second by counted from the ink supply port 187, then the ink in the second containing chamber 213 is beginning to be consumed so that the ink level of the second containing chamber 213 begin to decrease. At this time, ink is filled in the containing chamber 213 which is third or more than third by counted from the ink supply port 187. In this way, ink is consumed from the containing chamber 213 which is most near to the ink supply port 187 to the containing chamber 213 which is far from the ink supply port 187 in order.

As shown above, because the actuator 106 is arranged on the top face 194c of the ink container 194 with interval for each of the containing chamber 213, the actuator 106 can detect the decrease of the ink quantity step by step. Furthermore, because the volume of the containing chamber 213 decreases from the ink supply port 187 to the inner part of the containing chamber 213 gradually, the time interval when the actuator 106 detects the decrease of the ink quantity gradually decreases. Therefore, the frequency of the ink quantity detection can be increased as the ink end is drawing near.

Figure 34A:
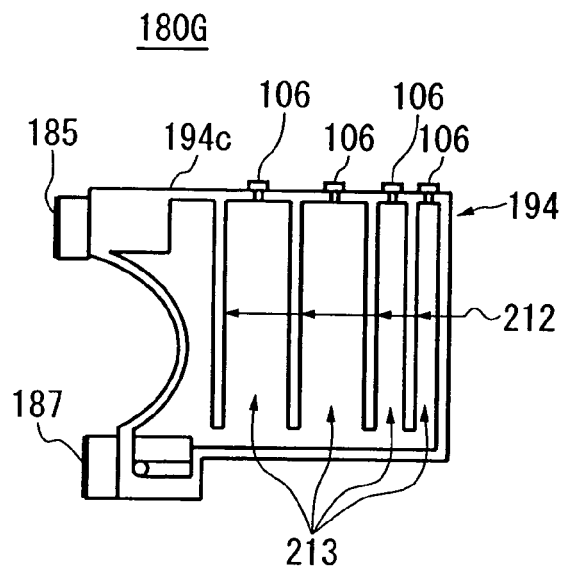
FIGS. 34A, 34B, 34C and 34D show still another embodiment of the ink cartridge 180.
Figure 34B:
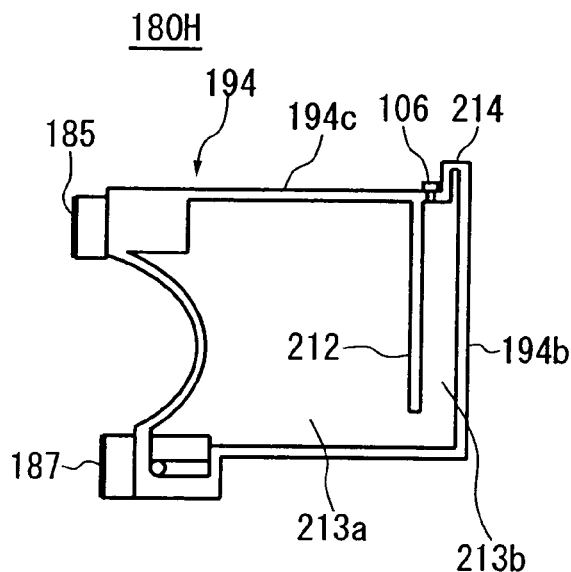

The ink cartridge 180H shown in FIG. 34(B) has one partition wall 212 which extends downward from the top face 194c of the ink container 194. Because lower end of the partition walls 212 and the bottom face of the ink container 194 have a predetermined space, the bottom part of the ink container 194 communicates with each other. The ink cartridge 180H has two containing chambers 213a and 213b divided by the partition wall 212. The bottom part of the containing chambers 213a and 213b communicates with each other. The volume of the containing chamber 213a of the ink supply port 187 side is larger than the volume of the containing chamber 213b which is located in a inner part of the ink cartridge 180H far from the ink supply port 187. The volume of the containing chamber 213b is preferably smaller than the half of the volume of the containing chamber 213a.

The actuator 106 is mounted on the top face 194c of the containing chamber 213B. Furthermore, a buffer 214, that is a groove for catching the air bubble which enters to the ink cartridge 180H during manufacturing of the ink cartridge 180H, is formed on the containing chamber 213b. In FIG. 34(B), the buffer 214 is formed as a groove extended upward from the side wall 194b of the ink container 194. Because the buffer 214 catches the air bubble enters inside the containing chamber 213b, the malfunction of the actuator 106 by detecting an ink end when catching the air bubble can be prevented. Furthermore, by providing actuator 106 on the top face 194c of the containing chamber 213b, ink can be completely consumed by correcting the ink quantity, which is measured from the detection of the ink end until the complete consumption of ink, with the corresponding ink consumption status of the containing chamber 213a calculated from the dot counter. Furthermore, by adjusting the volume of the containing chamber 213b by changing the length or the interval of the partition wall 212, the ink quantity which can be consumed after the detection of the ink end can be changed.

Figure 34C:
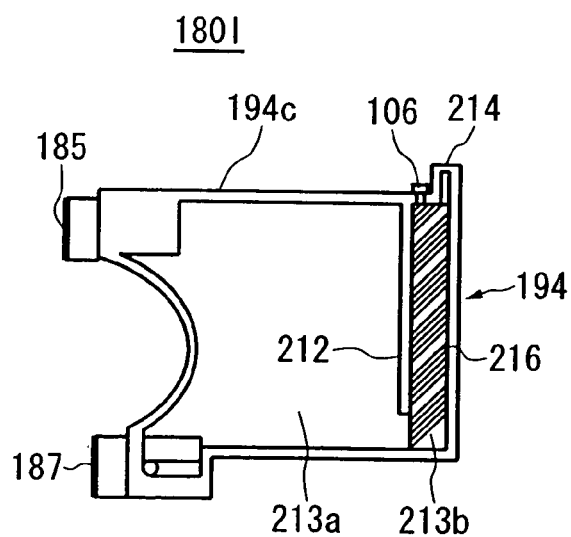

The ink cartridge 180I shown in FIG. 34(C) fills a porous member 216 in the containing chamber 213b of the ink cartridge 180H shown in FIG. 34(B). The porous member 216 is filled inside the containing chamber 213b from the top face to the bottom face of the porous member 216b. The porous member 216 contacts with the actuator 106. There is a possibility that the actuator 106 malfunctions by the entering of the air bubble inside the containing chamber 213b when the ink container fall down or when the containing chamber 213b moves back and forthwith the carriage. If the porous member 216 is provided on the containing chamber 213b, the porous member 216 captures air to prevent entering of air into the actuator 106. Furthermore, because the porous member 216 holds ink, the porous member 216 can prevent the actuator 106 to malfunction as detecting the ink end status as ink exist status which is caused by attaching of the ink on the actuator 106 when the ink container shakes. The porous member 216 is preferable to be provided in the containing chamber 213 having a smallest volume. Furthermore, by providing actuator 106 on the top face 194c of the containing chamber 213b, ink can be consumed to the end by correcting the ink quantity which is measured from the detection of the ink end until the complete consumption of ink. Furthermore, The ink quantity which can be consumed after the detection of the ink near end can be changed by adjusting the volume of the containing chamber 213b by changing the length and interval of the partition wall 212.

Figure 34D:
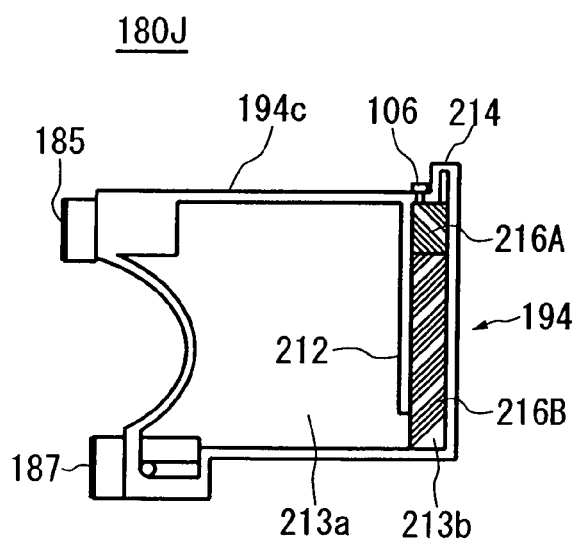

FIG. 34(D) shows an ink cartridge 180J, the porous member 216 of which is constituted by two kinds of porous members 216A and 216B having a different hole diameter with each other. The porous member 216A is located on the upper side of the porous member 216B. The hole diameter of the porous member 216A which is located on the upper side of the containing chamber 213b is larger than the hole diameter of the porous member 216B which is located on the lower side of the containing chamber 213B. The porous member 216A can be formed by the member which has a lower affinity for liquid than the affinity for liquid of the member which forms the porous member 216B. Because the capillary force of the porous member 216B, which has small hole diameter, is larger than the capillary force of the porous member 216A, which has large hole diameter, the ink in the containing chamber 213b is collected to the porous member 216B located on the lower side of the containing chamber 213B and held by the porous member 216B. Therefore, once the air reaches to the actuator 106, and the actuator 106 detects the non-ink status, ink does not reaches to the actuator 106 again so that the actuator 106 does not malfunction to detect the ink exist status. Furthermore, because the porous member 216B which is far from the actuator 106 absorbs ink, the drainage of ink around the actuator 106 improves, and the quantity of change of the acoustic impedance during the detection of the ink existence increases. Moreover, by providing the actuator 106 on the top face 194c of the containing chamber 213b, ink can be consumed to the end by correcting the ink quantity which is measured from the detection of the ink near end until the complete consumption of ink. Furthermore, The ink quantity which can be consumed after the detection of the ink near end can be changed by adjusting the volume of the containing chamber 213b by changing the length and interval of the partition wall 212.

FIG. 35 shows a cross section of an ink cartridge 180K which is further other embodiment of the ink cartridge 180I shown in FIG. 34(C). The porous member 216 in the ink cartridge 180K shown in FIG. 35 is designed such that the area of the cross section on the horizontal plane of the lower part of the porous member 216 is compressed to be decreases gradually to the direction to the bottom face of the ink container 194. Therefore, the hole diameter of the porous member 216 decreases gradually to the direction to the bottom face of the ink container 194. Ink cartridge 180K shown in FIG. 35(A) has a rib which is provided on the side wall of the ink container 194 to compress the lower part of the porous member 216 to reduce the hole diameter of the lower part of the porous member 216. Because the hole diameter of the lower part of the porous member 216 reduced by the compression, ink is collected and held by the lower part of the porous member 216. Because the lower part of the porous member 216 which is far from the actuator 106 absorbs ink, the drainage of ink around the actuator 106 improves, and the quantity of change of the acoustic impedance during the detection of the ink existence increases. Therefore, the error, of which the actuator 106 detects the non ink status as the ink exist status by the attaching of ink on the actuator 106 mounted on the top face of the ink cartridge 180K by rolling of ink, can be prevented In the ink cartridge 180L shown in FIG. 35(B) and FIG. 35(C), to compress to decrease the area of the cross section on the horizontal plane of the lower part of the porous member 216 gradually to the direction to the bottom face of the ink container 194, the area of the cross section on the horizontal plane of the containing chamber gradually decreases to the direction to the bottom face of the ink container 194. Because the hole diameter of the lower part of the porous member 216 reduced by the compression, ink is collected and held by the lower part of the porous member 216. Because the lower part of the porous member 216B which is far from the actuator 106 absorbs ink, the drainage of ink around the actuator 106 improves, and the quantity of change of the acoustic impedance during the detection of the ink existence increases. Therefore, the error, of which the actuator 106 detects the non ink status as the ink exist status by the attaching of ink on the actuator 106 mounted on the top face of the ink cartridge 180L by rolling of ink, can be prevented FIG. 36 shows other embodiment of the ink cartridge using the actuator 106. The ink cartridge 220A shown in FIG. 36(A) has a first partition wall 222 provided such that it extends downward from the top face of the ink cartridge 220A. Because there is a predetermined space between the lower end of the first partition wall 222 and the bottom face of the ink cartridge 220A, ink can flows into the ink supply port 230 through the bottom face of the ink cartridge 220A. A second partition wall 224 is formed such that the second partition wall 224 extends upward from the bottom face of the ink cartridge 220A on the more ink supply port 230 side of the first partition wall 222. Because there is a predetermined space between the upper end of the second partition wall 224 and the top face of the ink cartridge 220A, ink can flows into the ink supply port 230 through the top face of the ink cartridge 220A.

A first containing chamber 225a is formed on the inner part of the first partition wall 222, seen from the ink supply port 230, by the first partition wall 222. On the other hand, a second containing chamber 225b is formed on the front side of the second partition wall 224, seen from the ink supply port 230, by the second partition wall 224. The volume of the first containing chamber 225a is larger than the volume of the second containing chamber 225b. A capillary passage 227 is formed by providing a space, which can generate the capillary phenomenon, between the first partition wall 222 and the second partition wall 224. Therefore, the ink in the first containing chamber 225a is collected to the capillary passage 227 by the capillary force of the capillary passage 227. Therefore, the capillary passage 227 can prevent that the air or air bubble enters into the second containing chamber 225b. Furthermore, the ink level in the second containing chamber 225b can decrease steadily and gradually. Because the first containing chamber 225a is formed at more inner part of the second containing chamber 225b, seen from the ink supply port 230, the ink in the second containing chamber 225b is consumed after the ink in the first containing chamber 225a is consumed.

The actuator 106 is mounted on the side wall of the ink cartridge 220A of the ink supply port 230 side, that is, the side wall of the second containing chamber 225b of the ink supply port 230 side. The actuator 106 detects the ink consumption status inside the second containing chamber 225b. The residual quantity of ink at the timing closed to the ink near end can be detected stably by mounting the actuator 106 on the side wall of the second containing chamber 225b. Furthermore, by changing the height of the mounting position of the actuator 106 on the side wall of the second containing chamber 225b, the timing to determine which ink residual quantity as an ink end can be freely set. Because ink is sullied from the first containing chamber 225a to the second containing chamber 225b by the capillary passage 227, the actuator 106 does not influenced by the rolling of ink caused by the rolling of the ink cartridge 220A, and actuator 106 can thus reliably measure the ink residual quantity. Furthermore, because the capillary passage 227 holds ink, the capillary passage 227 can prevent ink to flow backward from the second containing chamber 225b to the first containing chamber 225a.

A check valve 228 is provided on the top face of the ink cartridge 220A. The leaking of ink outside of the ink cartridge 220A caused by the rolling of the ink cartridge 220A can be prevented by the check valve 228. Furthermore, the evaporation of ink from the ink cartridge 220A can be prevented by providing the check valve 228 on the top face of the ink cartridge 220A. If ink in the ink cartridge 220A is consumed, and negative pressure inside the ink cartridge 220A exceeds the pressure of the check valve 228, the check valve 228 opens and introduces air into the ink cartridge 220A. Then the check valve 228 closes to maintain the pressure inside the ink cartridge 220A to be stable.

FIGS. 36(C) and (D) shows a detailed cross-section of the check valve 228. The check valve 228 shown in FIG. 36(C) has a valve 232 which includes flange 232a formed by rubber. An airhole 233, which communicates air between inside and outside of the ink cartridge 220, is provided on the ink cartridge 220 such that the airhole 233 faces to the flange 232a. The airhole 233 is opened and closed by the flange 232a. The check valve 228 opens the flange 232a inward the ink cartridge 220 when the negative pressure in the ink cartridge 220 exceeds the pressure of the check valve 228 by the decrease of ink inside the ink cartridge 220A, and thus the air outside the ink cartridge 220 is introduced into the ink cartridge 220. The check valve 228 shown in FIG. 36(D) has a valve 232 formed by rubber and a spring 235. If the negative pressure inside the ink cartridge 220 exceeds the pressure of the check valve 228, the valve 232 presses and opens the spring 235 to introduce the outside air into the ink cartridge 220 and then closes to maintain the negative pressure inside the ink cartridge 220 to be stable.

The ink cartridge 220B shown in FIG. 36(B) has a porous member 242 in the first containing chamber 225a instead of providing the check valve 228 on the ink cartridge 220A as shown in FIG. 36. The porous member 242 holds the ink inside the ink cartridge 220B and also prevents ink to be leaked outside of the ink cartridge 220B during the rolling of the ink cartridge 220B.

The embodiment that the actuator 106 is mounted on an ink cartridge or a carriage, in which the ink cartridge is a separate body with the carriage and mounted on the carriage, has been explained above. However, the actuator 106 can be mounted on the ink tank which is mounted on the ink jet recording apparatus together with a carriage and formed together with a carriage as one body. Furthermore, the actuator 106 can be mounted on the ink tank of the off-carriage type. The off-carriage type ink tank is a separate body with a carriage and supplies ink to carriage through such as tube. Moreover, the actuator of the present embodiment can be mounted on the ink cartridge 180 constituted so that a recording head and an ink container are formed as one body and possible to be exchanged.

Although the present invention has been described by way of exemplary embodiments, it should be understood that many changes and substitutions may be made by those skilled in the art without departing from the spirit and the scope of the present invention which is defined only by the appended claims.

The liquid consumption status detecting method and liquid container of the present invention can detect the residual quantity of liquid accurately and also do not need the complicated sealing structure. Furthermore, the liquid consumption status detection method of the present invention does not to be influenced by the unstable measuring signal generated at the early stage of the measuring of the liquid consumption status. Furthermore, the liquid consumption status detection method of the present invention can reduce the time for detecting the liquid consumption status.

What is claimed is:

1. A method of detecting a consumption status of liquid contained in a liquid container, comprising steps of:

preparing a detection device having a piezoelectric element and a cavity, attaching said detection device on a desired position of the liquid container so that at least a part of said detection device contacts the liquid, wherein said detection device vibrates at an actually vibrating part whose substantial entire periphery is fixed to a non-vibrating part, further wherein said actually vibrating part contacts the liquid and said cavity is disposed at a position facing said actually vibrating part;

measuring a residual vibration of said actually vibrating part; and detecting the consumption status of the liquid contained in the liquid container on the basis of a result of the measurement of the residual vibration.

2. The detection method according to claim 1, further comprising a step of activating said detection device to cause a vibration.

3. The detection method according to claim 2, wherein said measurement step is operated after a predetermined time period has elapsed from the activation step.

4. The detection method according to claim 2, wherein said measurement step is operated after the vibrations of the detection device several times.

5. The detection method according to claim 1, wherein said residual vibration measurement step comprises a step of measuring a frequency of the residual vibration.

6. The detection method according to claim 5, further comprising steps of:

measuring previously a first frequency value of the residual vibration of the detection device when the liquid container is full of liquid, said frequency is regarded as a reference frequency value;

measuring a second frequency value of the residual vibration of the detection device when liquid in the liquid container is consumed;

comparing said reference frequency with said second frequency; and judging the consumption status of the liquid contained in the liquid container in accordance with a result of said comparing step.

7. The detection method according to claim 5, wherein said residual vibration frequency measurement step comprises a step of measuring a plurality of resonance frequency modes of the residual vibration of the detection device.

8. The detection method according to claim 7, wherein said measurement step comprises steps of measuring a first and a second resonance frequency modes, and recognizing said two resonance frequency modes as a single pattern.

9. The detection method according to claim 1, wherein said residual vibration measurement step comprises a step of measuring a resonance frequency of the liquid surrounding the detection device.

10. The detection method according to claim 1, wherein said measurement step comprises a step of measuring a time period in between a predetermined plurality of peaks of the residual vibration.

11. The detection method according to claim 1, wherein said measurement step comprises a step of measuring a number of peaks of the residual vibration within a predetermined time period.

12. The detection method according to claim 1, wherein said measurement step comprises a step of measuring a counter electromotive voltage generated by the detection device in accordance with the residual vibration thereof.

13. The detection method according to claim 1, wherein said detection device comprises a cavity formed at a position facing said actually vibrating part, said cavity contacting the liquid contained in the liquid container.

14. The detection method according to claim 13, wherein the depth of said cavity is smaller than the narrowest width of said cavity.

15. The detection method according to claim 14, wherein the depth of said cavity is less than one-third of the narrowest width of said cavity.

16. The detection method according to claim 1, wherein said step of preparing a detection device comprises preparing a detection device wherein the actually vibrating part does not include a damper, so that said actually vibrating part generates residual vibration.

17. The detection method according to claim 1, wherein said step of preparing a detection device comprises preparing a detection device comprising a terminal which generates a pulse signal and receives a counter electromotive force signal.

18. A liquid container comprising:

a housing containing therein liquid;

a liquid supply opening formed in said housing; and a detection device having a piezoelectric element and a cavity, said cavity being disposed between said piezoelectric element and an interior of said housing, said detection device generating a detection signal in accordance with a residual vibration of said piezoelectric element, said detection signal indicating a consumption status of the liquid contained in said housing, wherein said detection device comprises a planar plate, and further wherein the plane of the plate extends in a direction substantially the same as that of the wall of the container to which the detection device is attached.

19. The liquid container according to claim 18, wherein said detection device comprises a cavity formed at a position facing said piezoelectric element, said cavity contacting the liquid contained in the liquid container.

20. The liquid container according to claim 19, wherein the depth of said cavity is smaller than the narrowest width of said cavity.

21. The liquid container according to claim 20, wherein the depth of said cavity is less than one-third of the narrowest width of said cavity.

22. The liquid container according to claim 18, wherein said detection device further comprises a terminal which generates a pulse signal and receives a counter electromotive force signal.

23. The liquid container according to claim 18, wherein said detection device is activated to generate a vibration.

24. The liquid container according to claim 18, wherein said detection signal represents a frequency value of the residual vibration of the detection device.

25. The liquid container according to claim 18, wherein said detection signal represents a resonance frequency of the liquid surrounding the detection device.

26. The liquid container according to claim 18, wherein said detection device vibrates at least one resonance frequency mode.

27. The liquid container according to claim 18, wherein said detection signal represents a counterelectromotive voltage generated by said detection device in accordance with the residual vibration thereof.

28. The liquid container according to claim 18, wherein the liquid container is an ink cartridge for an ink jet printer.

29. A liquid container comprising:

a housing containing therein liquid;

a liquid supply opening formed in said housing; and a detection device having a piezoelectric element and a cavity, said detection device generating a detection signal in accordance with a residual vibration of said piezoelectric element, said detection signal indicating a consumption status of the liquid contained in said housing, said detection device further comprising a vibrating plate, a substantially entire periphery of which is supported by a fixing portion so that an inside region of the vibrating plate is defined as an actually vibrating region, wherein the actually vibrating region contacts liquid in the container, the cavity is disposed at a position facing the actually vibrating region, and the vibration of the actually vibrating region generates said detection signal.

30. The liquid container according to claim 29, wherein said detection device comprises a cavity formed at a position facing said vibrating plate, said cavity contacting the liquid contained in the liquid container.

31. The liquid container according to claim 30, wherein the depth of said cavity is smaller than the narrowest width of said cavity.

32. The liquid container according to claim 31, wherein the depth of said cavity is less than one-third of the narrowest width of said cavity.

33. The liquid container according to claim 29, wherein said detection device further comprises a terminal which generates a pulse signal and receives a counter electromotive force signal.

34. The liquid container according to claim 29, wherein the vibrating region is free of a damper.

35. A liquid container comprising:
a housing containing ink therein;
a liquid supply opening formed in said housing; and
a detection device having a piezoelectric element a cavity and a vibrating plate, said vibrating plate comprising:
a first surface facing said piezoelectric element;
a second surface opposite to said first surface, said second surface being attached on a part of said housing; and
a vibrating region, wherein said vibrating region comprises an actually vibrating region defined by a periphery thereof which is fixed to a part of said detection device, and further wherein said actually vibrating region contacts the liquid, wherein said cavity is disposed at a position facing the vibrating region;
said detection device generating a detection signal in accordance with a residual vibration of said actually vibrating region, said detection signal indicating a consumption status of the liquid contained in said housing.

36. The liquid container according to claim 35, wherein said detection device further comprises a terminal which generates a pulse signal and receives a counter electromotive force signal.

37. The liquid container according to claim 35, wherein said detection device comprises a cavity formed at a position facing said vibrating plate, said cavity contacting the liquid contained in the liquid container.

38. The liquid container according to claim 37, wherein the depth of said cavity is smaller than the narrowest width of said cavity.

39. The liquid container according to claim 38, wherein the depth of said cavity is less than one-third of the narrowest width of said cavity.

* * * * *